United States Patent
Ohishi

(10) Patent No.: US 8,768,156 B2
(45) Date of Patent: Jul. 1, 2014

(54) CAMERA SYSTEM AND CAMERA BODY

(75) Inventor: Sueyuki Ohishi, Tokyo (JP)

(73) Assignee: Nikon Corporation, Tokyo (JP)

( * ) Notice: Subject to any disclaimer, the term of this patent is extended or adjusted under 35 U.S.C. 154(b) by 919 days.

(21) Appl. No.: 12/659,663

(22) Filed: Mar. 16, 2010

(65) Prior Publication Data

US 2010/0172639 A1    Jul. 8, 2010

Related U.S. Application Data

(63) Continuation of application No. 12/068,920, filed on Feb. 13, 2008, now abandoned.

(30) Foreign Application Priority Data

Feb. 16, 2007  (JP) .................................. 2007-036062
Feb. 16, 2007  (JP) .................................. 2007-036156

(51) Int. Cl.
*G03B 17/00*  (2006.01)

(52) U.S. Cl.
USPC .......................................................... 396/52

(58) Field of Classification Search
USPC .......................................................... 396/52
See application file for complete search history.

(56) References Cited

U.S. PATENT DOCUMENTS

| | | | |
|---|---|---|---|
| 5,598,242 A | 1/1997 | Omi et al. | |
| 5,745,802 A | 4/1998 | Imura | |
| 5,845,156 A | 12/1998 | Onuki | |
| 5,850,575 A | 12/1998 | Ohishi | |
| 5,857,122 A | 1/1999 | Miyamoto et al. | |
| 5,903,783 A * | 5/1999 | Kanbayashi et al. | ........... 396/55 |
| 5,917,653 A | 6/1999 | Taniguchi | |
| 5,978,598 A | 11/1999 | Ishikawa | |
| 6,064,826 A | 5/2000 | Washisu | |
| 6,097,896 A | 8/2000 | Usui | |
| 6,130,709 A | 10/2000 | Sekine et al. | |

(Continued)

FOREIGN PATENT DOCUMENTS

| | | |
|---|---|---|
| EP | 1 750 435 A2 | 2/2007 |
| JP | A-03-078734 | 4/1991 |

(Continued)

OTHER PUBLICATIONS

European Search Report issued Oct. 15, 2010 for European Application No. EP-08 10 1508.3.

(Continued)

*Primary Examiner* — Rodney Fuller
(74) *Attorney, Agent, or Firm* — Oliff PLC

(57) ABSTRACT

This camera system includes: a vibration compensation unit including a vibration compensation optical system and an image-capturing unit; a drive unit that drives the vibration compensation unit; a detection unit that detects vibration; a position detection unit that detects the position of the vibration compensation unit; a target position determination unit that determines a target position for the vibration compensation unit according to the vibration of the camera; a calculation unit that calculates a drive amount for the drive unit; a range of movement limitation unit that limits the position of the vibration compensation unit within a range; a range setting unit that sets a movement permitted range that is within the range in which the vibration compensation unit can be positioned; and a centering unit that controls the drive unit so that the vibration compensation unit is centered in the center of the movement permitted range.

43 Claims, 20 Drawing Sheets

(56) References Cited

U.S. PATENT DOCUMENTS

| | | | |
|---|---|---|---|
| 6,263,162 B1 | 7/2001 | Yamazaki et al. | |
| 6,374,048 B1 | 4/2002 | Uenaka et al. | |
| 6,982,746 B1 | 1/2006 | Kawahara | |
| 2005/0168586 A1 | 8/2005 | Tsubusaki | |
| 2005/0276590 A1 | 12/2005 | Ishikawa et al. | |
| 2006/0051081 A1 | 3/2006 | Ogino | |
| 2007/0122134 A1* | 5/2007 | Suzuki | 396/55 |
| 2008/0145042 A1* | 6/2008 | Kawai et al. | 396/55 |

FOREIGN PATENT DOCUMENTS

| | | |
|---|---|---|
| JP | A-04-301822 | 10/1992 |
| JP | A-08-006095 | 1/1996 |
| JP | A-08-101419 | 4/1996 |
| JP | A-8-313953 | 11/1996 |
| JP | A-09-080512 | 3/1997 |
| JP | A-11-64907 | 3/1999 |
| JP | A-2001-154226 | 6/2001 |
| JP | A-2001-209084 | 8/2001 |
| JP | A-2004-227003 | 8/2004 |
| JP | A-2004-271694 | 9/2004 |
| JP | A-2004-295032 | 10/2004 |
| JP | A-2006-074652 | 3/2006 |
| JP | A-2006-133265 | 5/2006 |
| JP | A-2006-195178 | 7/2006 |
| JP | A-2006-221195 | 8/2006 |
| JP | A-2006-259568 | 9/2006 |
| JP | A-2006-304259 | 11/2006 |
| JP | A-2007-043584 | 2/2007 |
| JP | A-2007-140064 | 6/2007 |
| KR | 20060049600 A | 5/2006 |
| WO | WO 2005/045516 | 5/2005 |

OTHER PUBLICATIONS

Dec. 20, 2011 Office Action issued in Japanese Patent Application No. 2007-036156 (with translation).
Dec. 20, 2011 Office Action issued in Japanese Patent Application No. 2007-036062 (with translation).
Jul. 3, 2012 Office Action issued in Japanese Patent Application No. 2007-036156 (with English-language translation).
Office Action dated Jul. 23, 2013 issued in Japanese Patent Application No. 2012-034158 (with translation).
Office Action dated Aug. 8, 2013 issued in U.S. Appl. No. 12/659,657.
Office Action dated Apr. 11, 2014 issued in Korean Patent Application No. 10-2008-0013843 (with English Translation).

* cited by examiner

CAMERA SYSTEM AND CAMERA BODY

INCORPORATION BY REFERENCE

This is a Continuation of application Ser. No. 12/068,920 filed Feb. 13, 2008. This application claims the benefit of Japanese Application Nos. JP 2007-036062 and JP 2007-036156, filed Feb. 16, 2007. The disclosures of the prior applications are hereby incorporated by reference herein in their entirety.

BACKGROUND OF THE INVENTION

1. Technical Field

The present invention relates to a camera system and a camera body that can prevent image vibration that originates in camera vibration and the like.

2. Description of Related Art

In Japanese Laid-Open Patent Publication 2001-209084, there is disclosed a vibration compensation device that detects an amount of vibration based upon the angular velocity with which a camera vibrates, or upon the vibration of the image, and that compensates vibration of an image capture surface or of a film surface by driving a vibration compensation lens according to this amount of vibration that has been detected. With this type of vibration compensation device, the vibration compensation lens constitutes one portion of the photographic optical system, and is shifted in two directions that are orthogonal to the photographic optical axis, and that are moreover mutually orthogonal.

DISCLOSURE OF THE INVENTION

However, with a camera endowed with a prior art vibration compensation function, even before the photographic operation in which full pressing of the release button is performed, vibration compensation is performed by shifting the compensation lens within its range of movement according to any detected vibration. Due to this, at the time point when the release button is full pressed and photography is started, the compensation lens is not restricted to being almost at its central position within its range of movement. If the shutter is released in the state in which the compensation lens is shifted to one corner of its range of movement, then it becomes impossible to shift the compensation lens further in that direction, and there is a fear that sometimes the advantageous effects of vibration compensation may be lost.

Furthermore, with this type of camera endowed with a prior art vibration compensation function, during photographic operation in which full pressing of the release button is performed, for a short time the compensation lens is centered at the approximately central position within its range of movement, and then drive control of the compensation lens corresponding to vibration is performed from this approximately central position at which the lens has been centered—in other words, vibration compensation is started—and thereafter photographic operation starts. By doing this, deterioration of the optical performance of the photographic optical system is suppressed as much as possible by centering the compensation lens in its approximately central position. Moreover, by performing centering at the time of photographic operation, the range over which vibration compensation can be performed during photography is made wider, and thus the vibration compensation is made to function for higher levels of vibrations.

However, if the compensation lens is centered directly before the operation of photography is started, then a delay occurs during the time period until photography is started, and the release time lag becomes longer, and this is a deficiency. Moreover, it is difficult for making the release time lag short to be consistent with handling larger amount of camera vibration by performing extension of the optical performance sufficiently by centering the compensation lens before photography under the sacrificing the release time lag.

A camera system according to the present invention comprises a vibration compensation unit that comprises at least one of a vibration compensation optical system that makes an optical axis variable, and an image-capturing unit that can be shifted, and that compensates image vibration upon an image surface occurring due to vibration of a camera, a drive unit that drives the vibration compensation unit, a detection unit that detects vibration of the camera, a position detection unit that detects the position of the vibration compensation unit, a target position determination unit that determines a target position for the vibration compensation unit according to vibration of the camera detected by the detection unit, a calculation unit that calculates a drive amount for the drive unit based upon the target position and the position detected by the position detection unit, a range of movement limitation unit that limits the position of the vibration compensation unit within a certain range of movement, a range setting unit that sets a movement permitted range that is a range within the range of movement in which the vibration compensation unit can be positioned by being driven by the drive unit during vibration compensation, and a centering unit that controls the drive unit after photography based upon issue of a photographic command by an operator has ended so that the vibration compensation unit is centered in the approximate center of the movement permitted range.

It is desirable that the camera system described above further comprises a changeover unit that changes over between a first mode in which centering is performed by the centering unit before photography is started based upon issue of a photographic command by the operator, and a second mode in which centering is not performed by the centering unit before photography is started based upon issue of a photographic command by the operator. Furthermore, before photography is started based upon issue of a photographic command by the operator, the range setting unit may enlarge the movement permitted range.

It is desirable that the camera system described above further comprises a determination unit that, based upon either or both of the setting state of the camera system and photographic conditions, determines whether or not centering by the centering unit after photography based upon the photographic command issued by the operator has ended is required. Furthermore, this camera system may further comprise an image-capturing unit that captures an image of the photographic subject and a display device that sequentially displays an image as a display image, the image being corresponding to an image data created based upon the image sequentially captured by the image-capturing unit, and it is desirable that after photography based upon the photographic command issued by the operator has ended, the centering unit completes the centering before the sequential display of the display image is started.

A camera system in another mode of the present invention comprises a vibration compensation unit that comprises at least one of a vibration compensation optical system that makes an optical axis variable, and an image-capturing unit that can be shifted, and that compensates image vibration upon an image surface occurring due to vibration of the camera, a drive unit that drives the vibration compensation unit, a detection unit that detects vibration of a camera, a position detection unit that detects the position of the vibration compensation unit, a target position determination unit that determines a target position for the vibration compensation unit according to vibration of the camera detected by the detection unit, a calculation unit that calculates a drive amount for the drive unit based upon the target position and the position detected by the position detection unit, a range of movement limitation unit that limits the position of the vibration compensation unit within a certain range of movement, a range setting unit that sets a movement permitted range that is a range within the range of movement in which the vibration compensation unit can be positioned by being driven by the drive unit during vibration compensation, a centering unit that controls the drive unit before the start of photography based upon issue of a photographic command by an operator so that the vibration compensation unit is centered in the approximate center of the movement permitted range, and a determination unit that determines whether or not centering by the centering unit is required based upon either or both of the setting state of the camera system and photographic conditions.

It is desirable that in the camera system described above, the either or both of the setting state of the camera system and photographic conditions includes any one of: (a) a setting state as to whether or not centering by the centering unit before the start of photography based upon issue of the photographic command by the operator is required; (b) a parameter setting state for white balance processing; (c) the ON/OFF state of a self timer mode in which self timer photography is performed; and (d) the ON/OFF state of vibration compensation.

It is desirable that in the camera system described above, the either or both of the setting state of the camera system and photographic conditions includes all of: (a) a setting state as to whether or not centering by the centering unit before the start of photography based upon issue of the photographic command by the operator is required; (b) a parameter setting state for white balance processing; (c) the ON/OFF state of a self timer mode in which self timer photography is performed; and (d) the ON/OFF state of vibration compensation.

A camera system in another mode of the present invention comprises a vibration compensation unit that comprises at least one of a vibration compensation optical system that makes an optical axis variable, and an image-capturing unit that can be shifted, and that compensates image vibration upon an image surface occurring due to vibration of the camera, a drive unit that drives the vibration compensation unit, a detection unit that detects vibration of a camera, a position detection unit that detects the position of the vibration compensation unit, a target position determination unit that determines a target position for the vibration compensation unit according to vibration of the camera detected by the detection unit, a calculation unit that calculates a drive amount for the drive unit based upon the target position and the position detected by the position detection unit, a range of movement limitation unit that limits the position of the vibration compensation unit within a certain range of movement, a range setting unit that sets a movement permitted range that is a range within the range of movement in which the vibration compensation unit can be positioned by being driven by the drive unit during vibration compensation, a change unit that changes the movement permitted range after issue of a photographic command by the operator and before photographic processing, and a control unit that determines whether or not change of the movement permitted range by the change unit is required based upon either or both of the setting state of the camera system and photographic conditions. The change unit of this camera system can change the movement permitted range based upon issue of a photographic command by the operator.

It is desirable that the camera system described above further comprises a centering unit that controls the drive unit before the start of photography based upon issue of the photographic command by the operator so that the vibration compensation unit is centered in the approximate center of the movement permitted range and a mode setting unit that sets either a first mode in which centering is performed by the centering unit, or a second mode in which centering is not performed by the centering unit, and the control unit makes a decision in which change of the movement permitted range by the change unit and centering by the centering unit are performed if the first mode is set and makes a decision in which change of the movement permitted range by the change unit is performed and centering by the centering unit is not performed if the second mode is set.

It is desirable that in the camera system described above, the either or both of the setting state of the camera system and photographic conditions includes any one of: (a) a setting state as to whether or not centering by a centering unit before the start of photography based upon issue of the photographic command by the operator is required, the centering unit controlling the drive unit so that the vibration compensation unit is centered in the approximate center of the movement permitted range; (b) a magnification factor corresponding to a relationship between the shift amount of the vibration compensation unit and the image shift amount upon a surface of the image capturing unit; (c) a photographic exposure time corresponding to a time period that the surface of the image capturing unit is exposed to light from the photographic subject; (d) a type of focusing mode that is set; (e) a type of a flash photography mode that is set; (f) the ON/OFF state of a self timer mode in which self timer photography is performed; (g) the ON/OFF state of a sequential shooting photography mode in which photography is performed a plurality of times in succession; and (h) the ON/OFF state of the vibration compensation.

A camera system in another mode of the present invention comprises a vibration compensation unit that comprises at least one of a vibration compensation optical system that makes an optical axis variable, and an image-capturing unit that can be shifted, and that compensates image vibration upon an image surface occurring due to vibration of the camera, a drive unit that drives the vibration compensation unit, a detection unit that detects vibration of a camera, a position detection unit that detects the position of the vibration compensation unit, a target position determination unit that determines a target position for the vibration compensation unit according to vibration of the camera detected by the detection unit, a calculation unit that calculates a drive amount for the drive unit based upon the target position and the position detected by the position detection unit, a range of movement limitation unit that limits the position of the vibration compensation unit within a certain range of movement, a range setting unit that sets a movement permitted range that is a range within the range of movement in which the vibration compensation unit can be positioned by being driven by the drive unit during vibration compensation, a change unit that changes the movement permitted range after issue of a photographic command by an operator and before photographic processing, and a change amount control unit that, based upon either or both of the setting state of the camera system and photographic conditions, determines a change amount by which the movement permitted range is to be changed by the change unit.

It is desirable that the change amount control unit of the camera system described above sets the movement permitted range to a first magnitude if a setting state of the camera system is "panning" mode, and sets the movement permitted range to a second magnitude if the setting state of the camera system is not "panning" mode. Furthermore, the change amount control unit can set the first magnitude to be larger than the second magnitude.

A camera body according to the present invention comprises a vibration compensation unit that comprises an image-capturing unit that can be shifted, and that compensates image vibration upon an image surface occurring due to vibration of a camera, a drive unit that drives the vibration compensation unit, a detection unit that detects vibration of the camera, a position detection unit that detects the position of the vibration compensation unit, a target position determination unit that determines a target position for the vibration compensation unit according to vibration of the camera detected by the detection unit, a calculation unit that calculates a drive amount for the drive unit based upon the target position and the position detected by the position detection unit, a range of movement limitation unit that limits the position of the vibration compensation unit within a certain range of movement, a range setting unit that sets a movement permitted range that is a range within the range of movement in which the vibration compensation unit can be positioned by being driven by the drive unit during vibration compensation, and a centering unit that controls the drive unit after photography based upon issue of a photographic command by an operator has ended so that the vibration compensation unit is centered in the approximate center of the movement permitted range.

It is desirable that the camera body described above further comprises a changeover unit that changes over between a first mode in which centering is performed by the centering unit before photography is started based upon issue of a photographic command by the operator, and a second mode in which centering is not performed by the centering unit before photography is started based upon issue of a photographic command by the operator. Furthermore, before photography is started based upon issue of a photographic command by the operator, the range setting unit can enlarge the movement permitted range.

It is desirable that the camera body described above further comprises a determination unit that, based upon either or both of the setting state of the camera system and photographic conditions, determines whether or not centering by the centering unit after photography based upon the photographic command issued by the operator has ended is required.

It is desirable that the camera body described above further comprises an image-capturing unit that captures an image of the photographic subject, and a display device that sequentially displays an image as a display image, an image corresponding to an image data created based upon the image sequentially captured by the image-capturing unit, and after photography based upon the photographic command issued by the operator has ended, the centering unit completes the centering before the sequential display of the display image is started.

A camera body in another mode of the present invention comprises a vibration compensation unit that comprises an image-capturing unit that can be shifted, and that compensates image vibration upon an image surface occurring due to vibration of a camera, a drive unit that drives the vibration compensation unit, a detection unit that detects vibration of the camera, a position detection unit that detects the position of the vibration compensation unit, a target position determination unit that determines a target position for the vibration compensation unit according to vibration of the camera detected by the detection unit, a calculation unit that calculates a drive amount for the drive unit based upon the target position and the position detected by the position detection unit, a range of movement limitation unit that limits the position of the vibration compensation unit within a certain range of movement, a range setting unit that sets a movement permitted range that is a range within the range of movement in which the vibration compensation unit can be positioned by being driven by the drive unit during vibration compensation, a centering unit that controls the drive unit before the start of photography based upon issue of a photographic command by an operator so that the vibration compensation unit is centered in the approximate center of the movement permitted range, and a determination unit that determines whether or not centering by the centering unit is required based upon either or both of the setting state of the camera system and photographic conditions.

It is desirable that in the camera body described above, the either or both of the setting state of the camera system and photographic conditions includes any one of: (a) a setting state as to whether or not centering by the centering unit before the start of photography based upon issue of the photographic command by the operator is required; (b) a parameter setting state for white balance processing; (c) the ON/OFF state of a self timer mode in which self timer photography is performed; and (d) the ON/OFF state of vibration compensation.

It is desirable that in the camera body described above, the either or both of the setting state of the camera system and photographic conditions includes all of: (a) a setting state as to whether or not centering by the centering unit before the start of photography based upon issue of the photographic command by the operator is required; (b) a parameter setting state for white balance processing; (c) the ON/OFF state of a self timer mode in which self timer photography is performed; and (d) the ON/OFF state of vibration compensation.

A camera body in another mode of the present invention comprises a vibration compensation unit that comprises an image-capturing unit that can be shifted, and that compensates image vibration upon an image surface occurring due to vibration of a camera, a drive unit that drives the vibration compensation unit, a detection unit that detects vibration of the camera, a position detection unit that detects the position of the vibration compensation unit, a target position determination unit that determines a target position for the vibration compensation unit according to vibration of the camera detected by the detection unit, a calculation unit that calculates a drive amount for the drive unit based upon the target position and the position detected by the position detection unit, a range of movement limitation unit that limits the position of the vibration compensation unit to within a certain range of movement, a range setting unit that sets a movement permitted range that is a range within the range of movement in which the vibration compensation unit can be positioned by being driven by the drive unit during vibration compensation, a change unit that changes the movement permitted range after issue of a photographic command by an operator and before photographic processing, and a control unit that determines whether or not change of the movement permitted range by the change unit is required based upon either or both of the setting state of the camera system and photographic conditions. The change unit can change the movement permitted range based upon issue of a photographic command by the operator.

It is desirable that the camera body described above further comprises a centering unit that controls the drive unit before the start of photography based upon issue of the photographic command by the operator so that the vibration compensation unit is centered in the approximate center of the movement permitted range, and a mode setting unit that sets either a first mode in which centering is performed by the centering unit, or a second mode in which centering is not performed by the centering unit, and the control unit makes a decision in which change of the movement permitted range by the change unit and to perform centering by the centering unit are performed if the first mode is set and makes a decision in which change of the movement permitted range by the change unit is performed and centering by the centering unit is not performed if the second mode is set.

A camera body in another mode of the present invention comprises a vibration compensation unit that comprises an image-capturing unit that can be shifted, and that compensates image vibration upon an image surface occurring due to vibration of a camera, a drive unit that drives the vibration compensation unit, a detection unit that detects vibration of the camera, a position detection unit that detects the position of the vibration compensation unit, a target position determination unit that determines a target position for the vibration compensation unit according to vibration of the camera detected by the detection unit, a calculation unit that calculates a drive amount for the drive unit based upon the target position and the position detected by the position detection unit, a range of movement limitation unit that limits the position of the vibration compensation unit within a certain range of movement, a range setting unit that sets a movement permitted range that is a range within the range of movement in which the vibration compensation unit can be positioned by being driven by the drive unit during vibration compensation, a change unit that changes the movement permitted range after issue of a photographic command by an operator and before photographic processing, and a change amount control unit that, based upon either or both of the setting state of the camera system and photographic conditions, determines a change amount by which the movement permitted range is to be changed by the change unit. The change amount control unit can set the movement permitted range to a first magnitude if a setting state of the camera system is "panning" mode, and sets the movement permitted range to a second magnitude if the setting state of the camera system is not "panning" mode. In this case, the change amount control unit may set the first magnitude to be larger than the second magnitude.

BRIEF DESCRIPTION OF THE DRAWINGS

FIG. 9 is a circuit diagram of a Hall element 44a and a Hall element processing unit 202a;

BEST MODE FOR CARRYING OUT THE INVENTION

In the following, preferred embodiments for implementing the present invention will be explained with reference to the figures.

The First Embodiment 1-1 Explanation of the Overall Structure

Figure 1:
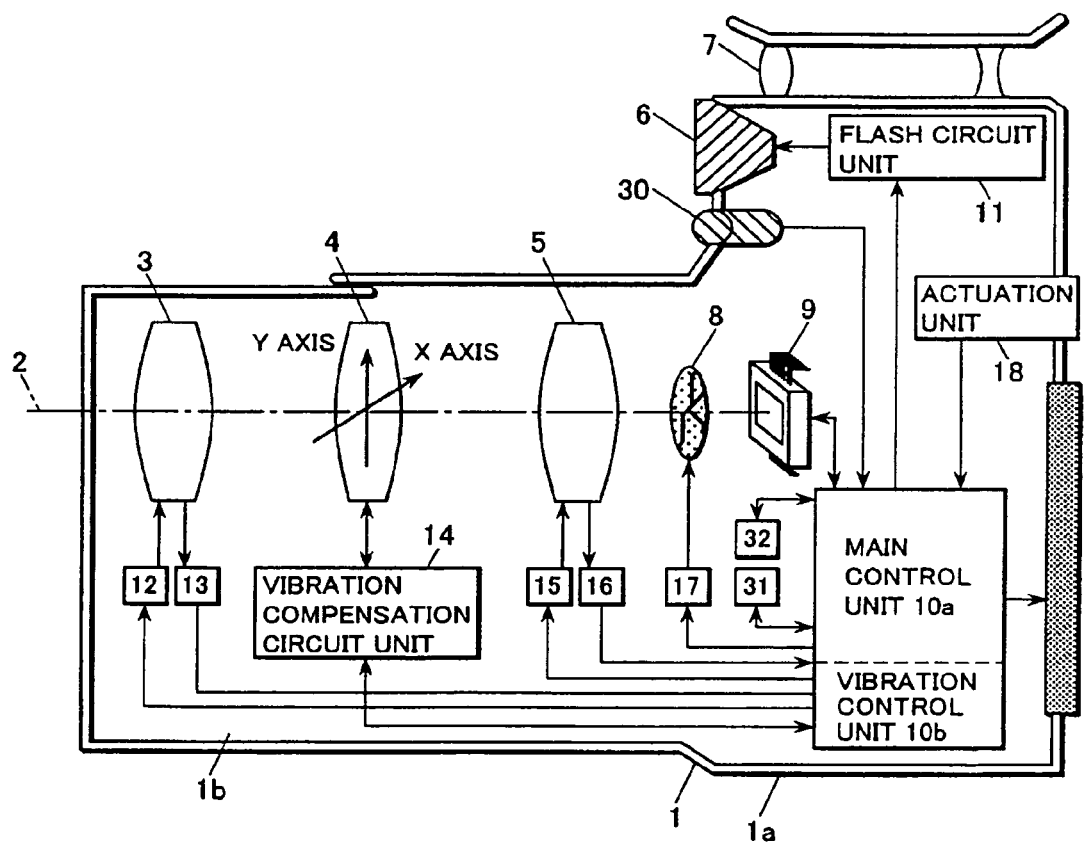
FIG. 1 is a block diagram of a camera that is equipped with a vibration compensation device according to a first embodiment.

FIG. 1 is a block diagram showing a camera that is equipped with a vibration compensation device according to the present invention. Here, the concrete example given is a digital still camera. This camera 1 includes a zoom lens 3, a compensation lens 4, a focusing lens 5, a flash unit 6, an optical viewfinder 7, a shutter 8, an image sensor 9, a control unit 10, a flash circuit unit 11, a zoom lens drive unit 12, a zoom lens position detection unit 13, a vibration compensation circuit unit 14, a focusing lens drive unit 15, a focusing lens position detection unit 16, a shutter drive unit 17, an actuation unit 18, an external liquid crystal monitor 19, a sound gathering unit 30, a non-volatile storage medium 31, and an actuation sound generation unit 32.

The control unit 10 consists of a one chip micro computer and so on, and undertakes overall control of this camera 1. This control unit 10, functionally, is divided into a main control unit 10a and a vibration control unit 10b, but in reality it is built as a single control means. However, this is not to be considered as limitative. For example, the main control unit 10a might include a number of control blocks, and might be constructed from a plurality of one chip microcomputers, or the like. Furthermore, it would also be acceptable for the vibration control unit 10b to be made as an independent one chip computer or the like, and to communicate by serial communication or the like with each of the control blocks, so as to perform the same operations.

The zoom lens 3, the compensation lens 4 for image vibration compensation, and the focusing lens 5 that are provided within the lens barrel 1b constitute a photographic optical system. And an image capturing optical system images light from the photographic subject upon the image sensor 9, that is provided in the camera body 1*a*. The main control unit 10*a* that controls this image sensor 9 performs image processing upon the signal from the image sensor 9, and displays the results of photography and so on upon the external liquid crystal monitor 19. Moreover, according to requirements, this main control unit 10*a* may perform storage of a photographic image in the non-volatile storage medium 31 such as a flash memory or the like, or may read out a photographic image that is stored in the non-volatile storage medium 31.

The zoom lens drive unit 12 drives the zoom lens 3 in the direction of the photographic optical axis 2. And the zoom lens position detection unit 13 detects the position of the zoom lens 3. The main control unit 10*a* drives the zoom lens 3 along the direction of the photographic optical axis 2 based upon this position of the zoom lens 3 that has been detected, and thereby varies the photographic focal point distance of the photographic optical system.

The focusing lens drive unit 15 drives the focusing lens 5 in the direction of the photographic optical axis 2. And the focusing lens position detection unit 16 detects the position of the focusing lens 5. The main control unit 10*a* drives the focusing lens 5 along the direction of the photographic optical axis 2 based upon this position of the focusing lens 5 that has been detected, and thereby adjusts the focus state of the image of the photographic subject that is imaged upon the image capture surface of the image sensor 9. And, using some known technique, the main control unit 10*a* performs focus detection of the image of the photographic subject that is imaged upon the image sensor 9. For example, the amount of contrast may be detected based upon the captured image that is obtained from the image sensor 9, and the position of the focusing lens 5 at which the amount of contrast attains its extreme value may be decided as being the focused position.

The main control unit 10*a* controls the shutter 8 using the shutter drive unit 17, and performs opening and closing of the shutter 8 at the required timings. If flash photography is to be performed, then, via the flash circuit unit 11, the main control unit 10*a* causes the flash unit 6 that uses a xenon tube or the like to emit light at the required timing. Furthermore, by using the actuation unit 18 that is connected to the main control unit 10*a*, it is possible for input of information and settings for photographic mode and the like to be performed by the user. The information that has been set, such as photographic mode and the like, may be displayed with the external liquid crystal monitor 19.

The main control unit 10*a* is able to capture the ambient sound around this camera 1, that has been obtained from the sound gathering unit 30, and to store this sound upon the non-volatile storage medium 31, or to read out captured data from the non-volatile storage medium 31. And, when the power supply (not shown in the figures) of this camera 1 has been started or when its actuation unit 18 has been actuated, during either self timer photography or photography, the main control unit 10*a* is able to cause the generation of respectively corresponding sounds by the actuation sound generation unit 32 comprising a sound pressure buzzer or speaker, and a drive circuit thereof or the like.

1-2. The Compensation Lens Drive Mechanism

Figure 2:
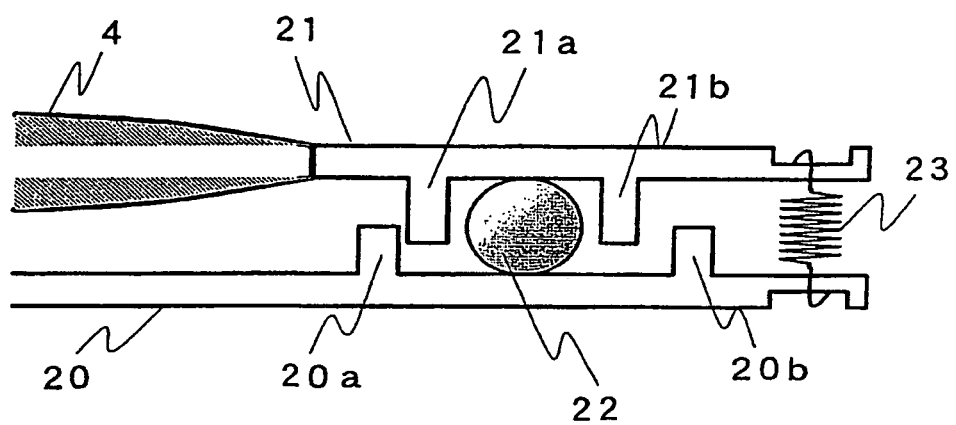
FIG. 2 is a schematic figure showing a compensation lens drive mechanism.

Next, an account will be given of the drive mechanism and of the position detection mechanism of the compensation lens 4. FIG. 2 is a schematic figure showing this drive mechanism. This drive mechanism is for shifting the compensation lens 4 held by the movable element 21 in almost mutually orthogonal directions within a plane that is orthogonal to the photographic optical axis 2. A slide ball 22 is disposed between a fixed element 20 fixed to a member of the lens barrel unit 1*b* of the camera 1 and the movable element 21. Due to the movable element 21 being biased in the direction of the fixed element 20 by a biasing spring 23, the slide ball 22 is gripped between the fixed element 20 and the movable element 21.

In this embodiment, three pairs of the slide ball 22 and the bias spring 23 are provided. By each of the slide balls 22 rotating, or sliding, between the fixed element 20 and the movable element 21, the compensation lens 4 is able to shift smoothly within a plane that is approximately orthogonal to the photographic optical axis 2 (refer to FIG. 1). It should be understood that movable element projections 21*a* and 21*b* are provided upon the movable element 21 so as to surround the slide balls 22, and fixed element projections 20*a* and 20*b* are provided upon the fixed element 20. Due to these projections, along with the slide balls 22 being kept within the desired positional range, also the range of mechanical movement of the movable element 22 is limited.

Figure 3:
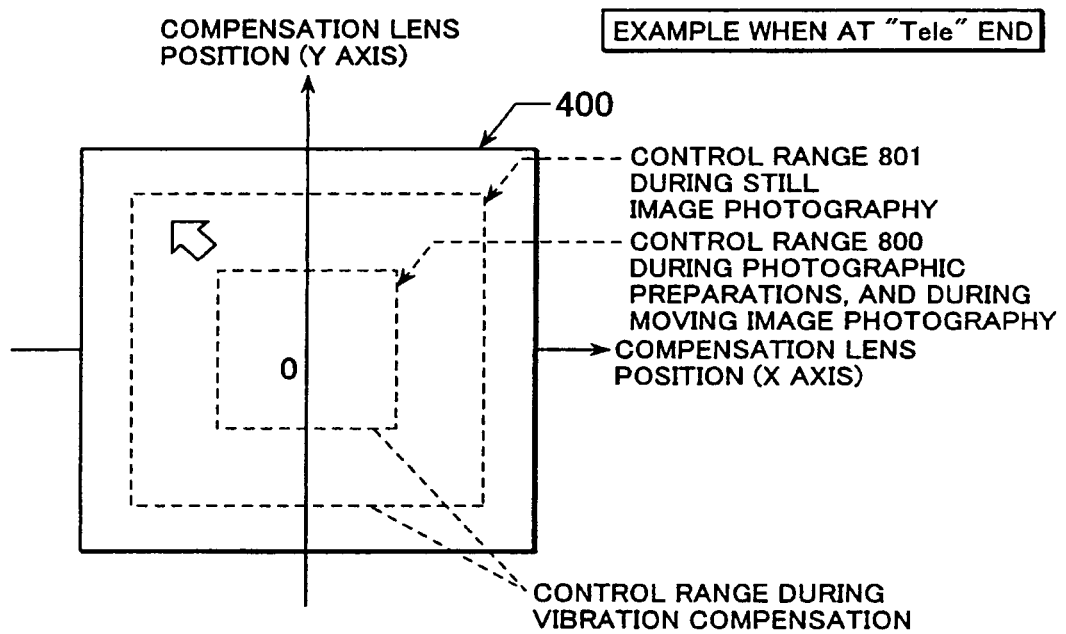
FIG. 3 is a figure showing the range of movement and the control range of a compensation lens.

FIG. 3 is a figure showing an example of the range of movement of the compensation lens 4. The shifting of the compensation lens 4 is limited by the movable element projections 21*a* and 21*b* and the fixed element projections 20*a* and 20*b* within a square shaped range of movement 400, the length of one of whose sides is taken as being 2×LR range. It should be understood that although, in this embodiment, the shape of the range of movement 400 of the compensation lens 4 has been made to be square, this is not to be considered as being limitative; it may be shaped as rectangular, or as a rectangular octagon or the like.

Figure 4:
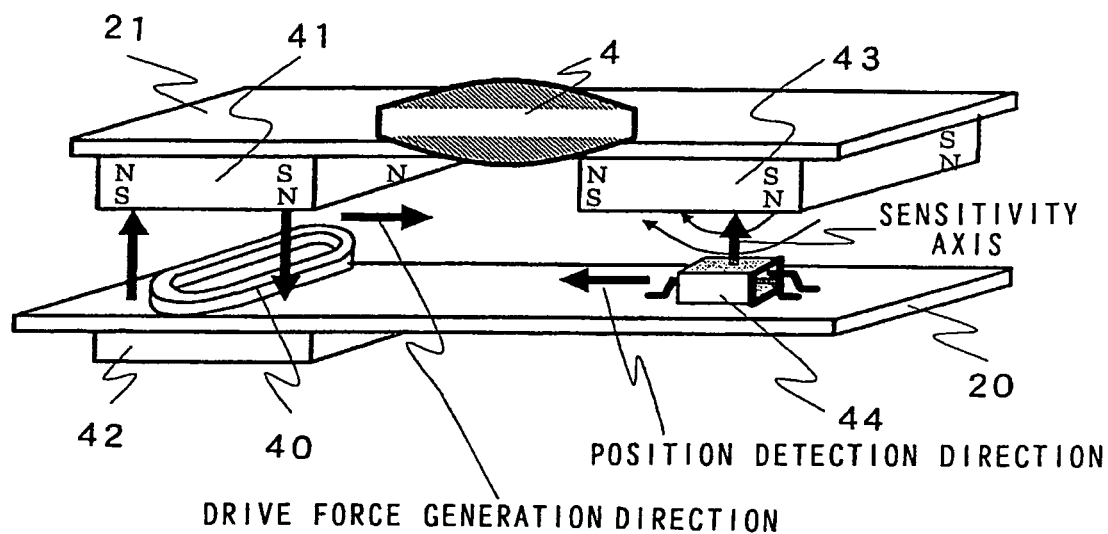
FIG. 4 is a schematic figure showing a compensation lens drive mechanism and a compensation lens position detection mechanism.

Next, the position detection mechanism of the compensation lens 4 and a mechanism for driving the compensation lens 4 in the plane orthogonal to the photographic optical axis 2 will be explained using FIG. 4. FIG. 4 is a figure schematically showing the drive mechanism and the position detection mechanism of the compensation lens 4. The structure is such that a magnet for position detection 43 that is provided to the movable element 21 and a Hall element 44 that is provided to the fixed element 20 are arranged so as to be mutually opposed to one another, so that the magnetic flux in the direction of the axis of sensitivity of the Hall element 44 changes almost proportionally to the shifting of the compensation lens 4. Generally, the output of a Hall element becomes almost zero when the magnetic flux is zero, and the output voltage changes in proportion to the magnitude of the magnetic flux. Accordingly, it becomes possible to detect the position of the compensation lens 4 by checking the output of the Hall element 44.

A magnet 41 for driving is disposed upon the movable element 21*d* so as to oppose a coil 40 is arranged upon the fixed element 20 so as to oppose to the magnet 41, and moreover a yoke 42 is disposed upon the opposite surface of the fixed element 20 to the coil 40. An electromagnetic force is generated upon the movable element 21 in proportion to the electrical current that flows in the coil 40, and drives the compensation lens 4. Two position detection mechanisms and two drive mechanisms for the compensation lens 4 having the structure described above are provided, one in the direction of each of two orthogonal axes (one of which will be termed the X axis and the other the Y axis). Due to this it becomes possible to drive the compensation lens 4 to any position within its range of movement 400 within a plane that is orthogonal to the photographic optical axis, and moreover it becomes possible to detect the position of the compensation lens 4.

1-3. The Actuation Unit 18

Figure 5:
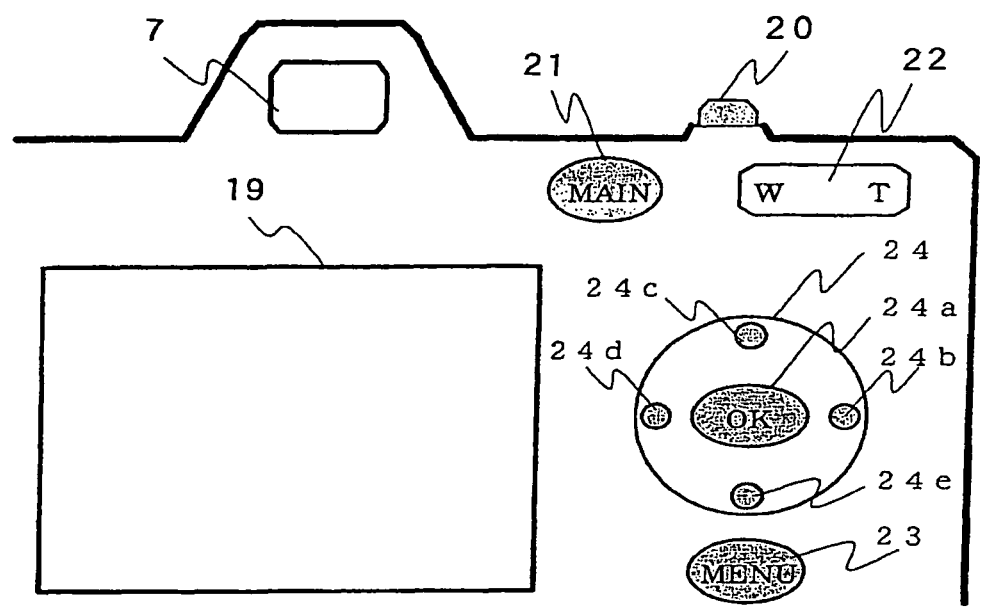
FIG. 5 is a schematic figure showing actuation members and so on of this camera.
Figure 6:
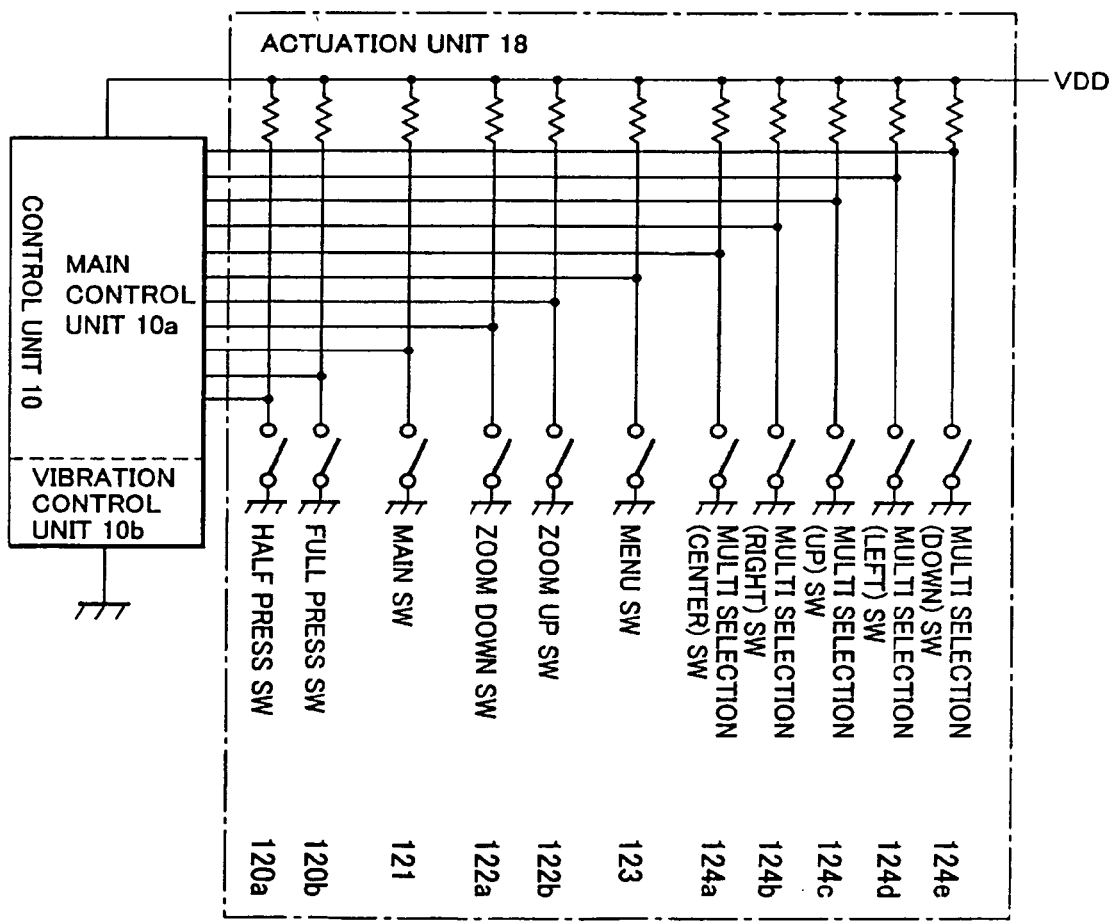
FIG. 6 is a circuit diagram of an actuation unit 18.

FIG. 5 is a figure showing the rear surface of this camera 1, and shows an example of the arrangement of various members of the actuation unit 18 that are related to the present invention, as well as that of the liquid crystal monitor 19, that is needed for setting various modes. Moreover, FIG. 6 is a circuit diagram showing the connections between the control unit 10 that includes the main control unit 10a, and the actuation unit 18. As will be described hereinafter, each of various buttons that are included in the actuation unit 18 operates together with a switch, so that, when each of these buttons is actuated, the corresponding switch is turned ON.

Each of the switches shown in FIG. 6 is pulled up to the same power supply VDD connected to the main control unit 10a by a resistor, and moreover is connected to the main control unit 10a. Due to this, when each of these buttons is not actuated the corresponding switch is OFF and outputs high level signal to the main control unit 10a. Furthermore, when each of the buttons is actuated the corresponding switch is ON and outputs low level signal to the main control unit 10a. Due to this, according to the signal levels from the various switches, the main control unit 10a is able to recognize actuation of the buttons corresponding to these switches.

It is arranged for a half press switch 120a to be turned ON by a release button 20 being pressed down to midway through its pressing down stroke, and for a full press switch 120b to be turned ON by the release button 20 being pressed down more deeply from this state. By this release button 20 being pressed down, operations such as starting photographic operation and so on, to be described hereinafter, are performed. When the full press switch 120b is turned ON, the control unit 10 decides that the operator has performed actuation to command photography. In a similar manner, a main switch 121 operates corresponding to the actuation of a main button 21, and a menu switch 123 corresponding to that of a menu button 23. And a zoom lever 22 turns a zoom down switch 122a ON by being pushed over to the left and turns a zoom up switch 122b ON by being pushed over to the right. Moreover, as will be described hereinafter, the operation of this camera 1 is started or stopped by pressing the main button 21.

When the menu button 23 is pressed, as described hereinafter, a setting menu is displayed upon the external liquid crystal monitor 19, and it becomes possible to perform settings for various types of mode and the like with a multi selector 24. When the zoom lever 22 is pushed over to the left, the zoom lens 3 is driven and the photographic focal point distance is changed over to the wide side; and, conversely, when the zoom lever 22 is pushed over to the right, the photographic focal point distance is changed over to the "tele" side. The multi selector 24 consists of a plurality of buttons and of switches that operate together with these buttons. A multi selector button 24a in the center operates together with a multi selection (center) switch 124a; a multi selector button 24b on the right side operates together with a multi selection (right) switch 124b; a multi selector button 24c on the upper side operates together with a multi selection (up) switch 124c; a multi selector button 24d on the left side operates together with a multi selection (left) switch 124d; a multi selector button 24e on the lower side operates together with a multi selection (down) switch 124e.

2. Various Kinds of Mode Setting

Figure 7:
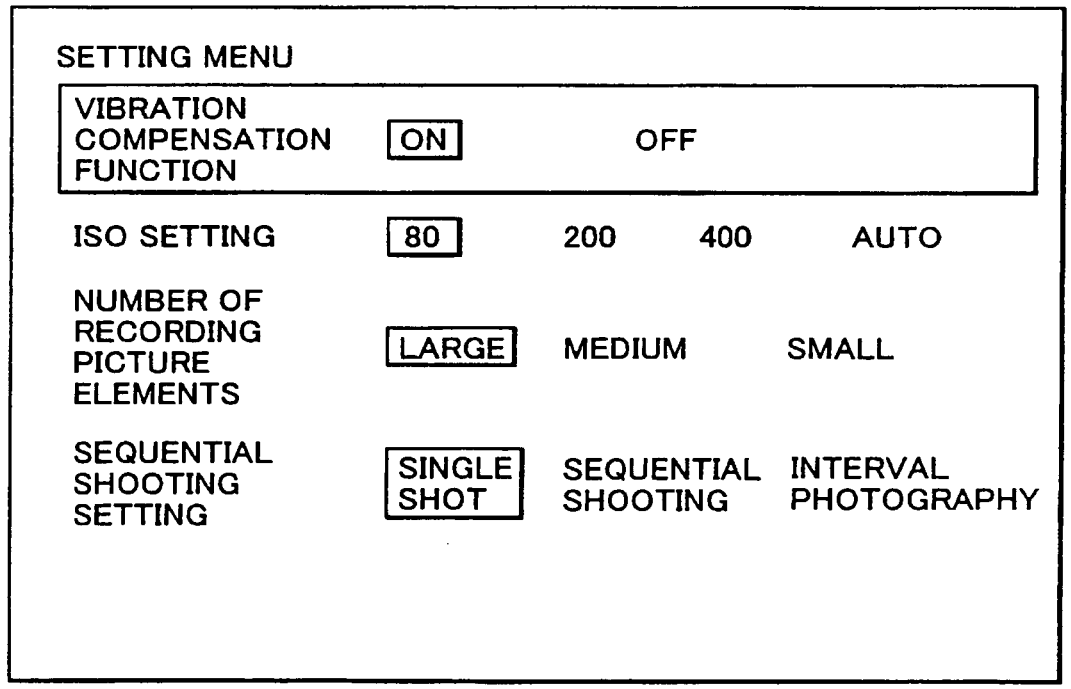
FIG. 7 is a figure showing an example of display upon an external liquid crystal monitor 19.

Next, various types of mode that are set by actuating the various buttons described above will be explained. Not only the photographic mode but also various other types of mode, and various types of photographic condition and other settings and changes related to the present invention, may be performed with the menu button 23, the multi selector 24, and the external liquid crystal monitor 19. First, the user presses the menu button 23, and displays a setting menu upon the external liquid crystal monitor 19, as shown in FIG. 7. It should be understood that FIG. 7 is a figure showing an example of a setting menu, and is not to be construed as being limitative.

Next, by actuating the multi selector button 24c and the multi selector button 24e of the multi selector 24, the user shifts the portion displayed upon the external liquid crystal monitor 19 that is currently being selected (in the example of FIG. 7, this is the portion surrounded by a thick rectangular frame, i.e. "vibration compensation function"), and chooses the item that he wants to change or set. And, by actuating the multi selector button 24b or the multi selector button 24d of the multi selector 24, the user changes or sets the setting of the item that is chosen (in the example of FIG. 7, "vibration compensation function"). In the example shown in FIG. 7, the present setting is the one surrounded by a rectangular frame, and it is possible to change the setting of "ON" and "OFF" by pressing the multi selector button 24b or the multi selector button 24d. The main control unit 10a recognizes whether each of the switches, that are moved together with user actuation of the menu button 23 and the multi selector 24, is ON or OFF, causes the result thereof to be displayed upon the external liquid crystal monitor 19, and performs settings and changes of various modes, various photographic conditions, and other settings.

3. Explanation of the Vibration Control Unit 10b and the Vibration Compensation Circuit Unit 14

3-1. Vibration Detection

Next, the vibration control unit 10b and the vibration compensation circuit unit 14 will be explained with reference to FIG. 8. Vibration gyros 200a and 200b are arranged within this camera 1 so that the directions in which their angular velocities are detected coincide with the X axis and the Y axis position detection directions of the compensation lens 4. These vibration gyros 200a and 200b detect the vibration of the camera 1, and output the results of their detection to the vibration control unit 10b via vibration gyro processing units 201a and 201b. The vibration control unit 10b includes in its interior an A/D converter (not shown in the figures) that converts the analog signals of the vibration gyro processing units 201a and 201b to digital values. And the vibration control unit 10b converts the outputs from the vibration gyro processing units 201a and 201b to digital values with this A/D converter, and detects the angular velocities in the X axis direction and the Y axis directions of the vibration engendered in the camera 1 based upon these digital signals.

It should be understood that, as far as the concrete details and the circuit structure and the method of detection are concerned, a known technique may be utilized, for example the technique according to Japanese Laid-Open Patent Publication Heisei 11-344340, that is an application by the present applicant. Moreover, by integrating the angular velocity dimension of the detected vibration angular velocity and converting it into a positional dimension according to, for example, the known technique of Japanese Laid-Open Patent Publication Heisei 9-80512, that is an application by the present applicant, or the like, a target position for the compensation lens 4 in order adequately to compensate for the vibration occurring in the camera 1 (hereinafter simply termed the "target position Lc") is calculated.

3-2. Compensation Lens Position Detection

The detection of the position of the compensation lens 4 is performed by the outputs of the X axis Hall element 44a and of the Y axis Hall element 44b being processed by the Hall element processing circuit units 202a and 202b respectively, and being outputted to the vibration control unit 10b. The vibration control unit 10b includes in its interior an A/D converter (not shown in the figures) that converts the analog signals from the Hall element processing units 202a and 202b to digital values. And the vibration compensation control unit 10b converts the outputs from the Hall element processing units 202a and 202b to digital values with this A/D converter, and thereby detects the positions of the compensation lens 4 in the X axis direction and the Y axis direction (hereinafter these will be termed the "compensation lens position Lr(X)" and the "compensation lens position Lr(Y)"). Or, the vibration compensation control unit 10b may read out the A/D conversion values outputted by the Hall element processing units 202a and 202b with A/D conversion units 251a of hardware control units 206a and 206b that will be described hereinafter, and may thereby obtain the compensation lens position Lr(X) and the compensation lens position Lr(Y).

Figure 9:
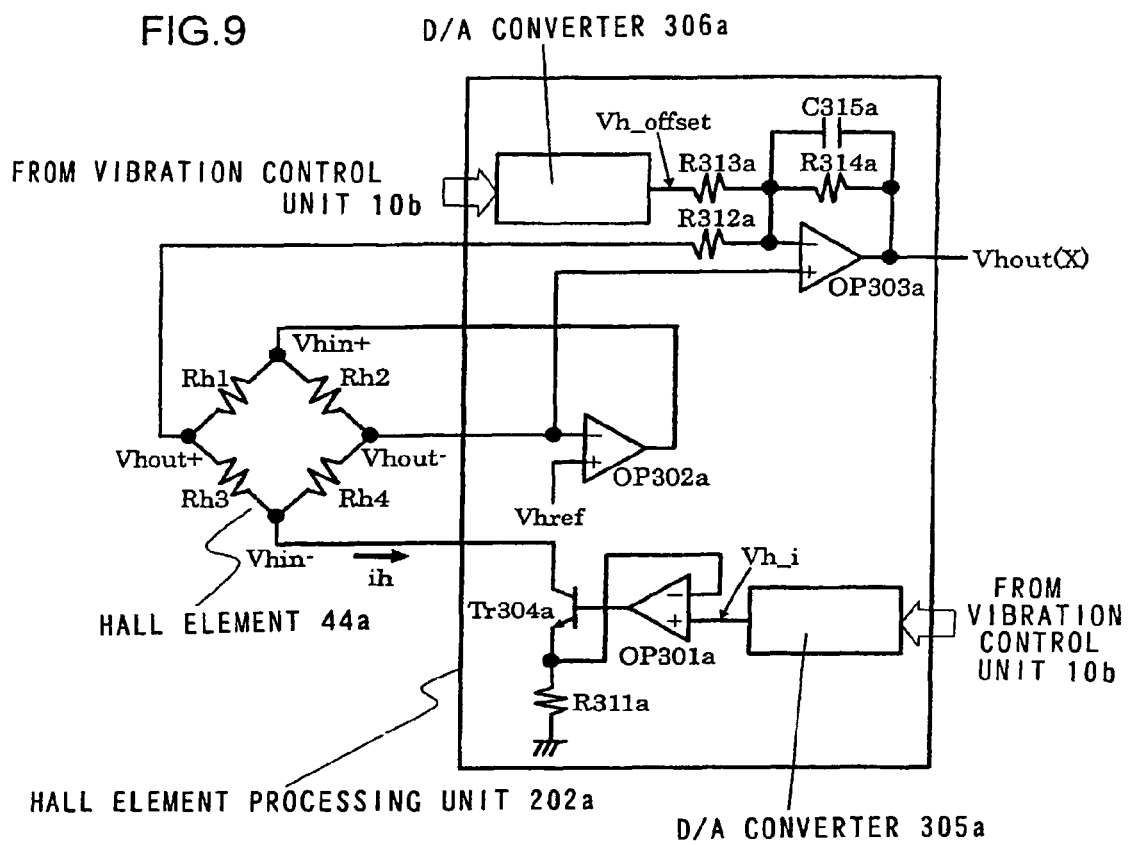

The Hall element processing units 202a and 202b will now be further explained using a concrete circuit diagram. FIG. 9 shows a concrete example of the Hall element processing unit 202a that relates to the Hall element 44a for detection in the X axis direction. The Hall element processing unit 202b for the Y axis direction is identical. As shown in FIG. 9, this Hall element 44a may be equivalently expressed as a bridge circuit of resistances Rh1, Rh2, Rh3, and Rh4.

Generally, when the magnetic field is zero, a Hall element is in a balanced state in which the resistances Rh1, Rh2, Rh3, and Rh4 are constant, and the electrical potential difference between the outputs Vhout– and Vhout+ is almost zero. When in this state a magnetic field is applied, the ratios of the resistances Rh1, Rh2, Rh3, and Rh4 change, and a potential difference is created between the outputs Vhout– and Vhout+. Along with this potential difference between the outputs Vhout– and Vhout+ being proportional to the magnitude of the magnetic field, it is also proportional to the electrical current flowing in the Hall element—in concrete terms, to the electrical current flowing from its input Vhin+ to Vhin–.

Accordingly, as shown in FIG. 9, the Hall element 44a is constant current driven by a constant current circuit that is made up from an operational amplifier OP 301a, a D/A converter 305a, a transistor Tr304 and a resistor R311a. If the resistance value of the resistor R311a is taken as being r311a and the value of the output voltage Vhi of the D/A converter 305a is taken as being vh_i, then it is possible to drive the Hall element 44a at a constant current ih that is proportional to the output voltage Vhi of the D/A converter 305a. Here, the current ih is given as in Equation (1). Due to this, by setting the output voltage Vhi of the D/A converter 305a appropriately, it is possible to adjust for the Hall element 44a having a varying sensitivity characteristic upon manufacture, and moreover for variations of sensitivity that occur due to temperature.

$$ih \approx vh\_i/r311a \qquad (1)$$

The circuit of FIG. 9 consisting of the reference power supply Vhref and the operational amplifier OP 302a operates so as to maintain one of the output voltages Vhout– of the Hall element 44a at the reference voltage vhref. The reference voltage vhref of the reference power supply Vhref is generated, for example, by a three terminal regulator or the like. And the circuit that consists of the operational amplifier OP 303a, the D/A converter 306a, the resistors R312a, R313a and R314a, and the condenser C315a, along with operating to invert and amplify the potential difference between the outputs Vhout– and Vhout+ of the Hall element 44a and output-ting it, also operates to invert, add, and amplify the output voltage Vhoffset of the D/A converter 306a to the output Vhout– that has been kept at the reference voltage vhref by OP 302a and outputs it.

When the resistance values of the resistors R312a, R313a, and R314a are taken as r212a, r313a, and r314a respectively, and, taking the reference voltage vhref as a reference, the output voltage Vhout+ of the Hall element 44a and the output voltage Vhoffset of the D/A converter 306a are taken as vhout and vhoffset, then the voltage vhout(X) of the output Vhout (X) from the Hall element processing unit 202a is given by Equation (2). It should be understood that G0=r314a/r312a and G1=r314a/r313a.

$$vhout(X) \approx vhref - G0 \times (vhout) - G1 \times vhoffset \qquad (2)$$

From the above, it is possible to adjust the offset voltage of the output Vhout(X) of the Hall element processing unit 202a by actuating the D/A converter 306a and causing the voltage vhoffset of its output Vhoffset to vary.

The output voltage of an ideal Hall element becomes zero when the magnetic field is zero. However, in reality, due to the fact that imbalances occur during manufacture in the resistors Rh1, Rh2, Rh3 and Rh4 that constitute the Hall element 44a, and due the fact that the temperature of use changes, the potential difference between the outputs Vhout– and Vhout+ does not become zero. Furthermore, an input offset voltage of the operation amplifier 303a also occurs. Moreover, due to dimensional variation of the position dimension mechanism of the compensation lens 4, the magnetic field in the sensitivity axis direction of the Hall element 44a does not necessarily become zero at the center of the range of movement of the compensation lens 4.

From the above facts, the output Vhout of this Hall element processing unit 202a does not necessarily become the desired voltage. In this case, the output Vhout(X) of the Hall element processing unit 202a can be offset adjusted to the desired voltage by actuating the D/A converter 306a and varying the voltage vhoffset of the output Vhoffset.

The above described D/A converters 305a and 306a are both connected to the vibration control unit 10b, and are controlled by the vibration control unit 10b. Due to this, along with adjusting the Hall element drive current ih, it is also possible to adjust the offset voltage included in the output Vhout(X) of the Hall element processing unit 202a due to variations of sensitivity of the Hall element 44a, due to changes of sensitivity due to temperature fluctuations, and due to the offset voltage of the Hall element 44a, and the like.

Figure 10:
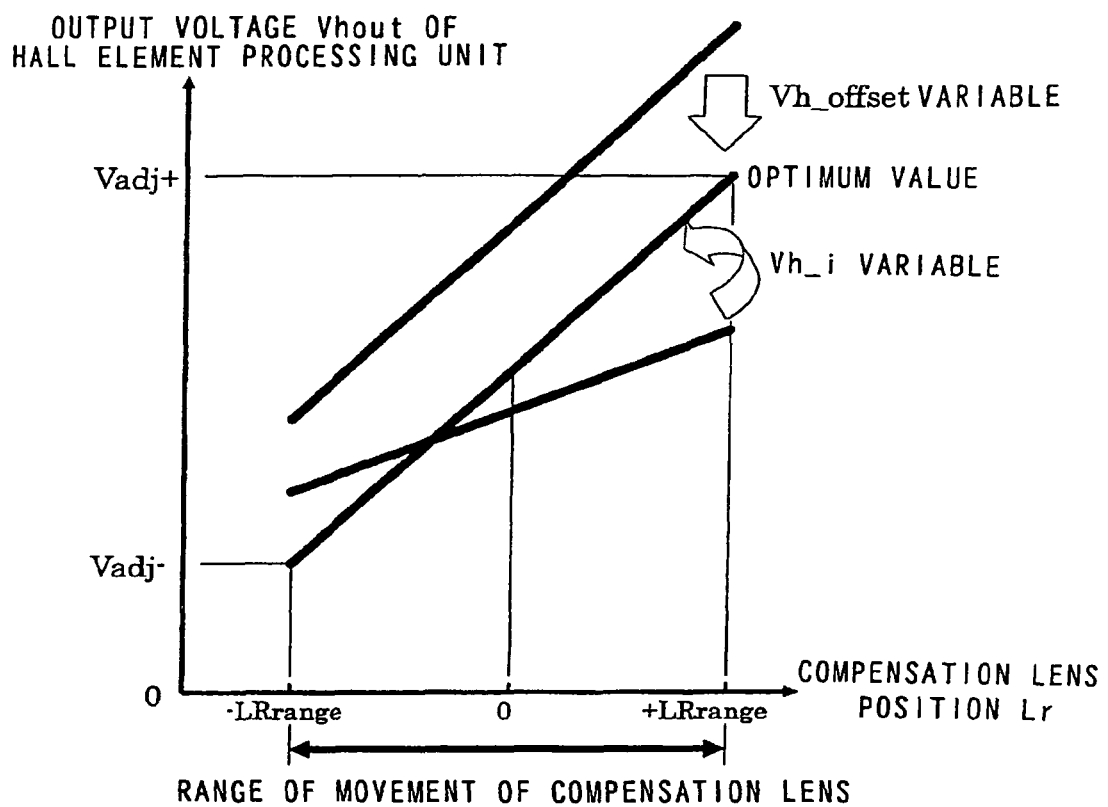
FIG. 10 is a figure showing the relationship between the position of the compensation lens and the output of the Hall element processing unit.

FIG. 10 shows the situation with these adjustments. By actuating the D/A converter 305a and varying the voltage of the output Vhi, the vibration control unit 10b is able to vary the amount of change of the output voltage vhout of the Hall element processing unit 202a with respect to the position Lr of the compensation lens (that corresponds to the inclination of the graph of FIG. 10). Furthermore, by actuating the D/A converter 306a and varying the voltage of the output Vhoffset, the vibration control unit 10b is able to shift the output voltage vhout of the Hall element processing unit 202a. By these adjustments, it becomes possible to obtain the desired output from the Hall element processing unit 202a. In FIG. 10, within the range of movement of the compensation lens 4 (a range of ±LRrange for the compensation lens position Lr), the output of the Hall element processing unit 202a is adjusted so that it falls within the desired output range from Vadj– to Vadj+.

It should be understood that, if the resistance value r312a of the resistor R312a is too small, the current that flows in the resistor R312a from the output Vhout+ of the Hall element 44a becomes large, and it is necessary for this to be an appropriate value, since if this is erroneous it exerts an influence upon the detection linearity of the output of the Hall element. Furthermore, in order for the condenser C315a to eliminate unnecessary high frequency noise during position detection of the compensation lens 4, it should be set to an appropriate capacity value.

3-3. Driving of the Compensation Lens 4

When the compensation lens position has been detected and the target position Lc has been calculated, a drive amount for the compensation lens 4 is calculated based upon these, so as to compensate for the vibration of the camera 1 that has occurred. With regard to the drive amount for the compensation lens 4, as described hereinafter, a drive amount Ds(X) for software control and a drive amount Dh(X) for hardware control are calculated. The method by which these drive amounts are calculated will be described hereinafter; here, returning to FIG. 8, the method for driving the compensation lens 4 is explained. When the drive amount for the compensation lens 4 has been calculated, then, in order actually to move the compensation lens 4, electricity is passed through the coils 40a and 40b based upon this calculated drive amount. It should be understood that although, for this driving of the compensation lens 4, drive control is performed for two axes, i.e. the X axis and the Y axis, in the following only the process relating to the X axis will be described, since they are the same.

The drive amount Ds(x) and the drive amount Dh(X) that have been calculated are sent to a changeover unit 205a of the vibration compensation circuit unit 14. This changeover unit 205a selects one or the other of the drive amount Ds(X) and the drive amount Dh(X) according to a changeover signal a from the vibration control unit 10b, and outputs the selected drive amount to a PWM conversion unit 204a. It should be understood that the conditions under which the drive amount Ds(x) and the drive amount Dh(X) are changed over by the changeover signal will be described hereinafter.

The PWM conversion unit 204a converts the drive amount for the compensation lens 4, that has been changed over by the changeover unit 205a, to a PWM (Pulse Width Modulation) waveform by a known technique. This PWM waveform that has been converted is then fed by the drive unit 203a through the coil (X) 40a as an electrical current, by a known technique. For the drive unit 203a, generally, an H-bridge type is used, and thereby the coil 40a is driven by a PWM waveform with good efficiency. It should be understood that a power supply VP of a power system is supplied to the drive unit 203a, and the current is flowed through the coil 40a by this power supply VP.

4. Explanation of Calculation of the Drive Amount

Next, an account will be given related to the method of calculation of the drive amount for the compensation lens 4. In this embodiment, as the drive amount for the compensation lens 4, two types of drive amount are calculated: a drive amount Ds(X) for software control, and a drive amount Dh(x) for hardware control. And these are used by being changed between according to predetermined conditions. First, concrete methods for this software control and hardware control will be explained.

4-1. Software Control

In the case of software control, a drive amount Dh for the compensation lens 4 by software is calculated by the vibration control unit 10b, and the compensation lens 4 is driven based upon this drive amount Dh. In this case, the target position Lc that is calculated based upon the output of the vibration detection unit changes from one moment to the next, according to the vibration occurring in the camera 1; and, moreover, the position Lr of the compensation lens 4 also changes. Accordingly it is necessary to control the compensation lens 4 in real time, and it is also necessary to control the calculation of the drive amount, described hereinafter, in real time as well. In concrete terms, it will be supposed that the calculation of the drive amount that is performed by the vibration control unit 10b is performed at a predetermined time period that is sufficiently short (this control sampling period will be termed ts).

Figure 11:
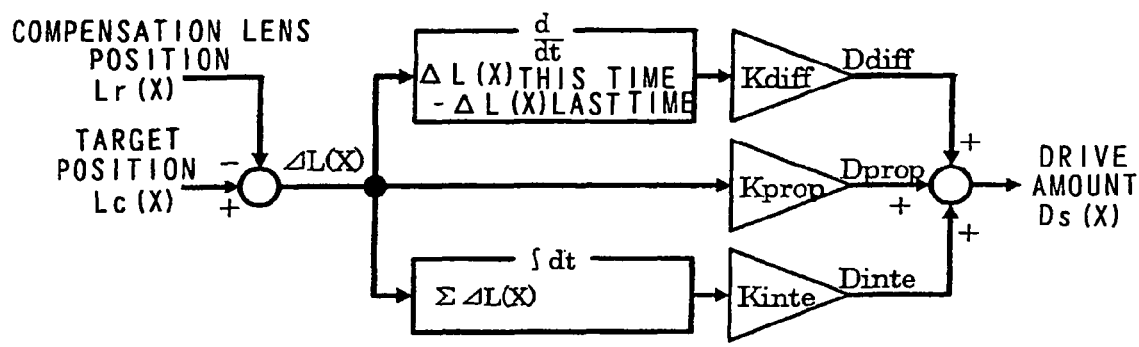
FIG. 11 is a block diagram of the software control of the compensation lens 4 by the vibration control unit 10b.

FIG. 11 is a block diagram showing the way in which the calculation of the drive amount Ds(X) is performed by the vibration control unit 10b. In the following, only the calculation for the X axis will be explained. Since the calculation for the Y axis is the same, explanation thereof will be omitted. First, the vibration control unit 10b calculates the difference $\Delta L(X)$ between the target position Lc(X) of the compensation lens 4 and the compensation lens position Lr(X). $\Delta L$ corresponds to the control error, since it is the difference between the actual position of the compensation lens 4 and its target position.

$$\Delta L(X) = Lc(X) - Lr(X) \tag{3}$$

Next, based upon the control error $\Delta L(X)$, the vibration control unit 10b calculates each of a proportional term drive amount Dprop, an integration term drive amount Dinte, and a differential term drive amount Ddiff, as shown in Equations (4) through (6). And the vibration control unit 10b calculates the drive amount Ds(X) for the compensation lens 4 by adding these together, as in Equation (7):

$$D\text{prop} = K\text{prop} \times \Delta L(X) \tag{4}$$

$$D\text{inte} = K\text{inte} \times \Sigma(\Delta L(X)) \tag{5}$$

$$D\text{diff} = K\text{diff} \times (\Delta L(X) \text{this time} - \Delta L(X) \text{the previous time}) \tag{6}$$

$$Ds(X) = D\text{prop} + D\text{inte} + D\text{diff} \tag{7}$$

Here, since this calculation is performed every control sampling period ts, the value $\Sigma\Delta L(X)$ in Equation (5) means that the control error $\Delta L$ is integrated at the predetermined interval of ts, and this may be almost considered as integration. In a similar manner, the value $\Delta L(X)$ the previous time in Equation (6) means the value $\Delta L(X)$ one control sampling period before. Due to this, the value "$\Delta L(X)$ this time−$\Delta L(X)$ the previous time" in Equation (6) means the amount of change of the control error $\Delta L$ during the predetermined interval ts, and this may be almost considered as differentiation. Accordingly, calculating the drive amount with Equations (4) through (7), and controlling the compensation lens with this calculated drive amount, is the case of so called PID (proportional-integral-derivative) control. It should be understood that the initial value of $\Sigma\Delta L(X)$ is taken as being zero directly before the starting of compensation lens control. Furthermore, the initial value of $\Delta L(X)$ the previous time is taken as being the compensation lens position Lr(X) directly before the starting of compensation lens control.

Figure 12:
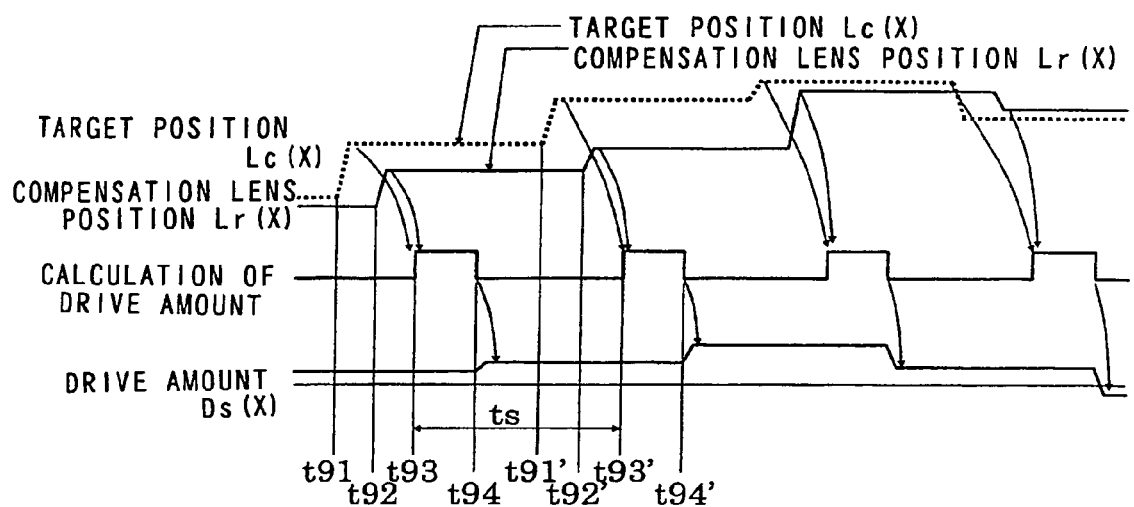
FIG. 12 is a timing chart showing the compensation lens drive amount calculation timing of the software control of the compensation lens by the vibration control unit 10b.

FIG. 12 is a timing chart showing a concrete example of the timing of this drive amount calculation in software by the vibration control unit 10b. First, at the timing t91, the calculation of the target position Lc(X) for the compensation lens 4 and the updating of its value are performed. And, at the timing t92, the calculation of the compensation lens position Lr(X) and updating of its value are performed. Based upon this target position Lc(X) and the compensation lens position Lr(X), the calculation of the drive amount Ds(X) for the compensation lens 4 is started from the timing t93, and this calculation is completed at the timing t94. The above series of operations is repeatedly performed at the control sampling period ts. The timings t91', t92', t93' and t94' in FIG. 12 show this series of operations at the subsequent timings.

4-2. Hardware Control

Figure 8:
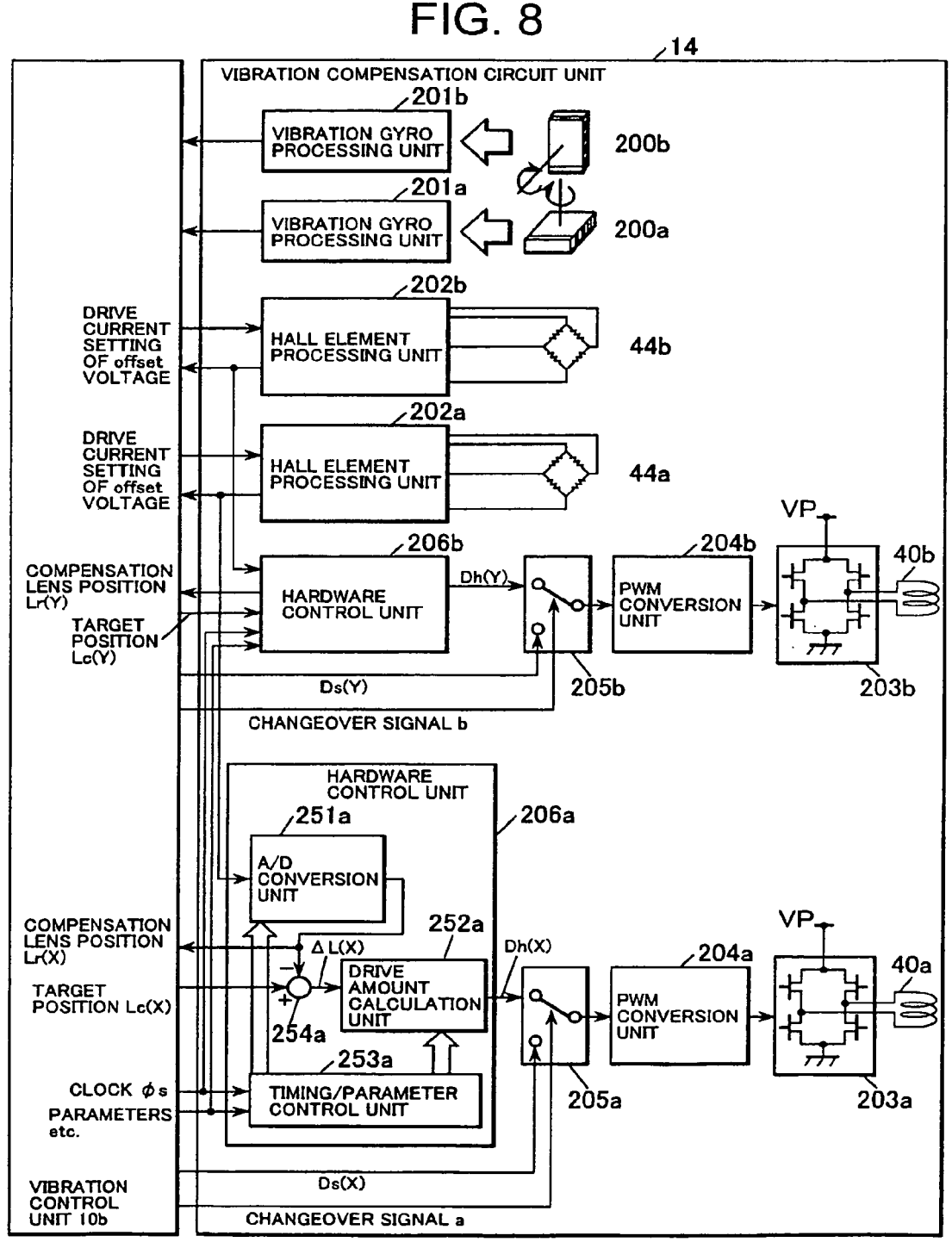
FIG. 8 is a circuit diagram of a vibration control unit 10b and a vibration compensation circuit unit 14.

In the case of performing control by hardware, this is performed using the X axis hardware control unit 206a and the Y axis hardware control unit 206b shown in FIG. 8. In the following, only the case for the X axis will be explained. Since the case for the Y axis is the same, explanation thereof will be omitted. The hardware control unit 206a receives supply of a clock signal φs from the vibration control unit 10b, and, based upon this clock signal φs, performs calculation of the drive amount for the compensation lens 4 by a timing/parameter control unit 253a repeatedly at a predetermined period. Here, this predetermined period will be termed the control sampling period th. It should be understood that although, in this embodiment, the clock signal φs is supplied from the vibration control unit 10b, it may be generated by a known technique, for example by oscillation using a quartz crystal oscillator or a ceramic oscillator or the like. Furthermore, the timing/parameter control unit 253a also performs control of this type of timing, and the operation of setting parameters from the vibration control unit 10b as will be described hereinafter, and so on.

An A/D conversion unit 251a A/D converts the output of the Hall element processing unit 202a. Here, the digital value that has been converted by the A/D conversion unit 251a corresponds to the position Lr of the compensation lens. On the other hand, from the vibration control unit 10b, the digital value of the target position Lc(X) is set cyclically at a target position setting interval thc. A subtractor 254a calculates the control error ΔL(X) by performing a calculation similar to Equation (3). It should be understood that the target position setting interval thc may be different from the control sampling period th during drive amount calculation. The control error ΔL(X) is sent to the drive amount calculation unit 252a, and a drive amount Dh(X) for the compensation lens 4 is calculated from this control error ΔL(X) by the drive amount calculation unit 252a.

Figure 13:
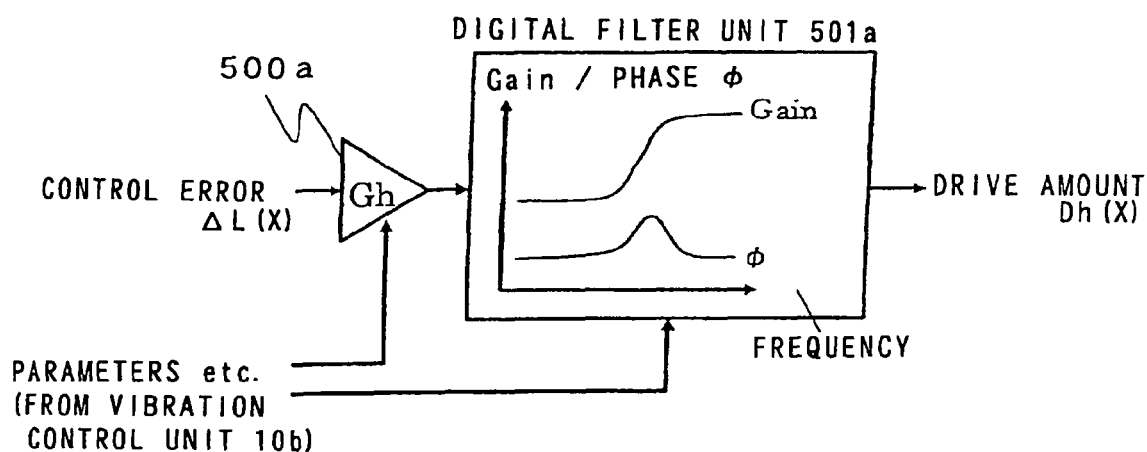
FIG. 13 is a detailed block diagram of the drive amount calculation unit.

Next, a concrete example of the drive amount calculation unit 252a will be explained using FIG. 13. FIG. 13 shows a block diagram of this concrete example of the drive amount calculation unit 252a. The control error ΔL(X) is sent to a digital filter unit 501a, after having been amplified by a factor of Gh by a drive amount gain unit 500a. This value Gh is the hardware control gain value, and is set from the vibration control unit 10b. The digital filter unit 501a applies a digital filter that is structured according to a known technique, and that for example has the characteristic shown in FIG. 13, to the digital value that is inputted, and outputs the result as the drive amount Dh(X) for the compensation lens 4.

The hardware control gain value Gh shown in FIG. 13 and the gain and phase frequency characteristics of the digital filter are changed to correspond to the characteristics of the drive mechanism for the compensation lens 4 as shown in FIGS. 2 and 4 and so on, and are set from the vibration control unit 10b via the timing/parameter control unit 253a. Generally, with the compensation lens drive mechanism shown in this embodiment, the responsiveness is bad for high frequencies, and it is often the case that the higher the frequency becomes, the lower is the gain and the more is the phase delayed. This should be compensated for, and accordingly in the example shown in FIG. 13, along with the gain being increased from the intermediate frequency region, also the phase is advanced.

Figure 14:
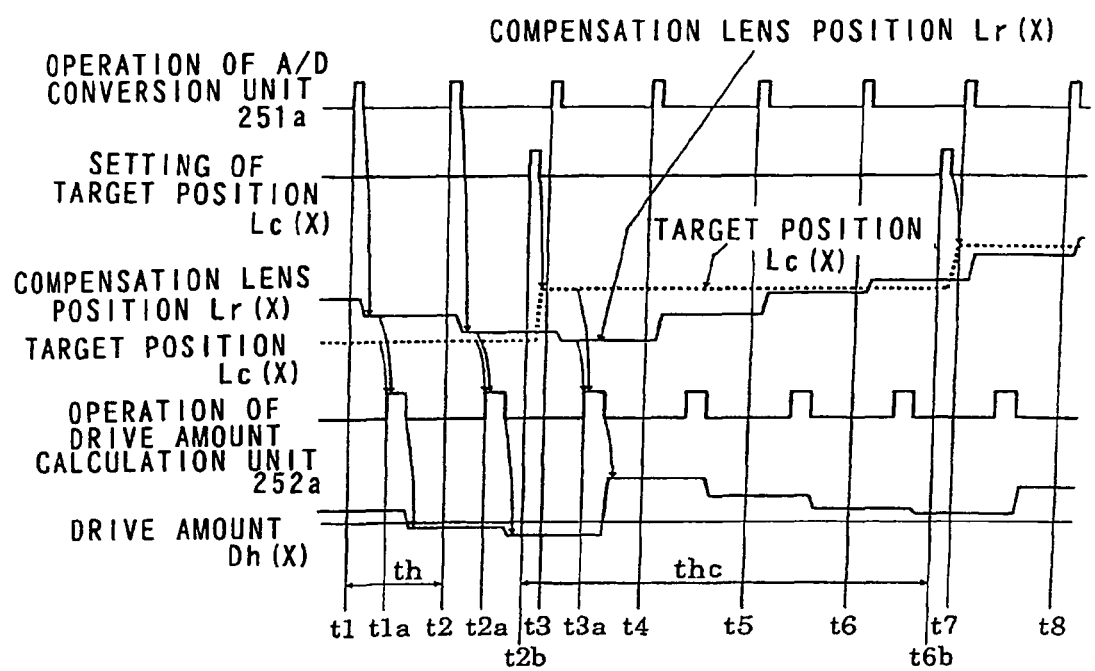
FIG. 14 is a timing chart showing the compensation lens drive amount calculation timing of the drive amount calculation unit.

Next, the timings for calculation of the drive amount Dh(X) will be explained using FIG. 14. FIG. 14 is a timing chart showing a concrete example of the timings for calculation of the compensation lens drive amount Dh(X). This calculation of the compensation lens drive amount Dh(X) is repeated at the control sampling period th that is controlled by the timing/parameter control unit 253a of the hardware control unit 206a.

At the timing t1, the output of the Hall element processing unit 202a is A/D converted by the A/D converter 251a, and the position Lr(X) for the compensation lens is calculated. And, at the timing t1a, from the target position Lc(X) for the compensation lens 4 that is set from the vibration control unit 10b at a different timing, and from the compensation lens position Lr(X) that was obtained at the timing t1, the drive amount Dh(X) for the compensation lens 4 is calculated quickly by the operation of the drive amount calculation unit 252a. The series of the above operations at the timings t1~t2 is repeated at each predetermined control sampling period th.

The target position Lc(X) for the compensation lens 4 that is set from the vibration control unit 10b is set in the interval thc. In the example shown in FIG. 14, the interval thc is longer than the control sampling period th that is the calculation interval for the drive amount Dh(X), but they may be equal to one another. To explain in terms of concrete numerical values, the setting interval thc of the target position Lc(X) for the compensation lens 4 that is set from the vibration control unit 10b may be around 1 ms. The upper limit of the dominant frequency of the camera vibration when a human being is holding the camera and performing photography is around 10~20 Hz, and in relation thereto, if this interval is 1 ms, this is considered to be sufficient.

On the other hand since the drive amount Dh(X), that is calculated by hardware, can be calculated almost instantaneously, accordingly the control sampling period th for the compensation lens 4 may be set to 0.1 ms or 0.05 ms or less. Due to this, as a control system, it is possible to extend the control characteristics as far as high frequencies, and thus it is possible greatly to enhance the controllability of the compensation lens 4.

By contrast, with software control by the vibration control unit 10b, the calculation speed is governed by the processing capability of the vibration control unit 10b, and the interval ts at which the drive amount Ds(X) for the compensation lens 4 is calculated cannot be enhanced as much as may be wished. To cite concrete numerical values, in the case of control by software, the control sampling period ts is around 1 ms, and, even if priority is given to controllability of the compensation lens 4, often it is brought to around 0.5 ms. Furthermore, if some type of processing other than vibration control must also be performed, then making the control sampling period ts shorter leads to a more difficult situation. However, in this embodiment, while anticipating enhancement of the controllability by controlling the compensation lens 4 with the hardware control unit 206a, it is also possible to reduce the load upon the vibration control unit 10b, since the setting of the target position Lc(X) by the vibration control unit 10b can be set at a slow interval that is matched to the upper limit of the dominant frequency of the camera vibration.

4-3. Another Embodiment of Hardware Control

Figure 15:
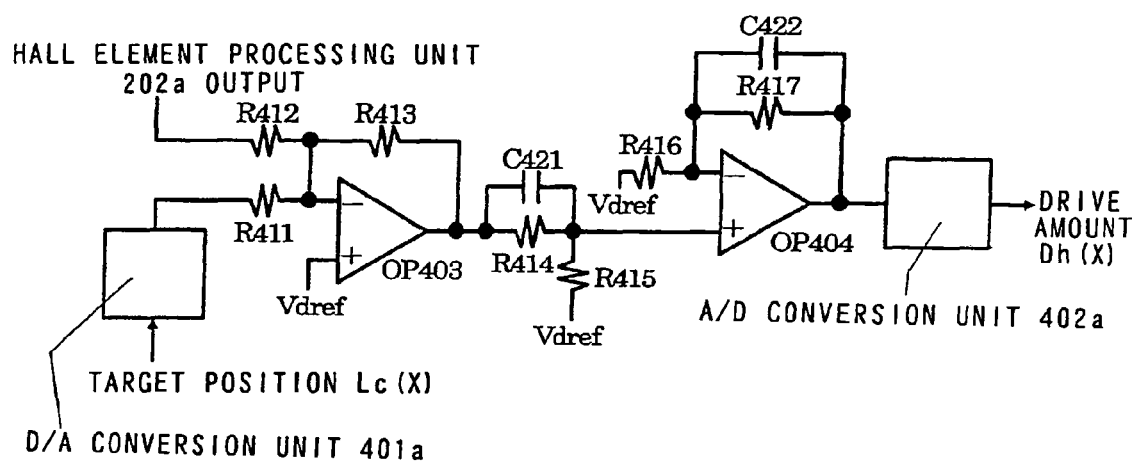
FIG. 15 is a circuit diagram of another embodiment of the hardware control unit.

FIG. 15 is a circuit diagram of another embodiment of the hardware control unit;

Although the hardware control unit 206a has been explained above, it is not necessary for the hardware control unit 206a, in particular the drive amount calculation unit 252a, to perform logical calculations. Thus, an implementation of the hardware control unit 206a as an analog circuit is shown in FIG. 15. FIG. 15 shows the hardware control unit 206a of FIG. 8 implemented principally by analog hardware.

In a similar manner to the embodiment described above, the target position Lc(X) for the compensation lens 4 is set at fixed intervals the by the blur control unit 10b. This target position Lc(X) is inputted into a D/A converter 401a, and is converted thereby into an analog signal. The output of this D/A converter 401a and the output of the Hall element processing unit 202a are inverted, added and amplified by an operational amplifier OP 403 and resistors R411, R412 and R413, taking as a reference a reference voltage Vrdref that is generated by some known technique.

In this manner, in the example shown in FIG. 15, in the case of using the inverting addition amplifier including the operational amplifier OP 403 and the resistors R411, R412 and R413, with the hardware control described above, the control error ΔL(X) is calculated by subtracting the compensation lens position Lr(x) and the target position Lc(X) using the subtractor 254a of FIG. 8. Due to this, in order to ensure that the difference value between the compensation lens position Lr(X) and the target position Lc(X) is calculated, it is arranged for the vibration control unit 10b to set the target position Lc(X) that is set in the D/A converter 401a while inverting its sign. Or, it would also be acceptable to replace the inverting adder, constituted by the operational amplifier OP 403 and the resistors R411, R412 and R413, by a subtracting amplifier.

Next, a circuit that consists of resistors R414 and R415 and a condenser C421 performs processing equivalent to that of the digital filter 501a in FIG. 13 upon the output of the OP 403 that corresponds to the control error ΔL(X) obtained in this manner. In concrete terms, the phase is advanced along with increase of the gain from the medium frequency region, and the result is inputted to the + input of an operational amplifier 404, that is the input of the next stage. The circuit that consists of the operational amplifier OP 404, resistors R416 and R417, and a condenser C422 constitutes a non inverting amplifier, and, along with the signal that is inputted to the + input of the OP 404 being non inverting amplified, unnecessary high frequencies therein are cut out, as determined by the constant of the resistor R417 and the condenser C422. And the output of the OP 404 is A/D converted by the A/D converter 402a, and is taken as the drive amount Dh(X).

5. The Modes of the Camera, and Compensation Lens Control

With the camera of this embodiment, it is possible to use two types of method as drive control methods for the compensation lens 4 during vibration compensation: drive by software control, and drive by hardware control. And it is arranged to change over between these control methods according to the setting conditions of the camera, and according to the photographic conditions. In the following, the control patterns corresponding to the setting conditions of the camera and the photographic conditions will be explained.

Table 1 summarizes the advantages and the shortcomings of software control and hardware control.

TABLE 1

| ITEM | SOFTWARE CONTROL | HARDWARE CONTROL |
|---|---|---|
| COMPENSATION LENS CONTROLLABILITY | DIFFICULT TO DO WELL | GOOD |
| COMPENSATION LENS CONTROL NOISE AND CONTROL VIBRATION | SMALL | LARGE |
| PROCESSING CAPABILITY OF VIBRATION CONTROL UNIT | LARGE | SMALL |
| EASE OF DESIGN | EASILY DONE | HARD TO DO |
| EASE OF DESIGN CHANGES | EASILY DONE | HARD TO CHANGE |

In the case of software control of the compensation lens 4, this is performed by the software of the vibration control unit 10b of the control unit 10. As explained with reference to FIG. 11, the calculation of the drive amounts Ds(X) and Ds(Y) for the compensation lens 4 is performed repeatedly at a predetermined period ts. Now, the control unit is made as a one chip microcomputer and so on, and the vibration control unit 10b must perform vibration detection, compensation lens position detection and various types of processing along with vibration compensation, apart from control of the compensation lens 4 as described above. Furthermore, with regard to the main control unit 10a, it must perform other processing tasks for the camera 1 as well as image vibration compensation. Due to this, it becomes extremely difficult to shorten the control sampling period ts, because of the influence of this type of processing load upon the control unit 10.

In concrete terms the control sampling period ts, while being shorter than 1 ms, is limited to being around 0.5 ms. If the control sampling period ts is made shorter the control bandwidth increases, and the controllability of the compensation lens 4 is enhanced, but since, due to the reasons described above, it is difficult to shorten the control sampling period ts, accordingly it is extremely difficult to enhance the controllability of the compensation lens 4 by software control.

On the other hand, with hardware control, since the calculation of the drive amount for the compensation lens 4 is implemented in hardware (by a logic circuit or an analog circuit), accordingly it is possible to make the calculation time period extremely short. As a result, by shortening the control sampling period ts, it is possible to increase the control bandwidth, and greatly to enhance the controllability. Furthermore, to the extent that the calculation of the drive amount for the compensation lens 4 is performed by hardware control, the load of processing upon the vibration control unit 10b is also reduced.

However, when the compensation lens 4 is controlled by hardware control, since the control bandwidth is increased and the compensation lens 4 is control driven in the high frequency band region, accordingly it is easy for high frequency vibration and control noise to occur. Moreover it is easy for sliding noise and vibration generated at the sliding surfaces of the movable element 21 and the fixed element 20, and at the surfaces of the slide balls 22, and also rattling of the bias springs 23 and so on, to occur. Furthermore, with software control, it is easier to cope with design changes and problems at the design stage. However, with hardware control, although design changes are easy provided that the circuit described above is built up from discrete components, since the number of components becomes large, generally the circuit is implemented as an IC. If the circuit is made as an IC, then changes partway through design become difficult. Moreover, with regard to being compatible with a plurality of different types of product whose specifications are all a little different from one another, such adaptation to circumstances also becomes difficult.

Thus, in this embodiment, by effectively exploiting the advantageous aspects of both software control and hardware control, and moreover by supplementing their shortcomings, not only is it possible to obtain better controllability of the compensation lens 4 than has previously been possible, but also reduction of control noise and vibration may be contemplated. Furthermore, it is possible to anticipate reduction of the processing load upon the vibration control unit 10b, and to be able to adapt to any circumstances that may arise with regard to differences from specification due to changes during design or different types of device. In this following, this will be explained in terms of a concrete embodiment.

5-1. The Camera System and the Compensation Lens Control Method

First, application to a plurality of products whose specifications all differ somewhat will be described. Table 2 shows examples of whether the compensation lens 4 is to be controlled by software control or by hardware control, for each of different camera systems having different camera sequences.

Here, as the photographic sequence, it is considered that this may be subdivided into three representative headings: preparations being made for photography, photography (still image) being performed, and photography (moving image) being performed.

By "preparations being made for photography" is meant from when the power supply to this camera 1 is turned on, up till directly before the release button 20 goes to ON. By "photography being performed" is meant while the release button 20 is ON, and the actual photography is being performed. And this may be broadly divided into photography of a still image and photography of a moving image. Here, with a digital still camera like the camera 1 according to this embodiment, the highest image vibration compensation level is required during photography of a still image, and the controllability of the compensation lens must also be high. By contrast, while preparations are being made for photography, the result of photography by an image sensor 9 that will be described hereinafter are displayed in real time upon the external liquid crystal monitor 19. In this monitor image display, recording of the image data upon the non-volatile storage medium 31 is not performed as it is during actual photography of a moving image. This is the same as in the case of photography with a video camera, in which what is displayed upon the external liquid crystal monitor 19 is a moving image (a monitor image) that is photographed in real time. In this kind of case, and also including the case of actual photography of a moving image, no very high accuracy is required for the image vibration compensation performance under this type of condition, and it will be sufficient if the photographic subject can be seen without subjecting the eye of the user to any sense of discomfort. Accordingly, it is often the case that no high accuracy is demanded for the controllability of the compensation lens 4.

Taking the above as a basis, first, the circumstances in which control is changed over will be considered in relation to the capability of the processing unit 10 including the vibration control unit 10b. With a camera system whose control unit 10 has a high processing capability, it is possible to make the control sampling period for the drive amount calculation for the compensation lens 4 short, so that sufficient controllability of the compensation lens 4 may be obtained. Accordingly control of the compensation lens 4 is performed by software control in all cases: while preparations are being made for photography, while photography (still image) is being performed, and while photography (moving image) is being performed. Conversely, with a camera system having a control unit 10 including a vibration control unit 10b that has a low processing capability, it is not possible to obtain sufficient controllability for the compensation lens 4, since it is not possible to shorten the control sampling period for calculation of the drive amount for the compensation lens 4. Accordingly control of the compensation lens 4 is performed by hardware control in all cases: while preparations are being made for photography, while photography (still image) is being performed, and while photography (moving image) is being performed.

Next, the case of changing over according to the lightness or heaviness of the processing load while photography is being performed will be considered. With a system in which,

TABLE 2

| CONDITION | PREPARATIONS BEING MADE FOR PHOTOGRAPHY | PHOTOGRAPHY BEING PERFORMED | |
| --- | --- | --- | --- |
| | | STILL IMAGE | MOVING IMAGE |
| WITH SYSTEM OF HIGH CONTROL UNIT CAPABILITY | SOFTWARE CONTROL | SOFTWARE CONTROL | SOFTWARE CONTROL |
| WITH SYSTEM OF LOW CONTROL UNIT CAPABILITY | HARDWARE CONTROL | HARDWARE CONTROL | HARDWARE CONTROL |
| WITH SYSTEM ON WHICH PROCESSING BURDEN FOR PERFORMING PHOTOGRAPHY IS HEAVY | SOFTWARE CONTROL | HARDWARE CONTROL | HARDWARE CONTROL |
| WITH SYSTEM ON WHICH PROCESSING BURDEN FOR PERFORMING PHOTOGRAPHY IS LIGHT | SOFTWARE CONTROL | SOFTWARE CONTROL | SOFTWARE CONTROL |
| WITH SYSTEM WHOSE CONTROL NOISE IS GREAT | SOFTWARE CONTROL | SOFTWARE CONTROL | SOFTWARE CONTROL |
| WITH SYSTEM WHOSE CONTROL NOISE IS MEDIUM | SOFTWARE CONTROL | HARDWARE CONTROL | SOFTWARE CONTROL |
| WITH SYSTEM WHOSE CONTROL NOISE IS LOW | HARDWARE CONTROL | HARDWARE CONTROL | HARDWARE CONTROL | when photography is being performed, the processing load upon the processing unit 10 that includes the vibration control unit 10b is heavy, while preparations are being made for photography and a monitor image is being displayed upon the external liquid crystal monitor 19, the compensation lens 4 is controlled by software control, while, when still image photography is being performed and when an actual moving image is being photographed, the compensation lens 4 is controlled by hardware control. Conversely, with a system in which, when photography is being performed, the processing load upon the processing unit 10 that includes the vibration control unit 10b is light, control of the compensation lens 4 is performed by software control in all cases: while preparations are being made for photography, while still image photography is being performed, and while moving image photography is being performed.

With regard to mechanical control noise and control vibration in the drive control unit of the compensation lens 4 shown in FIGS. 2 and 4, control is changed over according as to whether or not those are large when drive controlling the compensation lens 4. If the control noise and the control vibration and so on are large, then control of the compensation lens 4 is performed by software control in all three cases: while preparations are being made for photography, while still image photography is being performed, and while moving image photography is being performed. Furthermore, if the control noise and the control vibration and so on are medium, then control of the compensation lens 4 is performed by hardware control, in which the controllability is good, only while still image photography is being performed, when noise and vibration are very obtrusive because the operating time is short. Conversely, while preparations are being made for photography and while moving image photography is being performed, in which the operating time is long and noise and vibration are not particularly obtrusive, control of the compensation lens 4 is performed by software control. Moreover, if the drive control unit is one in which control noise and control vibration and so on are not particularly conspicuous, then control of the compensation lens 4 is performed by hardware control in all three cases: while preparations are being made for photography, while still image photography is being performed, and while moving image photography is being performed.

5-2. The Photographic Scene of the Camera and the Compensation Lens Control Method Next, the selection of the optimum control method for the compensation lens 4, according to the photographic conditions and various types of mode setting of the camera 1, will be explained. Tables 3 and 4 show one example thereof. It should be understood that, in order to make the advantageous effects clear, it is supposed that a drive unit is used with which the control noise of the drive control mechanism for the compensation lens 4 is medium. In this case, with software control, although the control noise and the control vibration of the compensation lens 4 are not very conspicuous, the controllability of the compensation lens 4 cannot be considered to be sufficient. On the other hand, with hardware control, while it is possible to ensure sufficient controllability for the compensation lens 4, the control noise and the control vibration become somewhat strident.

TABLE 3

| CONDITION | | PREPARATIONS BEING MADE FOR PHOTOGRAPHY | PHOTOGRAPHY BEING PERFORMED | |
|---|---|---|---|---|
| | | | STILL IMAGE | MOVING IMAGE |
| PHOTOGRAPHIC FOCAL POINT DISTANCE | 80 mm OR LESS | SOFTWARE CONTROL | SOFTWARE CONTROL | SOFTWARE CONTROL |
| | 80 mm~150 mm | SOFTWARE CONTROL | HARDWARE CONTROL | SOFTWARE CONTROL |
| | 150 mm OR MORE | HARDWARE CONTROL | HARDWARE CONTROL | SOFTWARE CONTROL |
| DIGITAL ZOOM | NOT IN USE | SOFTWARE CONTROL | HARDWARE CONTROL | SOFTWARE CONTROL |
| | IN USE | HARDWARE CONTROL | HARDWARE CONTROL | HARDWARE CONTROL |
| PHOTOGRAPHIC MAGNIFICATION | 1/1 OR MORE | SOFTWARE CONTROL | SOFTWARE CONTROL | SOFTWARE CONTROL |
| | 1/1~1/5 | SOFTWARE CONTROL | HARDWARE CONTROL | SOFTWARE CONTROL |
| | 1/5 OR LESS | HARDWARE CONTROL | HARDWARE CONTROL | HARDWARE CONTROL |
| PHOTOGRAPHIC SUBJECT DISTANCE | 0.3 m OR CLOSER | SOFTWARE CONTROL | SOFTWARE CONTROL | SOFTWARE CONTROL |
| | 0.3 m~2.0 m | SOFTWARE CONTROL | HARDWARE CONTROL | SOFTWARE CONTROL |
| | 2.0 m OR FURTHER | HARDWARE CONTROL | HARDWARE CONTROL | HARDWARE CONTROL |
| COMPENSATION LENS SHIFT AMOUNT IMAGE CAPTURE SURFACE MAGNIFICATION | 1.0 OR LESS | SOFTWARE CONTROL | SOFTWARE CONTROL | SOFTWARE CONTROL |
| | 1.0~2.0 | SOFTWARE CONTROL | HARDWARE CONTROL | SOFTWARE CONTROL |
| | 2.0 OR MORE | HARDWARE CONTROL | HARDWARE CONTROL | HARDWARE CONTROL |
| PHOTOGRAPHIC EXPOSURE | 1/4 OR LESS | — | SOFTWARE CONTROL | SOFTWARE CONTROL |
| | 1/4~1/125 | — | HARDWARE CONTROL | SOFTWARE CONTROL |
| | 1/125 OR MORE | — | HARDWARE CONTROL | HARDWARE CONTROL |
| FOCUSING MODE | MACRO AF | SOFTWARE CONTROL | SOFTWARE CONTROL | SOFTWARE CONTROL |
| | NORMAL | SOFTWARE CONTROL | HARDWARE CONTROL | SOFTWARE CONTROL |
| | LONG DISTANCE AF | HARDWARE CONTROL | HARDWARE CONTROL | HARDWARE CONTROL |
| | INFINITY | HARDWARE CONTROL | HARDWARE CONTROL | HARDWARE CONTROL |
| FLASH PHOTOGRAPHY MODE | FLASH PROHIBITED | SOFTWARE CONTROL | SOFTWARE CONTROL | SOFTWARE CONTROL |
| | SLOW SYNCHRO | SOFTWARE CONTROL | SOFTWARE CONTROL | SOFTWARE CONTROL |
| | AUTO | SOFTWARE CONTROL | HARDWARE CONTROL | SOFTWARE CONTROL |
| | RED-EYE REDUCTION | SOFTWARE CONTROL | HARDWARE CONTROL | SOFTWARE CONTROL |
| | FORCED FLASH | HARDWARE CONTROL | HARDWARE CONTROL | HARDWARE CONTROL |
| NUMBER OF RECORDED PICTURE ELEMENTS MODE 1 | SMALL | SOFTWARE CONTROL | SOFTWARE CONTROL | SOFTWARE CONTROL |
| | MEDIUM | SOFTWARE CONTROL | HARDWARE CONTROL | SOFTWARE CONTROL |
| | LARGE | HARDWARE CONTROL | HARDWARE CONTROL | HARDWARE CONTROL |
| NUMBER OF RECORDED PICTURE ELEMENTS MODE 2 | L SIZE/ POSTCARD SIZE | SOFTWARE CONTROL | SOFTWARE CONTROL | SOFTWARE CONTROL |
| | WIDE (16:9) | SOFTWARE CONTROL | HARDWARE CONTROL | SOFTWARE CONTROL |
| | NORMAL (4:3) | HARDWARE CONTROL | HARDWARE CONTROL | HARDWARE CONTROL |

TABLE 3-continued

| CONDITION | | PREPARATIONS BEING MADE FOR PHOTOGRAPHY | PHOTOGRAPHY BEING PERFORMED | |
|---|---|---|---|---|
| | | | STILL IMAGE | MOVING IMAGE |
| RECORDED IMAGE COMPRESSION RATIO MODE | NORMAL | SOFTWARE CONTROL | SOFTWARE CONTROL | SOFTWARE CONTROL |
| | FINE | SOFTWARE CONTROL | HARDWARE CONTROL | SOFTWARE CONTROL |
| | SUPER FINE | HARDWARE CONTROL | HARDWARE CONTROL | HARDWARE CONTROL |
| ISO SENSITIVITY MODE | 800 OR MORE | SOFTWARE CONTROL | SOFTWARE CONTROL | SOFTWARE CONTROL |
| | 200~400 | SOFTWARE CONTROL | HARDWARE CONTROL | SOFTWARE CONTROL |
| | AUTO | SOFTWARE CONTROL | HARDWARE CONTROL | SOFTWARE CONTROL |
| | 100 OR LESS | HARDWARE CONTROL | HARDWARE CONTROL | HARDWARE CONTROL |

TABLE 4

| CONDITION | | | PREPARATIONS BEING MADE FOR PHOTOGRAPHY | PHOTOGRAPHY BEING PERFORMED | |
|---|---|---|---|---|---|
| | | | | STILL IMAGE | MOVING IMAGE |
| WHITE BALANCE | SET AUTOMATICALLY, BUT IS . . . | INCANDESCENT LIGHTING | SOFTWARE CONTROL | SOFTWARE CONTROL | SOFTWARE CONTROL |
| | | FLUORESCENT LIGHTING | SOFTWARE CONTROL | HARDWARE CONTROL | SOFTWARE CONTROL |
| | | CLOUDY | HARDWARE CONTROL | HARDWARE CONTROL | HARDWARE CONTROL |
| | | SUNLIGHT | HARDWARE CONTROL | HARDWARE CONTROL | HARDWARE CONTROL |
| | MANUAL | INCANDESCENT LIGHTING | SOFTWARE CONTROL | SOFTWARE CONTROL | SOFTWARE CONTROL |
| | | FLUORESCENT LIGHTING | SOFTWARE CONTROL | HARDWARE CONTROL | SOFTWARE CONTROL |
| | | CLOUDY | HARDWARE CONTROL | HARDWARE CONTROL | HARDWARE CONTROL |
| | | SUNLIGHT | HARDWARE CONTROL | HARDWARE CONTROL | HARDWARE CONTROL |
| MONITORING OF PHOTOGRAPHIC IMAGE WITH EXTERNAL LIQUID CRYSTAL MONITOR | | OFF | SOFTWARE CONTROL | SOFTWARE CONTROL | SOFTWARE CONTROL |
| | | ON | HARDWARE CONTROL | HARDWARE CONTROL | SOFTWARE CONTROL |
| ACTUATION SOUND | SOUND WHEN CAMERA STARTED | OFF | SOFTWARE CONTROL | SOFTWARE CONTROL | SOFTWARE CONTROL |
| | | ON | HARDWARE CONTROL | HARDWARE CONTROL | SOFTWARE CONTROL |
| | SOUND WHEN ACTUATION MEMBER ACTUATED | OFF | SOFTWARE CONTROL | SOFTWARE CONTROL | SOFTWARE CONTROL |
| | | ON | HARDWARE CONTROL | HARDWARE CONTROL | SOFTWARE CONTROL |
| | DURING SELF TIMER PHOTOGRAPHY | OFF | SOFTWARE CONTROL | SOFTWARE CONTROL | SOFTWARE CONTROL |
| | | ON | HARDWARE CONTROL | HARDWARE CONTROL | SOFTWARE CONTROL |
| | SHUTTER SOUND DURING PHOTOGRAPHY | OFF | SOFTWARE CONTROL | SOFTWARE CONTROL | SOFTWARE CONTROL |
| | | ON | HARDWARE CONTROL | HARDWARE CONTROL | SOFTWARE CONTROL |
| SELF TIMER MODE | OFF (DURING NORMAL PHOTOGRAPHY) | | SOFTWARE CONTROL | SOFTWARE CONTROL | SOFTWARE CONTROL |
| | ON | | HARDWARE CONTROL | HARDWARE CONTROL | SOFTWARE CONTROL |
| SEQUENTIAL SHOOTING MODE | NORMAL | | SOFTWARE CONTROL | SOFTWARE CONTROL | SOFTWARE CONTROL |
| | SEQUENTIAL SHOOTING | | HARDWARE CONTROL | HARDWARE CONTROL | HARDWARE CONTROL |
| VIBRATION COMPENSATION MODE | ON | COMPENSATION ONLY DURING PHOTOGRAPHY MODE | HARDWARE CONTROL | HARDWARE CONTROL | HARDWARE CONTROL |
| | | COMPENSATION ALWAYS MODE | SOFTWARE CONTROL | HARDWARE CONTROL | SOFTWARE CONTROL |
| | | PANNING MODE — NON PANNING DIRECTION AXIS | SOFTWARE CONTROL | HARDWARE CONTROL | SOFTWARE CONTROL |
| | | PANNING DIRECTION AXIS | HARDWARE CONTROL | HARDWARE CONTROL | HARDWARE CONTROL |
| | OFF | | HARDWARE CONTROL | HARDWARE CONTROL | HARDWARE CONTROL |
| FRAME RATE DURING MOVING IMAGE PHOTOGRAPHY | 1/30, 1/60 | | HARDWARE CONTROL | — | HARDWARE CONTROL |
| | 1/15 | | HARDWARE CONTROL | — | HARDWARE CONTROL |
| | 1/8 OR LESS | | SOFTWARE CONTROL | — | SOFTWARE CONTROL |
| SOUND RECORDING DURING MOVING IMAGE PHOTOGRAPHY | PERFORM | | — | — | SOFTWARE CONTROL |
| | DO NOT PERFORM | | — | — | HARDWARE CONTROL |

(1) The Photographic Focal Point Distance

The image vibration amount upon the image capture surface of the image sensor 9 becomes greater in proportion to the photographic focal point distance. Due to this, the longer the photographic focal point distance becomes, the higher is the image vibration compensation performance that is demanded, in particular the performance in relation to the controllability of the compensation lens 4. Accordingly, for longer photographic focal point distances, hardware control for the compensation lens is employed. Moreover if, during moving image photography, it is supposed that sound around the camera is to be recorded simultaneously by the sound gathering unit 30, or the like, then software control is employed. It should be understood that, in Table 3, these numerical values of the photographic focal point distance that is shown by 135 conversion are only one example. Moreover, the photographic focal point distance is obtained by detecting the position of the zoom lens 3 with the zoom lens position detection unit 13 of FIG. 1.

(2) Digital Zooming

If the digital zoom is operating, a portion of the captured image that has been obtained by the image sensor 9 is cut away, and is photographed while being magnified by digital supplementation; and moreover, in the preparations being made for photography during digital zoom operation, when displaying a moving photographic image upon the external liquid crystal monitor 19, the above described image that has been photographed as magnified comes to be displayed. In this type of case, since a higher image vibration compensation performance is requested, accordingly priority is given to the image vibration compensation performance, and hardware control of the compensation lens 4 is performed in all cases.

(3) The Photographic Magnification and the Photographic Subject Distance

It is known that, when the photographic magnification becomes great, or when the distance of the photographic subject becomes close, due to reasons such as those below, the beneficial effects of image vibration compensation are lost. That is to say, a camera that has a image vibration compensation mechanism generally is one in which the vibration angular velocity suffered by the camera is detected, and an image vibration generated by this vibration that has been detected is compensated; but it is not possible to detect camera vibration in a direction orthogonal to the optical axis that is not angular vibration, so that it cannot be compensated. Moreover, the same is the case for camera vibration along the direction of the optical axis as well (i.e. along the focus direction). In this case, the image vibration compensation performance greatly deteriorates.

Thus, in this embodiment, if the photographic magnification has become great, and if the distance to the photographic subject has become close, then control of the compensation lens 4 is performed by software control, since it is considered that priority must be given to control noise of the compensation lens 4 over controllability of the compensation lens 4. Moreover, with this type of photographic scene, it may be supposed that the scene that is being photographed may be one in which a living creature such as an insect or the like is being approached, and, in this case as well, it may be considered that it is beneficial to plan for quietening by performing software control.

It should be understood that it would also be acceptable to obtain the photographic subject distance, for example, solely according to the position of the focusing lens 5 that is obtained by the focusing lens position detection unit 16. Moreover, in the case of an optical system in which the relationship between the position of the focusing lens 5 and the photographic subject distance changes according to the position of the zoom lens 3, the photographic subject distance may be calculated according to the position of the focusing lens 5 that is obtained by the focusing lens position detection unit 16, and according to the position of the zoom lens 3 that is obtained by the zoom lens position detection unit 13. On the other hand, the photographic magnification may be calculated according to the position of the focusing lens 5 that is obtained by the focusing lens position detection unit 16, and according to the position of the zoom lens 3 that is obtained by the zoom lens position detection unit 13.

(4) The Compensation Lens Shift amount Image Capture Surface Magnification

The image capture surface magnification or magnification factor of the compensation lens shift amount represents the amount of shifting of the optical axis upon the image capture surface per unit shift amount of the compensation lens 4, and gives how much the image captured upon the surface of the image sensor 9 shifts, due to the change of the photographic optical axis 2 when the compensation lens 4 shifts by a unit amount. For example, if the photographic optical system is built so as to include a single compensation lens that consists of only a single lens, then the compensation lens shift amount image capture surface magnification is unity, and the shift amount of the compensation lens 4 and the shift amount of the image upon the surface of the image sensor agree with one another. However, the compensation lens shift amount image capture surface magnification differs according to the photographic optical system, and generally changes according to the photographic focal point distance that is the position of the zoom lens 3, and the distance to the photographic subject that is the position of the focusing lens 5.

If the compensation lens shift amount image capture surface magnification is large, the influence that the control error of the compensation lens 4 exerts upon the image capture surface also comes to be large. In concrete terms, if the compensation lens shift amount image capture surface magnification is 2.0, then the control error of the compensation lens 4 upon the surface of the image capture sensor 9 is doubled. Accordingly, the greater is the compensation lens shift amount image capture surface magnification, and the greater is the control error of the compensation lens 4, the more must the controllability of the compensation lens be enhanced. In this embodiment, as shown in Table 3, if the compensation lens shift amount image capture surface magnification is greater than a predetermined value, then the compensation lens 4 is controlled by hardware control, since more controllability is requested for the compensation lens 4. Conversely, if it is smaller than the predetermined value, then the compensation lens 4 is controlled by software control, since priority is accorded to quietening.

Furthermore it is arranged to change the point of changeover between software control and hardware control, since, while preparations are being made for photography and during moving image photography, the level of controllability of the compensation lens 4 that is demanded is different from during still image photography, and since, during photography of a moving image, it is supposed that sound recording of sound around the camera and so on is being performed at the same time. It should be understood that, as described above, the compensation lens shift amount image capture surface magnification is determined by the state of the photographic optical system. Accordingly, the main control unit 10*a* obtains the compensation lens shift amount image capture surface magnification based upon the position of the focusing lens 5 that is detected by the focusing lens position detection unit 16 and upon the position of the zoom lens 3 that is detected by the zoom lens position detection unit 13.

(5) The Photographic Exposure

The main control unit 10*a* determines the photographic exposure that is appropriate for photography by a known technique, by specifying the brightness of the photographic subject from the results of image capture obtained from the image sensor 9. In this embodiment, if the photographic exposure that has been thus determined is a high speed timing that is greater than a predetermined value, then the compensation lens 4 is controlled by hardware control, while if it is a low speed timing that is less than a predetermined value, then changeover is performed so that the compensation lens 4 is controlled by software control. In other words, changeover of the control of the compensation lens 4 is changed over between hardware control and software control according to the photographic exposure that is determined.

This means that, in the case of high speed timing, the compensation lens 4 is controlled by hardware control that gives emphasis to its controllability, since it is hard for the user to hear the control noise of the compensation lens 4 if the time period during which it is controlled is short. On the other hand, with low speed timing, the time period over which the compensation lens 4 is controlled becomes long and it becomes easy for the user to hear the control noise. Moreover, at low speed timing, it also becomes unnecessary to put a very great emphasis upon controllability, since, although the high frequency components of the control error of the compensation lens 4 are dominant, the longer the photographic exposure becomes, the more the control errors of these high frequency components are added together, so that their influence becomes smaller. Due to this fact, at low speed timings, emphasis is placed upon quietness, and the compensation lens 4 is controlled by software control. And, to compare the situations during moving image photography and during still image photography, it should be understood that, since the level of controllability that is demanded for the compensation lens is different, and since it is supposed that during moving image photography sound in the vicinity of the camera is being recorded at the same time, accordingly it is arranged to vary the point of changeover between software control and hardware control between moving image photography and still image photography.

(6) The Focusing Mode

With regard to the focusing mode, the following modes are considered as possible conditions: macro AF, normal mode, long distance AF, and infinity. Macro AF is a mode that is principally used when the photographic subject is extremely close to the camera 1, and is a mode in which it is possible to shift the focusing lens 5 more, and to adjust the focus upon a photographic subject that is extremely close. In this case, naturally, the shift amount of the focusing lens 5 becomes large, and the time period for adjusting the focus upon the surface of the image sensor 9 becomes long. Conversely, long distance AF is a mode in which the photographic distance range for adjustment of the focus upon the surface of the image sensor 9 is limited, and in which it is possible to adjust the focus to long distance. Naturally, the range of shifting of the focusing lens 5 is limited, and the time period for adjusting the focus upon the surface of the image sensor 9 is shortened. In the normal mode, the shift amount of the focusing lens 5 is intermediate between macro AF and long distance AF, and this is an all-round mode in which the shift range for the focusing lens 5 is limited to an intermediate range between macro AF and long distance AF, and the time period for adjusting the focus is also intermediate. And the infinity mode is a mode in which the focusing lens is forcibly shifted to a position in which its focus is adjusted to a photographic subject at infinity.

In this embodiment, when macro AF has been set, the compensation lens 4 is controlled by software control. As has been explained in connection with the changeovers of the control methods for the compensation lens 4 for photographic magnification and for photographic subject distance, when the photographic subject distance is close, the image vibration compensation performance deteriorates. Accordingly in the case of macro AF, for which it is a premise that the distance of the photographic subject is close, priority is given to the control noise of the compensation lens 4, since it is supposed that the scene that is being photographed is a close approach to a living creature like an insect or the like, and it is arranged to perform software control of the compensation lens 4.

Conversely, if the long distance AF mode or the infinity mode is set, often it is the case that a photograph is being taken of scenery. Since a large number of finely detailed photographic subjects are included in this type of scenery photographic subject, accordingly components whose spatial frequency is extremely high are heavily represented. Due to this, in order to photograph a scenery photographic subject at good resolution, it is necessary for the controllability of the compensation lens 4 to be increased. Accordingly, in this long distance AF or infinity mode, the compensation lens 4 is controlled by hardware control, so as to accord emphasis to controllability of the compensation lens 4. In the case of the normal mode, the controllability of the compensation lens 4 is made to be intermediate between what it is during the macro AF mode, and what it is during the long distance AF mode and the infinity mode, and, during photography of a still image, the compensation lens 4 is controlled by hardware control, so as to accord emphasis to controllability of the compensation lens 4. On the other hand, while preparations are being made for photography and during moving image photography, the compensation lens 4 is controlled by software control, so as to accord emphasis to quietness of the compensation lens 4.

(7) The Flash Photography Mode

With regard to the flash photography mode, the following modes are considered as possible conditions: flash prohibited, slow synchro, auto, red-eye reduction, and forced flash. The forced flash mode is a mode in which the flash unit 6 is always made to emit light during photography, so that flash photography is performed. Conversely, the flash prohibited mode is a made in which, irrespective of the brightness and so on of the photographic subject, the flash unit is prevented from emitting light as photography is performed. And the auto mode is a mode in which, by a known technique, the luminance of the photographic subject is obtained from the results of image capture as obtained from the image sensor 9, and flash photography, in which the flash unit 6 is made to emit light, is performed if the photographic subject is dark. Moreover, the red-eye reduction mode is a mode in which the red-eye phenomenon that occurs during flash photography, in which the eyes of a person are photographed as being red, is reduced; and, here, by a known technique, the red-eye phenomenon is reduced by causing the flash unit 6 to perform emission of a minute amount of light a number of times directly before photography, and so on. Finally, the slow synchro mode is a mode in which it is supposed that a person is being photographed against a night scene as background, or the like, and the photographic exposure in the auto mode is set to low speed timing.

When the flash prohibited mode is set, the compensation lens 4 is controlled by software control. This mode is employed when, for example, it is necessary to perform photography in an art gallery in which flash photography is forbidden, or when, along with prohibiting flash photography, it is necessary to perform photography with emphasis being given to quietness. In this mode, in order to suppress the control noise of the compensation lens as much as possible, the compensation lens 4 is controlled by software control. And, if the slow synchro mode is set, then it is often the case, as described previously, that the photographic exposure will be at low speed timing. Due to this, the compensation lens 4 is controlled by software control, since the influence of control errors of the compensation lens 4 becomes small, and emphasis is accorded to quietness. And it is often the case that the forced flash mode is used when a shadow is falling upon a face in the daytime, such as outdoors or the like, and, by using flash photography, the face can be adequately photographed, or the like. Accordingly, since it is often the case that the photographic exposure is at a high speed timing, the compensation lens 4 is controlled by hardware control, so as to accord emphasis to controllability of the compensation lens 4.

When the auto mode or the red-eye reduction mode has been set, then, although the range of the photographic exposure covers from high speed to a comparatively low speed, it is supposed that such low speed timing as in the case of slow synchro will not be reached. Due to this, in these modes, the controllability of the compensation lens 4 is made to be an all around level, intermediate between the cases of slow synchro and forced flash. In concrete terms, during still image photography, the compensation lens 4 is controlled by hardware control, so as to accord emphasis to controllability of the compensation lens 4. Furthermore, since while preparations are being made for photography and during moving image photography it is not necessary to give such great emphasis to controllability, accordingly the compensation lens 4 is controlled by software control, so as to accord emphasis to quietness.

(8) The Number of Recorded Picture Elements Mode

It is considered that the number of recorded picture elements mode may be split into two cases: a number of recorded picture elements mode #1 and a number of recorded picture elements mode #2. In the number of recorded picture elements mode #1, the number of recorded picture elements of the image that has been photographed is set. As conditions, this mode is classified into 'small' in which the number of recorded picture elements is the smallest, 'large' in which the number of recorded picture elements is the largest, and 'medium' that is an intermediate level between 'small' and 'large'. On the other hand, in the number of recorded picture elements mode #2, along with setting the angle of field shape when recording the image that has been photographed, the number of recorded picture elements is also set for each angle of field shape. In the example shown in Table 3, as setting conditions, there are three settings: 'L size/postcard size', 'wide', and 'normal': with the 'L size/postcard size' setting, the angle of field shape is set to L size/postcard shape; with the 'wide' setting, the angle of field shape is set to a vertical-horizontal aspect ratio of 16:9; and, with the 'normal' setting, the angle of field shape is set to a vertical-horizontal aspect ratio of 4:3. Furthermore, with regard to the number of recorded picture elements, generally, it is supposed that L size/postcard size will be printed at L size, so the number of recorded picture elements is set to small. And with the 'normal' setting the number of recorded picture elements is set to largest, while with the 'wide' setting the number of recorded picture elements is set to intermediate.

Accordingly, with the settings 'large' and 'normal', since it is assumed that the number of recorded picture elements is large, it becomes necessary to suppress the control error of the compensation lens 4 to be as small as possible, and so the compensation lens 4 is controlled by hardware control, in order to accord emphasis to controllability. Conversely, if the setting has been set to 'small' or to 'L size/postcard size', then not as much controllability is required as in the case of the settings 'large' and 'normal', and accordingly the compensation lens 4 is controlled by software control, so as to accord emphasis to quietening. Moreover, with the 'middle' and 'wide' settings, the controllability of the compensation lens 4 is supposed to be intermediate between these situations. In concrete terms, during still image photography, the compensation lens 4 is controlled by hardware control, so as to accord emphasis to controllability of the compensation lens 4; while, on the other hand, since while preparations are being made for photography and during moving image photography it is not necessary to give such great emphasis to controllability, accordingly the compensation lens 4 is controlled by software control, so as to accord emphasis to quietness.

(9) The Recorded Image Compression Ratio Mode

The recorded image compression ratio mode specifies the image compression ratio when recording an image upon the non-volatile storage medium 31, that has a finite recording capacity. Generally the data is compressed for recording, since the amount of image data obtained by photography is large. 'Normal' is the highest compression ratio, and accordingly some of the detailed information in the image is lost due to the image compression, and the picture quality decreases. 'Super-fine' is the lowest compression ratio, in which the picture quality is the best since the detailed information in the image is preserved. And in 'fine' the compression ratio is intermediate between 'normal' and 'super-fine'.

Accordingly, with high picture quality 'super-fine' in which the image detail information is preserved by low compression, it becomes necessary to suppress the control error of the compensation lens 4 to as low as possible, and thus the compensation lens 4 is controlled by hardware control, so as to accord emphasis to controllability. Conversely, with 'normal' in which the picture quality is decreased and some image detail information is lost by high compression, such good controllability as during 'super-fine' ceases to be required, so that the compensation lens 4 is controlled by software control, so as to accord emphasis to quietening. Moreover, with the 'fine' setting, the compression ratio and the picture quality are intermediate between the above levels, and accordingly the compensation lens is controlled by a control method intermediate between the above. In concrete terms, during still image photography, the compensation lens 4 is controlled by hardware control, so as to accord emphasis to controllability of the compensation lens 4. On the other hand, since while preparations are being made for photography and during moving image photography it is not necessary to give such great emphasis to controllability as during still image photography, accordingly the compensation lens 4 is controlled by software control, so as to accord emphasis to quietness.

(10) The ISO Sensitivity Mode

With regard to the ISO sensitivity, generally, the higher this sensitivity is set, the better the exposure is adapted for a photographic subject that is dark and the higher speed the photographic exposure becomes; but noise occurs in the picture quality and the grain becomes coarse. Conversely, the lower the sensitivity is set, the less the noise becomes and the higher is the picture quality that is obtained. Accordingly, if the ISO sensitivity has been set to a low sensitivity at which an image of high picture quality is obtained, such as for example to less than or equal to ISO 100 as in Table 3, then, since it is necessary to suppress the control error of the compensation lens 4 to as low as possible, accordingly the compensation lens 4 is controlled by hardware control, so as to accord emphasis to controllability. Conversely, if the sensitivity is set to a high sensitivity, at which the grain is coarse and a particularly high picture quality is not obtained, such as for example to greater than or equal to ISO 800 as in Table 3, then such good controllability of the compensation lens 4 ceases to be required, and accordingly the compensation lens 4 is controlled by software control, so as to accord emphasis to quietening.

Moreover, if the sensitivity is set to a medium sensitivity at which the picture quality is intermediate between those above, such as for example ISO 200~400 as in Table 3, then the compensation lens is controlled by a control method intermediate between the above. And if the ISO sensitivity is set automatically by a known technique based upon the luminance of the photographic subject, then a similar control method is utilized. In concrete terms, during still image photography, the compensation lens 4 is controlled by hardware control, so as to accord emphasis to controllability of the compensation lens 4. On the other hand, since while preparations are being made for photography and during moving image photography it is not necessary to give such great emphasis to controllability, accordingly the compensation lens 4 is controlled by software control, so as to accord emphasis to quietness.

(11) White Balance

White balance processing is a procedure for performing matching to the light source that is illuminating the subject of photography, and for thereby ensuring that the color balance quality of the picture that is photographed is a color that is close to the color seen by the eye. This setting has an auto mode in which the camera itself automatically specifies the type of the light source by a known technique, and a mode in which this is set manually by the user. The type of light source in automatic setting and manual setting may be 'sunlight', 'cloudy', 'fluorescent lighting', or 'incandescent lighting'. The control unit 10 executes white balance processing with an image processing circuit not shown in the figures, using white balance parameters that are determined for each type of source. The supposed brightness of the photographic subject becomes darker according to the sequence of the light sources described above, and the photographic exposure also has a tendency to become a lower speed timing according to this sequence. Thus, if the type of the light source that has been automatically set or manually set is 'incandescent lighting', it is often the case that the photographic exposure is at a low speed timing, and the influence of control error of the compensation lens becomes small. Thus, in this type of case, the compensation lens 4 is controlled by software control, so as to accord emphasis to quietness.

Moreover, if the type of the light source is 'sunlight' or 'cloudy', then it is often the case that the photographic exposure is at a high speed timing. Due to this, the compensation lens 4 is controlled by hardware control, so as to accord emphasis to controllability of the compensation lens 4. And, if the type of the light source that is set is 'fluorescent lighting', then it may be supposed that the photographic exposure does not reach such a low speed timing as during the 'incandescent lighting' setting, and accordingly an intermediate all-round form of control is performed, in which the controllability of the compensation lens 4 is between that during 'incandescent lighting' and that during 'sunlight' or 'cloudy'. In concrete terms, during still image photography, the compensation lens 4 is controlled by hardware control, so as to accord emphasis to controllability of the compensation lens 4. On the other hand since, while preparations are being made for photography and during moving image photography, it is not necessary to give such great emphasis to controllability, accordingly the compensation lens 4 is controlled by software control, so as to accord emphasis to quietness.

(12) Whether Photographic Image Monitoring with the External Liquid Crystal Monitor is ON or OFF The camera 1 of this embodiment is able to determine whether the user is using the optical viewfinder 7 while preparations are being made for photography, and is able to determine whether the photographic image of the image sensor 9 is to be displayed upon the external liquid crystal monitor 19. The display of the photographic image upon the external liquid crystal monitor 19 can be turned ON and OFF, and, when it has been turned OFF, it is determined whether the optical viewfinder 7 is in use. In this case, the user is performing photography while bringing his face close to the camera 1, so that the control noise of the compensation lens 4 can easily prove to be strident. Thus, in this case, the compensation lens 4 is controlled by software control, so as to accord emphasis to quietness.

By contrast, if monitoring of the photographic image with the external liquid crystal monitor 19 has been turned ON, then, since the photographic image is being looked at via the external liquid crystal monitor 19, it must be the case that the user is performing photography with his face comparatively far removed from the camera 1. In this case, since the control noise of the compensation lens 4 will not prove so very strident, the compensation lens 4 is controlled by hardware control during still image photography and while preparations are being made for photography, so as to accord emphasis to controllability over quietness. Moreover, during photography of a moving image, the compensation lens 4 is controlled by software control, since it is not necessary to accord emphasis to controllability to such an extent, and since it may be supposed that sound recording of the sounds around the camera may be simultaneously being performed.

(13) Whether Actuation Sound is ON or OFF

During camera starting when the camera 1 is started by actuation of the main button 21, during actuation member actuation when one of the various types of button, lever, and selectors upon the actuation unit 18 is actuated, during self timer photography, and when photographic operation is performed by actuating the release button 20, the camera 1 is able to emit respectively corresponding operating sounds with the actuation sound generation unit 32 that uses, for example, a sound pressure buzzer or speaker or the like. Moreover, it is possible to change over whether these actuation sounds are ON or OFF.

If these various actuation sounds such as actuation sounds when the camera starts, sounds upon actuation member actuation, and shutter actuation sounds upon photography are set to OFF, then it is considered to be often the case that the user desires that the operating sounds of the camera should be quietened, so that the compensation lens 4 is controlled by software control. On the other hand, if the various actuation sounds are set to ON, then this is interpreted as implying that the user does not desire quietening for the camera operating sounds to such a great extent, and the compensation lens 4 is controlled by hardware control during still image photography and while preparations are being made for photography, so as to accord emphasis to controllability. Moreover, during photography of a moving image, the compensation lens 4 is controlled by software control, since it is not necessary to accord emphasis to controllability to such an extent, and since it may be supposed that sound recording of the sounds around the camera may be simultaneously being performed.

(14) The Self Timer Mode

When performing photography using the self timer, it is often the case that this camera 1 is fixed upon a tripod or the like, so that the user may anticipate high picture quality photography without any camera vibration. Accordingly, when the self timer mode is ON and self timer photography is being performed, the compensation lens 4 is controlled by hardware control, so as to accord emphasis to controllability. On the other hand, when the self timer mode is OFF, i.e. in the case of performing normal photography, the compensation lens 4 is controlled by software control, so as to accord emphasis to quietness.

(15) The Continuous Shooting Mode

Continuous shooting is a mode in which photography is performed successively a plurality of times while the full press switch 120*b* is ON. When continuous shooting is being performed, the shutter 8 is opened and closed for each frame of photography, and this generates a drive noise. Furthermore, if the focus is re-adjusted by driving the focusing lens 5 for each frame of photography, then a drive noise caused by focusing lens 5 is also emitted. Due to this, when continuous shooting is being performed, it is often the case that the control noise of the compensation lens 4 is drowned out by those other sounds, so that the control noise does not become strident. Accordingly, when the continuous shooting mode is set to continuous shooting, the compensation lens 4 is controlled by hardware control in order to accord emphasis to controllability. On the other hand, when the continuous shooting mode is set to 'normal', i.e. during single shot photography, the compensation lens 4 is controlled by software control in order to accord emphasis to quietening.

(16) The Camera Vibration Compensation Mode

The camera 1 can be changed over so that the camera vibration compensation mode is ON or OFF. As the camera vibration compensation mode being ON, there are three modes: a 'compensation only during photography' mode, a 'compensation always' mode, and a 'panning' mode.

The 'compensation only during photography' mode is a mode in which image vibration compensation is not performed while preparations are being made for photography, but compensation is only performed during photography. And the 'compensation always' mode is a mode in which image vibration compensation is performed both while preparations are being made for photography, and during photography.

This 'compensation only during photography' mode and 'compensation always' mode are set by the control unit 10, based upon actuation of the actuation unit 18 by the user.

The 'panning' mode is a mode in which image vibration compensation is not performed in a panning direction, that is the direction in which the camera is shaken due to panning, but rather image vibration compensation is performed in the direction that is orthogonal to the panning direction. When the 'panning' mode is set, there are the following two cases.

The first case is when the 'panning' mode is set by the control unit 10, based upon actuation of the actuation unit 18 by the user. When the 'panning' mode has been set by manual setting by the user, the control unit 10 sets the horizontal direction as the panning direction.

The second case is when, even though the 'compensation only during photography' mode or the 'compensation always' mode has been set by manual setting by the user, transition to the 'panning' mode takes place due to shifting of the camera 1 being detected by the control unit 10. If the 'panning' mode has been set by automatic detection of panning, then the control unit 10 sets the direction in which the camera is shifting as the panning direction. Such automatic detection of panning may be performed using a known technique.

For example, the control unit 10 may make a decision as to whether or not the camera 1 is shifting toward a constant direction, based upon the outputs of the vibration gyros 200*a* and 200*b*. And the control unit 10, along with setting the 'panning' mode, also decides upon the shift direction of the camera 1 based upon the output of the vibration gyros 200*a* and 200*b*, and sets this shift direction as the panning direction.

When the camera vibration compensation mode is OFF, then image vibration compensation is not performed, and the compensation lens 4 is controlled to a predetermined position in the approximate center of its range of movement, at which better optical performance is obtained. And, although the compensation lens 4 is shifted according to the detected camera vibration when the camera vibration compensation mode is ON, the control noise of the compensation lens 4 is small as compared to when the image vibration is being compensated, since the compensation lens 4 continues to be controlled to its predetermined position when the camera vibration compensation mode is OFF. Accordingly, in this case, the compensation lens 4 is controlled by hardware control, and quietening is maintained while giving emphasis to controllability of the compensation lens 4. It should be understood that it would also be acceptable to employ software control while preparations are being made for photography and when moving image photography is being performed.

When the camera vibration compensation mode is ON and set to the 'compensation always' mode, then, during still image photography, the compensation lens 4 is controlled by hardware control, so that emphasis is accorded to controllability. Moreover, while preparations are being made for photography and when moving image photography is being performed, the compensation lens 4 is controlled by software control so that emphasis is accorded to quietening, since it is not so necessary to emphasize controllability as during still image photography. It should be understood that, if quietening is to be emphasized over controllability, it would also be acceptable to arrange to perform software control even during still image photography.

In the case of the 'compensation only during photography' mode in which the image vibration compensation is performed only during photography, then, as previously described, during the preparations for photography, the compensation lens 4 is controlled to be in the approximate center of its control range, and the control noise of the compensation lens 4 is small. Due to this, during the preparations for photography, the compensation lens 4 is controlled by hardware control, and quietening is maintained while giving emphasis to controllability.

During still image photography, the compensation lens 4 is controlled by hardware control, so that emphasis is accorded to controllability. And, during moving image photography, the compensation lens 4 is controlled by software control so that emphasis is accorded to quietening, since it is not so necessary to emphasize controllability as during still image photography.

Moreover, in the case of the 'panning' mode, in the panning direction, the compensation lens 4 is controlled to be in the approximate center of its control range, and the control noise of vibration compensation is small. Due to this, the compensation lens 4 is always controlled by hardware control, and quietening is maintained while giving emphasis to controllability. On the other hand, in the direction that is orthogonal to the panning direction (the non-panning direction), during still image photography, the compensation lens 4 is controlled by hardware control, so that emphasis is accorded to controllability. Furthermore, during the preparations for photography and during moving image photography, in the non-panning direction, the compensation lens 4 is controlled by software control so that emphasis is accorded to quietening, since it is not so necessary to emphasize controllability as during still image photography.

(17) The Frame Rate During Moving Image Photography

The frame rate during moving image photography is a setting for the number of frames that are photographed in the space of one second during moving image photography. Although, the higher is the frame rate during moving image photography, the smoother photographic operation can be performed, the amount of data to be recorded becomes large. Conversely, although the lower is the frame rate during moving image photography, the coarser does the movement in the resulting photography become, the amount of data to be recorded becomes smaller. Accordingly, if the frame rate during moving image photography is high, then the compensation lens 4 is controlled by hardware control in order to accord emphasis to controllability, in order to perform photography smoothly with a highly advantageous effect for image vibration compensation. Conversely, if the frame rate during moving image photography is low, then the compensation lens 4 is controlled by software control in order to accord emphasis to quietening, since it is only possible to obtain a photographic result in which the movement is coarse in any case, and accordingly it becomes unnecessary to obtain the advantageous effect of image vibration compensation to a very great extent.

(18) Whether or not Sound Recording is being Performed During Moving Image Photography Next, a description will be given relating to changing over the control method for the compensation lens 4 according as to whether or not sound recording is being performed during moving image photography. If moving image photography and sound recording are being performed at the same time, then the compensation lens 4 is controlled by software control so as to emphasize quietening, since the control noise of the compensation lens 4 can become cacophonous when sound recorded. However, if moving image photography and sound recording are not being performed at the same time, then the compensation lens is controlled by hardware control so as to emphasize controllability.

An example of selection as to whether to use hardware control or software control as the control method for the compensation lens 4, in relation to the photographic conditions and various types of mode settings, has been explained in detail as described above. However, some cases also exist in which it is not possible to combine together the photographic conditions and the various types of mode setting and so on shown in Tables 3 and 4 at the same time.

For example, according to Table 3, during photography of a still image in which the photographic focal point distance is 150 mm or more, the compensation lens 4 is controlled by hardware control. On the other hand, the compensation lens 4 is controlled by software control when the photographic magnification is 1/1 times or greater. However, if the photographic focal point distance is 150 mm or more, and moreover the photographic magnification is 1/1 times or greater, then whether or not the compensation lens 4 is to be controlled by hardware control or by software control needs to be determined on a case by case basis, according to the character of the camera 1 as a manufactured product.

6. A Concrete Sequence Example

Next, a concrete example of an operational sequence for the camera 1 according to the present invention will be described.

6-1. During Preparations for Photography

Figure 16:
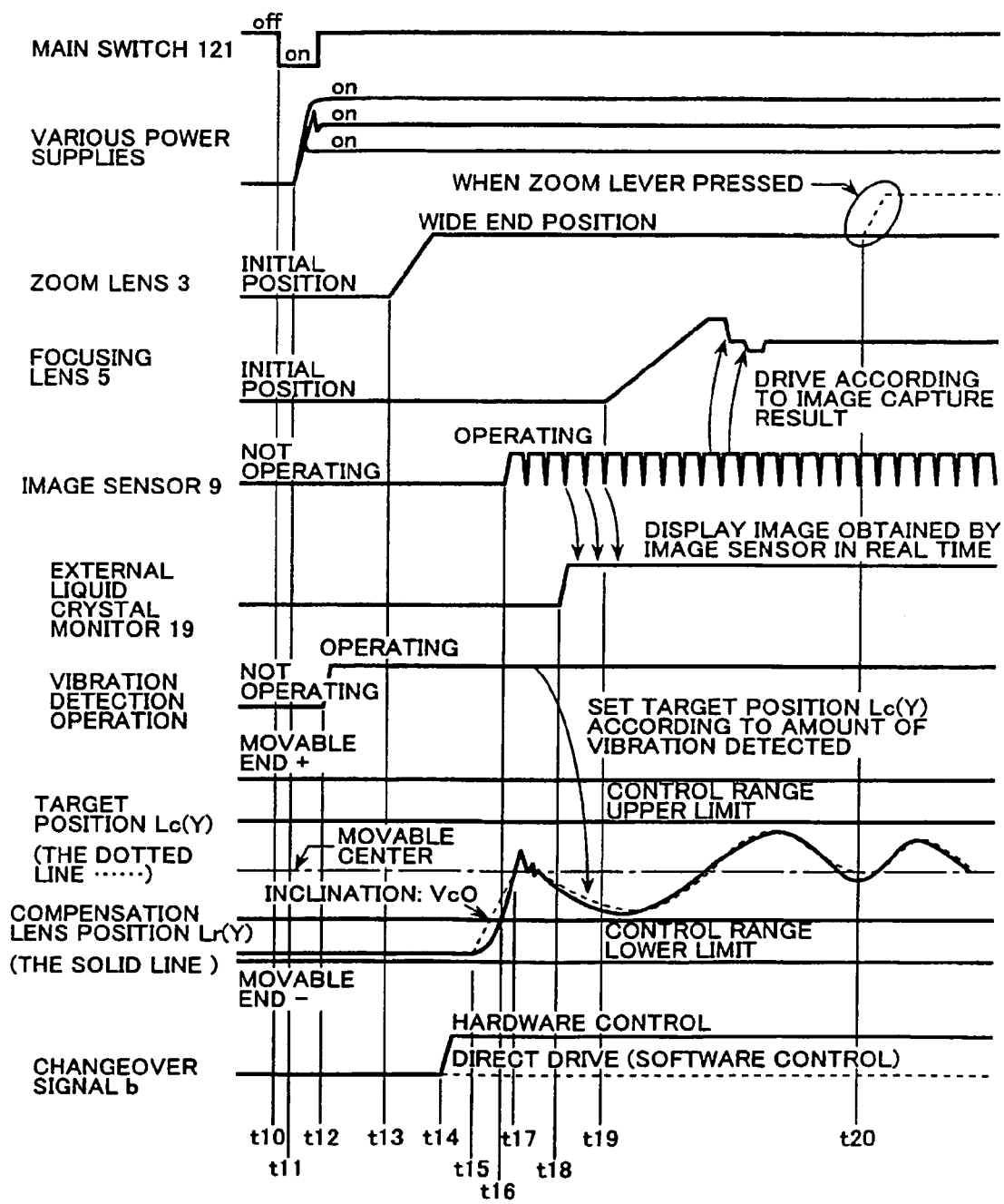
FIG. 16 is a timing chart showing one example of a sequence while preparations are being made for photography.

FIG. 16 is a timing chart showing one example of a sequence while preparations are being made for photography.

The operation of this camera 1 when the user presses the main button 21 of the camera 1 will be explained. FIG. 16 is a timing chart showing, principally, the operations performed by the control unit 10 when the main button 21 is pressed, and the main switch 121, that operates together therewith, is turned ON. It should be understood that, although two sections that are related to control of the compensation lens 4 are present, one for the X axis direction and one for the Y axis direction, since they operate in a similar manner, only the section for the Y axis direction is described in FIG. 16.

The control range upper limit and the control range lower limit shown by the doubled lines in FIG. 16 show the range (the control range) in which, during image vibration compensation, the target position Lc(Y) is calculated by the vibration control unit 10b. In other words, however large the value that has been detected by the vibration gyros 200a and 200b may be, still the vibration control unit 10b never sets the target position Lc(Y) outside this control range. This control range is set by the vibration control unit 10b based upon the photographic conditions such as the setting state of the camera, as will be described hereinafter. Due to this, the position of the compensation lens 4, that is driven by the drive units 203a and 203b and the coils 40a and 40b, is limited to lie within the control range that has been set.

Examples of this control range will now be explained using FIG. 3. An example of the control range during preparations for photography and during moving image photography is shown by the control range 800 during preparations photography and during moving image photography, shown by the broken line. Furthermore, an example of the control range during still image photography is shown by the control range 801 during still image photography, shown by the broken line. The vibration control unit 10b sets the control range (during the preparations for photography and during moving image photography, the control range 800, and during still image photography the control range 801) as a range inside of the range of movement 400. Moreover, in this embodiment, the center of the range of movement of the compensation lens 4 and the center of its control range agree with one another.

When the main switch 121 is turned ON at a timing t10, then, at a timing t11, the main control unit 10a of this camera 1 turns on various types of power supply (not shown in the figures), including the power supply VP for the drive units 203a and 203b and the power supply that operates, at least, the vibration compensation circuit unit 14; and the camera 1 goes into a state in which it performs operations as described hereinafter. Next, the vibration control unit 10b starts detecting the vibration that acts upon the camera 1, from a timing t12 at which, at least, the power supply that was turned on at the timing t11 has stabilized, and the outputs of the vibration gyros 200a and 200b and the outputs of the vibration gyro processing units 201a and 201b have stabilized. This camera vibration detection is performed by the method previously described, based upon the outputs of the vibration gyro processing units 201a and 201b.

And, at a timing t13, the main control unit 10a monitors the position of the zoom lens 3 with the zoom lens position detection unit 13, and drives the zoom lens 3 with the zoom lens drive unit 12 from its predetermined current initial position to a predetermined "wide" end position. Then, at a timing t14, the vibration control unit 10b actuates changeover signals a and b according to the set modes of the camera and according to the photographic conditions, and changes over the control of the compensation lens 4 to software control or to hardware control. Due to this, the changeover units 205a and 205b shown in FIG. 8 operate, and either drive amounts Dh(X) and Dh(Y) by software control, or drive amounts Ds(X) and Ds(Y) by hardware control, are selected.

And, at a timing t15, taking the present position of the compensation lens 4 as its initial value, the vibration control unit 10b changes the target position Lc(X) of the compensation lens 4 towards the center of its control range at a predetermined slope Vc0. If the changeover signals a and b of the vibration control unit have been changed over to software control, then the vibration control unit 10b performs the calculation of the drive amounts Ds(X) and Ds(Y) by software at a predetermined control sampling period ts. This calculation of the drive amounts Ds(X) and Ds(Y) is performed by the method that has been described in the section on software control, based upon the target position Lc(X), Lc(Y) for the compensation lens 4, and upon the compensation lens position Lr(X), Lr(Y) that has been obtained from the Hall element processing units 202a and 202b. The drive amounts Ds(X) and Ds(Y) that have thus been calculated are outputted to the changeover units 205a and 205b. And, based upon these drive amounts Ds(X) and Ds(Y), the coils 40a and 40b are driven via the PWM conversion units 204a and 204b and the drive units 203a and 203b. As a result, the control of the compensation lens 4 by software control is performed.

On the other hand, if the changeover signals a and b have been changed over to hardware control, then the vibration control unit 10b sets the target position Lc(X), Lc(Y) for the compensation lens 4 that has been changed by this predetermined slope Vc0 into the hardware control units 206a and 206b. And the hardware control units 206a and 206b calculate the drive amounts Dh(X) and Dh(Y) at a control sampling period th that is higher speed. These drive amounts Dh(X) and Dh(Y) that have been thus calculated are outputted to the changeover units 205a and 205b. And, based upon the drive amounts Dh(X) and Dh(Y) that have been thus calculated, the hardware control units 206a and 206b drive the coils 40a and 40b via the PWM conversion units 204a and 204b and the drive units 203a and 203b. As a result, the control of the compensation lens 4 by hardware control is performed. By the operation described above from the timing t15, the compensation lens 4 is gradually centered in the center of its control range.

By centering is meant processing to shift the compensation lens 4 to the approximately central portion of its control range. The central portion of the control range corresponds to the origin in FIG. 3. It should be understood that, in centering, the compensation lens 4 may not be shifted precisely to the central portion of its control range, and a certain amount of error due to mechanical errors or control errors of the mechanism is considered to be permitted. It should be understood that, if the positions of the center of the control range and of the center of the range of movement almost agree with one another, then it would also be acceptable to arrange to perform this centering processing by shifting the compensation lens 4 to the approximately central portion of its range of movement.

When the compensation lens 4 is centered in the center of its control range, from a timing t17, the vibration control unit 10b sets a target position Lc(X), Lc(Y) so as to compensate the vibration acting upon the camera 1, and starts control of the compensation lens 4. In concrete terms, the compensation lens 4 is software controlled or hardware controlled, according to the changeover signals a and b that are already set at the timing t14, to the target position Lc(X), Lc(Y) for the compensation lens 4 that has been set according to the camera vibration detected by the vibration gyro processing units 201a and 201b. As a result, the image vibration on the image sensor 9 is compensated. However, the target position Lc(X), Lc(Y) for the compensation lens 4 is limited to being within the range from the control range upper limit to the control range lower limit as delimited by the two doubled lines in FIG. 16, and the compensation lens 4 is controlled within this range.

Thereafter, at a timing t18 at which the control of the compensation lens 4 by the vibration control unit 10b and the vibration compensation circuit unit 14 has at least stabilized, the main control unit 10a starts sequential display upon the external liquid crystal monitor 19 of the images that have been sequentially captured by the image sensor 9. This sequential image display upon the external liquid crystal monitor 19 of these images will hereinafter be termed "monitor image display". In this monitor image display, the images that are sequentially captured by the image sensor 9 are displayed in real time.

Thus, the camera 1 depicts the images that have been captured by the image sensor 9 in real time upon the external liquid crystal monitor 19. On the other hand, at the time point of the timing t15, the compensation lens 4 is in a state in which it has dropped down to the extreme of its range of movement in the direction of gravity, due to its own weight. Thus, in this embodiment, until at least the "monitor image display" upon the external liquid crystal monitor 19 is started, the compensation lens 4 is centered in the center of its control range, and thereafter it is arranged for image vibration compensation to be started and "monitor image display" to be started.

Next, from a timing t19, the main control unit 10a monitors the position of the focusing lens 5 as detected by the focusing lens position detection unit 16, based upon the contrast of the image that is captured by the image sensor 9. Furthermore, the main control unit 10a drives the focusing lens with the focusing lens drive unit 15, and starts focus adjustment of an image of the photographic subject upon the surface of the image sensor 9. Here, the reason that this starting of focus adjustment is performed at the timing t19 at least after the image vibration compensation has been started, is the following. With a camera such as the one of this embodiment that performs focus adjustment by finding a focus position according to the contrast of the image that is captured by the image sensor 9, the contrast of the captured image is enhanced by the image vibration on the surface of the image sensor 9 being compensated by the vibration compensation, and accordingly the accuracy of focus adjustment is enhanced.

Furthermore, the zoom lever 22 is actuated and the zoom down switch 122a or the zoom up switch 122b is turned ON, and the main control unit 10a detects the position of the zoom lens 3 with the zoom lens position detection unit 13 according thereto. And the main control unit 10a drives the zoom lens 3 with the zoom lens drive unit 12, and thereby changes the photographic focal point distance. This corresponds to the timing t20 of FIG. 16.

6-2. The Operation During Photography

Next, the sequence when the user full presses the release button 20 and performs photography will be explained.

6-2-1. The Various Modes and the Operation During Photography

In this embodiment, whether or not the compensation lens is centered in the approximate center of its control range directly before photography, whether or not the control range of the compensation lens is enlarged during photography, and whether or not the compensation lens is centered in the approximate center of its control range directly after photography, are changed over according to conditions such as the scene that is being photographed, the photographic conditions, various types of modes, and so on.

(1) Centering of the Compensation Lens 4 Before Photography

First the advantages and shortcomings when, directly before photography, the compensation lens 4 is centered in the approximately central portion of its control range, and when it is not so centered, are shown as a list in Table 5.

TABLE 5

| ITEM | CENTERING PERFORMED BEFORE IMAGE CAPTURE | CENTERING NOT PERFORMED BEFORE IMAGE CAPTURE |
|---|---|---|
| OPTICAL PERFORMANCE | DOES NOT EASILY DETERIORATE | EASILY DETERIORATES |
| VIBRATION AMOUNT THAT CAN BE COPED WITH | CAN COPE WITH LARGE VIBRATION | LARGE VIBRATION HARD TO COPE WITH |
| RELEASE TIME LAG | LONG | SHORT |
| CHANGE BETWEEN PHOTOGRAPHIC COMPOSITION BEFORE PHOTOGRAPHY AND COMPOSITION OF PHOTOGRAPHIC RESULT | MAY CHANGE | DOES NOT EASILY CHANGE |

The optical design of a camera having an image vibration compensation function, like the camera of this embodiment, is basically planned so that deterioration of the optical performance is small, even when the compensation lens 4 is shifted by a large amount during image vibration compensation. However, when the compensation lens 4 is shifted by a large amount, it is easy for the optical performance, such as the resolution at the periphery of the surface of the image sensor 9 and the image curvature and so on, to deteriorate greatly, since priority is accorded to manufacturing cost and also to saving space. Accordingly, when emphasis is to be given to the aspect of optical performance, it is not desirable for the control range of the compensation lens during image vibration compensation to be made very large.

The advantageous aspects of when, directly before photography, the compensation lens 4 is centered at the approximately central portion of its control range, are as follows.

Namely, since image vibration compensation is performed after the compensation lens 4 is centered in the approximately central portion of its control range before photography, during photography, the probability is high that the image vibration compensation will be performed under the compensation lens 4 positioned in the vicinity of the approximately central portion of its control range, and there is a benefit with regard to deterioration of the optical performance. Furthermore, during photography, since the image vibration compensation is started by the compensation lens 4 positioned at the vicinity of the approximately central portion of the control range, it is possible effectively to employ the entire control range of the compensation lens 4 from its upper limit to its lower limit. As a result, so that it becomes possible to perform compensation for comparatively large image vibration. However, the release time lag becomes longer by the time period that is required for the centering of the compensation lens 4. Moreover, since the compensation lens 4 is centered in the approximately central portion of its control range, accordingly the composition of the image that is actually photographed may undesirably change with respect to the composition of the captured image that was displayed upon the external liquid crystal monitor 19 before photography.

On the other hand, if the compensation lens 4 is not centered before image capture, advantageous aspects are that the release time lag is shortened by an amount corresponding to the centering that is not performed, and also that almost no deviation occurs between the composition of the image that is actually photographed and the composition of the image before photography, and these facts are contrary to the situation described above when the compensation lens 4 is centered.

(2) The Control Range of the Compensation Lens during Photography

With the camera 1 of this embodiment, whether or not the control range of the compensation lens 4 is changed during image capture is changed over according to the scene that is being photographed and according to the photographic conditions and various types of modes. However there are both shortcomings and advantages according as to whether or not the control range is changed, as shown in FIG. 6.

TABLE 6

| ITEM | CONTROL RANGE FIXED DURING IMAGE CAPTURE | CONTROL RANGE ENLARGED DURING IMAGE CAPTURE |
|---|---|---|
| OPTICAL PERFORMANCE | DOES NOT EASILY DETERIORATE | DETERIORATES WITH LARGE VIBRATION |
| VIBRATION AMOUNT THAT CAN BE COPED WITH | LARGE VIBRATION HARD TO COPE WITH | CAN COPE WITH LARGE VIBRATION |

While the optical performance does not deteriorate easily if during image capture the control range of the compensation lens 4 is kept fixed, on the other hand, it is not easy to cope with large image vibration. By contrast, if the control range of the compensation lens 4 is enlarged during image capture, then it becomes possible to cope with large image vibration, but, when large vibrations are generated and the compensation lens 4 is greatly shifted, then the deterioration of the optical performance becomes large.

Figure 17:
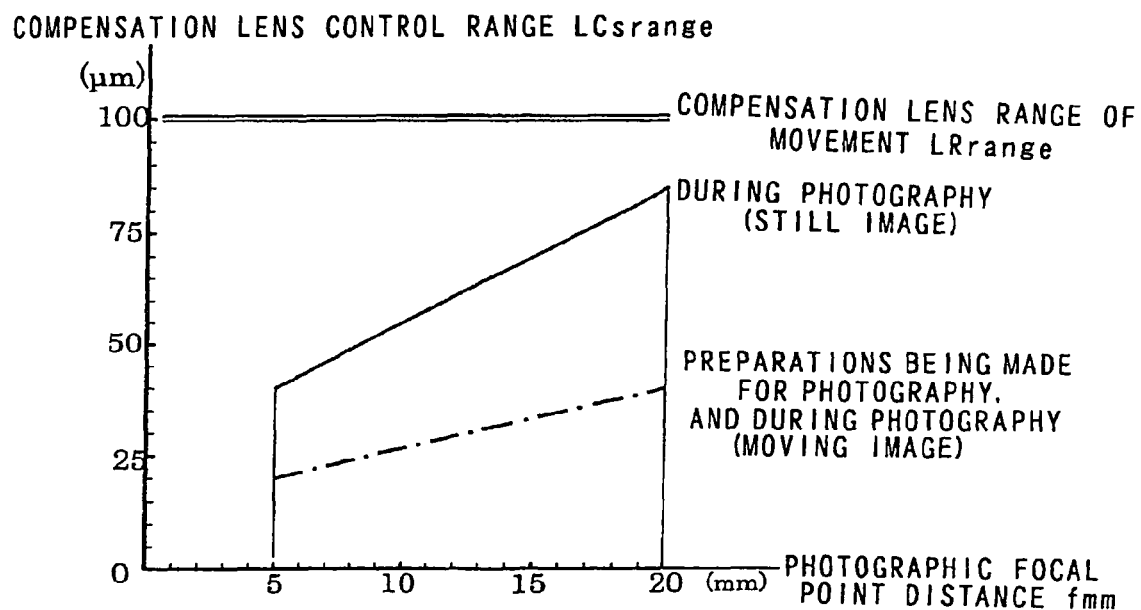
FIG. 17 is a figure showing the relationship between photographic focal point distance and the compensation lens control range.

FIG. 17 is a figure showing an example of the control range of the compensation lens 4 during preparations for photography, and during photography. In the example of FIG. 17, during photography of a still image, the control range of the compensation lens 4 is enlarged about twice, as compared to when preparations are being made for photography. Although, here, the control range during moving image photography is made to be the same as while preparations are being made for photography, it might be made to be the same as during photography of a still image; or each of these three might be set to the respective optimum range. Moreover, in the example shown in FIG. 17, the fact that, the longer is the photographic focal point distance, the larger the control range of the compensation lens 4 is made, is because the longer the photographic focal point distance is, the greater is the amount of image vibration upon the image capture surface, so that it is also necessary to widen the control range of the compensation lens 4. It should be understood that for reference, in FIG. 3, there is shown the relationship between the range of movement of the compensation lens 4 and its control range, when the photographic focal point distance of this camera 1 is the longest (the "tele" end).

(3) Centering of the Compensation Lens after Photography

Next, the advantages and shortcomings when the compensation lens 4 is centered in the approximately central portion of its control range after photography, and when it is not so centered, are shown as a list in Table 7.

tion compensation is resumed from that point, accordingly the entire control range of the compensation lens 4, from its upper limit to its lower limit, is used effectively. Due to this, the monitor image that is monitored with the external liquid crystal monitor 19 is stabilized because of the advantageous effect of image vibration compensation.

Conversely, if the compensation lens 4 is not centered at the approximately central portion of its control range after photography, then the difference between the composition that has been image-captured by photography, and the composition of the captured image that is displayed upon the screen of the external liquid crystal monitor 19 that is performed thereafter, almost disappears. Moreover, the continuous shooting speed is enhanced by the time period in which centering of the compensation lens 4 was performed. However there is the shortcoming that if, after photography, the compensation lens 4 is in the vicinity of the end of its control range at the timing at which image vibration compensation is resumed, then, even if a comparatively small camera vibration is applied, the compensation lens may undesirably easily reach the end of its control range, so that it becomes impossible to perform image vibration compensation.

(4) Centering before and after Capturing an Image of the Photographic Scene, and the Control Range During Image Capture In this embodiment, as explained above, it is possible effectively to utilize the advantages of each case, i.e. of either centering the compensation lens in the approximate center of its control range directly before photography or not, of enlarging the control range of the compensation lens during photography or not, and of centering the compensation lens in

TABLE 7

| ITEM | PERFORM CENTERING AFTER IMAGE CAPTURE | DO NOT PERFORM CENTERING AFTER IMAGE CAPTURE |
| --- | --- | --- |
| CHANGE OF COMPOSITION BETWEEN PHOTOGRAPHIC RESULT AND AFTER PHOTOGRAPHY | CHANGE PERFORMED | DOES NOT CHANGE EASILY |
| SEQUENTIAL SHOOTING SPEED | DISADVANTAGEOUS | ADVANTAGEOUS |
| MONITOR IMAGE STABILITY AFTER PHOTOGRAPHY | PERFORMED STABLY | DISADVANTAGEOUS |

If the compensation lens 4 is centered in the approximate center of its control range after photography, then the image of the photographic subject shifts upon the image capture surface by only the amount that the compensation lens 4 is centered upon the approximately central portion of its control range. As a result, there is the shortcoming that change occurs between the composition that has been image-captured by photography, and the composition of the captured image that is displayed upon the screen of the external liquid crystal monitor 19, as is performed thereafter. On the other hand, since the compensation lens 4 is centered in the approximately central portion of its control range, and image vibrathe approximate center of its control range after photography or not; and by moreover compensating for the shortcomings of these various cases, it is possible to obtain an image vibration compensation performance and a camera performance of a quality that has not heretofore been available.

Next, concrete examples of whether or not the compensation lens should be centered in the approximate center of its control range directly before photography, of whether or not the control range of the compensation lens should be enlarged during photography, and of whether or not the compensation lens should be centered in the approximate center of its control range directly after photography, are shown in Tables 8 and 9.

TABLE 8

| CONDITION | | CENTERING BEFORE PHOTOGRAPHY | CONTROL RANGE DURING PHOTOGRAPHY | CENTERING AFTER PHOTOGRAPHY |
|---|---|---|---|---|
| RELEASE PRIORITY MODE | DURING RELEASE PRIORITY MODE | DO NOT PERFORM | ENLARGE | PERFORM |
| | DURING NON RELEASE PRIORITY MODE | PERFORM | ENLARGE | DO NOT PERFORM |
| PICTURE QUALITY PRIORITY MODE | PICTURE QUALITY PRIORITY MODE | DO NOT PERFORM | DO NOT PERFORM | DO NOT PERFORM |
| | VIBRATION COMPENSATION PRIORITY MODE | PERFORM | PERFORM | PERFORM |
| PHOTOGRAPHIC FOCAL POINT DISTANCE | 80 mm OR LESS | DO NOT PERFORM | DO NOT CHANGE | DO NOT PERFORM |
| | 80 mm~150 mm | DO NOT PERFORM | ENLARGE | PERFORM |
| | 150 mm OR MORE | PERFORM | ENLARGE | PERFORM |
| | DIGITAL ZOOM IN USE | PERFORM | DO NOT CHANGE | DO NOT PERFORM |
| PHOTOGRAPHIC MAGNIFICATION | 1/1 OR MORE | DO NOT PERFORM | ENLARGE | PERFORM |
| | 1/1~1/5 | PERFORM | ENLARGE | DO NOT PERFORM |
| | 1/5 OR LESS | PERFORM | DO NOT CHANGE | DO NOT PERFORM |
| PHOTOGRAPHIC SUBJECT DISTANCE | 0.3 m OR CLOSER | DO NOT PERFORM | ENLARGE | PERFORM |
| | 0.3 m~2.0 m | PERFORM | ENLARGE | DO NOT PERFORM |
| | 2.0 m OR FURTHER | PERFORM | DO NOT CHANGE | DO NOT PERFORM |
| COMPENSATION LENS SHIFT AMOUNT IMAGE CAPTURE SURFACE MAGNIFICATION | 1.0 OR LESS | PERFORM | ENLARGE | PERFORM |
| | 1.0~2.0 | PERFORM | DO NOT CHANGE | PERFORM |
| | 2.0 OR MORE | DO NOT PERFORM | DO NOT CHANGE | DO NOT PERFORM |
| PHOTOGRAPHIC EXPOSURE | 1/4 OR LESS | PERFORM | ENLARGE | PERFORM |
| | 1/4~1/125 | PERFORM | DO NOT CHANGE | DO NOT PERFORM |
| | 1/125 OR MORE | DO NOT PERFORM | DO NOT CHANGE | DO NOT PERFORM |
| FOCUSING MODE | MACRO AF | DO NOT PERFORM | ENLARGE | PERFORM |
| | NORMAL | PERFORM | DO NOT CHANGE | DO NOT PERFORM |
| | LONG DISTANCE AF | PERFORM | DO NOT CHANGE | DO NOT PERFORM |
| | INFINITY | PERFORM | DO NOT CHANGE | DO NOT PERFORM |
| FLASH PHOTOGRAPHY MODE | FLASH PROHIBITED | PERFORM | ENLARGE | PERFORM |
| | SLOW SYNCHRO | PERFORM | ENLARGE | PERFORM |
| | AUTO | PERFORM | DO NOT CHANGE | DO NOT PERFORM |
| | RED-EYE REDUCTION | PERFORM | DO NOT CHANGE | DO NOT PERFORM |
| | FORCED FLASH | DO NOT PERFORM | DO NOT CHANGE | DO NOT PERFORM |
| NUMBER OF RECORDED PICTURE ELEMENTS MODE 1 | SMALL | DO NOT PERFORM | DO NOT CHANGE | DO NOT PERFORM |
| | MIDDLE | PERFORM | ENLARGE | PERFORM |
| | LARGE | PERFORM | ENLARGE | PERFORM |
| NUMBER OF RECORDED PICTURE ELEMENTS MODE 2 | L SIZE/ POSTCARD SIZE | DO NOT PERFORM | DO NOT CHANGE | DO NOT PERFORM |
| | WIDE (16:9) | PERFORM | ENLARGE | PERFORM |
| | NORMAL (4:3) | PERFORM | ENLARGE | PERFORM |
| RECORDED IMAGE COMPRESSION RATIO MODE | NORMAL | DO NOT PERFORM | DO NOT CHANGE | DO NOT PERFORM |
| | FINE | PERFORM | ENLARGE | PERFORM |
| | SUPER FINE | PERFORM | ENLARGE | PERFORM |
| ISO SENSITIVITY MODE | 800 OR MORE | DO NOT PERFORM | DO NOT CHANGE | DO NOT PERFORM |
| | 200~400 | PERFORM | ENLARGE | PERFORM |
| | AUTO | PERFORM | ENLARGE | PERFORM |
| | 100 OR LESS | PERFORM | ENLARGE | PERFORM |

TABLE 9

| CONDITION | | | CENTERING BEFORE PHOTOGRAPHY | CONTROL RANGE DURING PHOTOGRAPHY | CENTERING AFTER PHOTOGRAPHY |
|---|---|---|---|---|---|
| WHITE BALANCE | SET AUTOMATICALLY AS | INCANDESCENT LIGHTING | PERFORM | ENLARGE | PERFORM |
| | | FLUORESCENT LIGHTING | PERFORM | ENLARGE | PERFORM |
| | | CLOUDY | DO NOT PERFORM | DO NOT CHANGE | DO NOT PERFORM |
| | | SUNLIGHT | DO NOT PERFORM | DO NOT CHANGE | DO NOT PERFORM |
| | MANUAL | INCANDESCENT LIGHTING | PERFORM | ENLARGE | PERFORM |
| | | FLUDRESCENT LIGHTING | PERFORM | ENLARGE | PERFORM |
| | | CLOUDY | DO NOT PERFORM | DO NOT CHANGE | DO NOT PERFORM |
| | | SUNLIGHT | DO NOT PERFORM | DO NOT CHANGE | DO NOT PERFORM |
| PHOTOGRAPHIC IMAGE MONITORING WITH EXTERNAL LIQUID CRYSTAL MONITOR | | OFF | PERFORM | ENLARGE | PERFORM |
| | | ON | DO NOT PERFORM | DO NOT CHANGE | DO NOT PERFORM |
| SELF TIMER MODE | OFF (DURING NORMAL PHOTOGRAPHY) | | PERFORM | ENLARGE | PERFORM |
| | ON | | DO NOT PERFORM | DO NOT CHANGE | DO NOT PERFORM |
| SEQUENTIAL | NORMAL | | PERFORM | ENLARGE | PERFORM |

TABLE 9-continued

| CONDITION | | | CENTERING BEFORE PHOTOGRAPHY | CONTROL RANGE DURING PHOTOGRAPHY | CENTERING AFTER PHOTOGRAPHY |
|---|---|---|---|---|---|
| SHOOTING MODE VIBRATION COMPENSATION MODE | SEQUENTIAL SHOOTING | | DO NOT PERFORM | DO NOT CHANGE | DO NOT PERFORM |
| | ON COMPENSATION ONLY DURING PHOTOGRAPHY MODE | | DO NOT PERFORM | ENLARGE | PERFORM |
| | COMPENSATION ALWAYS MODE | | PERFORM | DO NOT CHANGE | PERFORM |
| | PANNING MODE | NON PANNING DIRECTION AXIS | PERFORM | ENLARGE | PERFORM |
| | | PANNING DIRECTION AXIS | DO NOT PERFORM | DO NOT CHANGE | DO NOT PERFORM |
| | OFF | | DO NOT PERFORM | DO NOT CHANGE | DO NOT PERFORM |
| MOVING IMAGE/ STILL IMAGE PHOTOGRAPHY SETTING | STILL IMAGE PHOTOGRAPHY | | PERFORM | ENLARGE | PERFORM |
| | MOVING IMAGE PHOTOGRAPHY | | DO NOT PERFORM | DO NOT CHANGE | DO NOT PERFORM |
| COMPOSITION PRIORITY MODE | NON-COMPOSITION PRIORITY MODE | | PERFORM | ENLARGE | PERFORM |
| | COMPOSITION PRIORITY MODE | | DO NOT PERFORM | DO NOT CHANGE | DO NOT PERFORM |

The Release Priority Mode, and Centering Before and After Image Capture

Sometimes a problem occurs with the release time lag when trying to photograph a photographic subject whose movement is fast, such as for example in the case of an animal photograph or an insect photograph, or when trying to photograph an expressive child. In order for sudden shutter chances of photographic subjects to be caught, and for photography to succeed without allowing special occasions to slip by, it is necessary to shorten, as much as possible, the time period from when the release button 20 is actuated, to when the shutter is actually snapped over and photography is performed. To be accurate, it is necessary to shorten, as much as possible, the time period until the image capture operation by the image sensor 9 is started. Thus, the release priority mode is a mode that is provided for this type of photographic scene.

In the case of the release priority mode, centering of the compensation lens 4 to the approximately central portion of its control range is not performed directly before photography, so that the release time lag is shortened. Moreover the control range of the compensation lens 4 is enlarged before the photographic operation starts, since, with this kind of photographic scene that includes movement, it is often the case that the amount of camera vibration is large. Furthermore it is very often the case, with this type of photographic scene, that after photography another shot will be taken, and a case may be supposed in which the photographer thinks that the demeanor of his own child is cute, and accordingly shoots one frame after another repeatedly. In this type of case, after photography, the compensation lens 4 is centered at the approximately central portion of its control range, so as to prepare for the next photograph and so that the advantageous effect of image vibration compensation may become stabilized more quickly. Since the compensation lens 4 is centered after photography is performed, accordingly image vibration compensation is resumed from this position at which it has been centered, and the control range of the compensation lens 4 is effectively employed, from its upper limit to its lower limit. As a result, the benefits of image vibration compensation are more quickly manifested upon the monitor image that is being monitored with the external liquid crystal monitor 19.

On the other hand, in the case of the non release priority mode, centering of the compensation lens 4 to the approximately central portion of its control range is performed directly before photography, so that it is ensured that it is possible to cope with a larger amount of camera vibration. Moreover, by performing enlargement of the control range during photography, it is possible effectively to employ the entire control range from its upper limit to its lower limit, so that it becomes possible to compensate a comparatively large camera vibration. After photography, centering of the compensation lens 4 is not performed, so as not to impart any sense of discomfort due to deviation between the angle of field of the photographic result that is being displayed upon the external liquid crystal monitor 19, and the angle of field of the monitor image.

It should be understood that, as a variant example of this non release priority mode, it would also be acceptable to set the control range during photography so that it does not change. In this case, since it is arranged to perform centering before photography so that the compensation lens 4 is shifted to the approximately central portion of its control range, accordingly, provided that the amount of camera vibration is not extremely great, it can be coped with sufficiently, even though the control range during photography is not enlarged.

The Picture Quality Priority Mode, and Centering Before and After Image Capture

This camera 1 has a mode in which photography is performed while giving priority to the picture quality of photography, and a mode in which photography is performed while giving priority to the beneficial effects of image vibration compensation. The picture quality priority mode is a mode in which it is supposed that a scene is photographed in conditions in which the camera does not vibrate. By conditions in which the camera does not vibrate, is meant that the camera is solidly gripped, or that photography is being performed in bright conditions outdoors, or that photography is being performed while the camera is fixed upon a tripod, or the like. In this type of case, the amount of camera vibration is small, and it is often the case that the compensation lens 4 is in the vicinity of the approximately central portion of its control range directly before photography is started.

Accordingly, a sufficient performance of the photographic optical system can be obtained without performing centering of the compensation lens 4 directly before photography. Since the compensation lens 4 is not centered, the release time lag is shortened, and moreover variation between the photographic angle of field during preparations for photography and the angle of field of the photographic result no longer takes place. Enlargement of the control range of the compensation lens 4 is not performed during photography, and deterioration of the optical performance of the photographic optical system is prevented by setting the necessary minimum limit range. Furthermore, by not performing centering of the compensation lens 4 after photography, deviation between the angle of field of the photographic result, and the angle of field of the monitor image upon the external liquid crystal monitor 19 that is resumed after photography, is protected against, and the impartation of a sense of discomfort to the user both before and after photography is suppressed as much as possible.

On the other hand, during the camera vibration priority mode, it is necessary to obtain the advantageous effects of image vibration compensation to the maximum limit, and to suppress as much as possible the probability of occurrence of photographic failure due to camera vibration. In this type of case, since the amount of camera vibration is large, it is often the case that, directly before photography is started, the compensation lens 4 is not in the vicinity of the approximately central portion of its control range. Accordingly, it is considered that a larger amount of camera vibration must be coped with, rather than coping with the release time lag and the variation of composition described above, so that centering of the compensation lens 4 is performed directly before photography. Moreover, by enlarging the control range of the compensation lens 4 during photography, it is possible to cope with a larger amount of camera vibration. It should be understood that, in this case, deterioration of the optical performance is sacrificed due to shifting the compensation lens 4 to a large extent to match the large amount of camera vibration.

Moreover, after photography, centering of the compensation lens 4 is performed, so that the control range of the compensation lens 4 is used effectively from its upper limit to its lower limit. Due to this, even if a large amount of camera vibration takes place, after photography, it is possible to experience the advantageous effects of image vibration compensation upon the monitor image that is monitored with the external liquid crystal monitor 19. However, in this case, there is no option but to accept some sacrifice of angle of field deviation between the angle of field of the photographic result, and the monitor image that is resumed after photography and display of which has been resumed upon the external liquid crystal monitor 19.

The Photographic Focal Point Distance

It is known that, generally, the longer the focal point distance becomes, the greater the amount of vibration of the image upon the image capture surface of the image sensor 9 becomes. If a constant angular vibration θv is applied to this camera 1, then the amount of vibration Lv of the image generated upon the image capture surface is given by the following Equation (8), if the photographic focal point distance is termed fmm. Accordingly, in order to compensate for this image vibration, it is necessary to make the shift amount of the compensation lens 4 greater, the longer is the photographic focal point distance. On the other hand, the range of movement of the compensation lens 4 is finite, and, if too large a range of movement is provided, then the lens barrel 1b of this camera 1 becomes large, and this is accompanied by an increase in cost and a deterioration of the optical performance.

$$Lv = fmm \times \tan \theta v \quad (8)$$

In this embodiment, if the focal point distance is longer than a predetermined value, i.e. if for example it is 150 mm or more, then it is arranged to be able to cope with a larger camera vibration, by centering the compensation lens 4 at the approximately central portion of its control range directly before photography is started. Due to this, during photography, image vibration compensation is performed with the position of the compensation lens in the vicinity of the center of its control range, and deterioration of the optical characteristics is also suppressed. Moreover, if the digital zoom is operated, then photography is performed by cutting out a portion of the captured image obtained by the image sensor 9, and by digitally supplementing this portion and enlarging it. If during preparations for photography the photographic image upon the external liquid crystal monitor is displayed as a moving image, then the photographic image upon the image sensor 9 is enlarged. In this type of case the compensation lens 4 is centered before photography, since deterioration of the optical characteristics can easily appear more prominently.

On the other hand, if the focal point distance is shorter than the predetermined value, then centering of the compensation lens 4 is not performed directly before photography is started. In other words, priority is given to ensuring that no change of composition takes place between the image before photography and the image that is photographed. If the focal point distance is short, then the compensation lens 4 can cope with quite a large amount of camera vibration with only a small shift amount. Moreover, with photography such as commemorative photographs and the like, it is often the case that the photographic focal point distance is short, and it is desirable that no change of composition should take place between the image before photography and the image that is photographed. Furthermore, by not centering the compensation lens 4 before photography, it is also possible to shorten the release time lag.

If the focal point distance is longer than the predetermined value, then, in the same way as previously described, the control range of the compensation lens 4 is enlarged during photography, since it is necessary to shift the compensation lens 4 more in order to compensate for image vibration of the same magnitude. Conversely, if the focal point distance is shorter than the predetermined value, then priority is given to the optical performance, and the control range of the compensation lens 4 is not enlarged during photography, since it is possible to cope with quite a large amount of camera vibration with a small shift amount. If the digital zoom is operating, then deterioration of the optical characteristics can easily appear more prominently, since the photographic image is enlarged. Due to this, priority is accorded to the optical performance, and the control range of the compensation lens 4 is not enlarged during photography.

Moreover, if the focal point distance is longer than the predetermined value, then, as previously described, it is necessary to make the shift amount of the compensation lens 4 greater in order to compensate for image vibration of the same magnitude. Due to this, it is often the case that the compensation lens 4 is shifted to the edge of its control range at the time point that photography has ended. Accordingly, centering of the compensation lens 4 is performed after photography, so that it is ensured that it is possible to utilize the entire control range of the compensation lens 4 in an effective manner, from its lower limit to its upper limit. As a result, even if large camera vibration takes place, it is possible to obtain the advantageous effects of vibration compensation upon the monitor image that is being monitored after photography with the external liquid crystal monitor 19; however, in this case, it is necessary to make some sacrifice with regard to deviation between the angle of field of the result of photography, and the angle of field of the monitor image after photography.

Conversely, if the focal point distance is shorter than the predetermined value, then centering of the compensation lens 4 after photography is not performed, since the shift amount of the compensation lens 4 is small, and the possibility is large that, after photography, the compensation lens 4 will be in the vicinity of the approximately central portion of its control range. Due to this, there is almost no deviation between the angle of field of the result of photography, and the angle of field of the monitor image display of which is resumed after photography, so that no sense of discomfort is imparted to the user. Moreover, centering of the compensation lens 4 after photography is not performed if the digital zoom is operating, since the photographic image is enlarged, and a sense of discomfort would be imparted to the user by deviation between the angle of field of the result of photography, and the angle of field of the monitor image that is resumed after photography.

The Photographic Magnification, and the Photographic Subject Distance

As previously described, when the photographic magnification becomes great or the photographic subject distance is close, it is known that the advantageous effects of image vibration compensation are lost. Thus, in this embodiment, if the photographic magnification has become great, and if the photographic subject distance has become close, then it is supposed that it is often the case that photography is being performed of a photographic subject that moves, such as a living creature like an insect and so on, and accordingly priority is accorded to shortening of the release time lag. Furthermore, to consider the case in which close up photography is being performed of a close and enlarged photographic subject, it is arranged to suppress, as much as possible, change of the angle of field between the image before photography and the photographed image. Accordingly, if the photographic magnification is greater than a predetermined value, or if the photographic subject distance is closer than a predetermined value, then it is arranged not to perform centering of the compensation lens 4 directly before photography. In Table 8, as an example, this predetermined value for the photographic magnification is $\frac{1}{1}$, and this predetermined value for the photographic subject distance is 0.3 m.

Conversely, when the photographic magnification is smaller than the predetermined value or the photographic subject distance is more remote than the predetermined value, then centering of the compensation lens 4 is performed before photography. Since, in this case, it is often the case that photography is being performed of a photographic subject such as scenery or the like whose spatial frequency is high, in other words of a photographic subject that is detailed, accordingly priority is accorded to the image vibration compensation performance and to the optical characteristics, and it is arranged to perform centering of the compensation lens 4 directly before photography.

Moreover, if the photographic magnification becomes larger than the predetermined value or the photographic subject distance becomes closer than the predetermined value, then, as described above, it may be supposed that it is often the case that a quickly moving photographic subject such as an insect or the like is being photographed. In this case, since it is often the case that this camera 1 will be moved quickly or the like in order to match the photographic subject, in which case a large camera vibration will be generated, accordingly the control range of the compensation lens 4 is enlarged during photography, so that it is arranged to be possible to compensate for this large image vibration. Conversely, if the photographic magnification becomes smaller than the predetermined value or the photographic subject distance becomes more remote than the predetermined value, then, since it is often the case that photography is being performed of a photographic subject such as scenery or the like whose spatial frequency is high, in other words that is detailed, accordingly the control range of the compensation lens 4 is not enlarged during photography, so as to accord priority to the optical characteristics.

Furthermore, if the photographic magnification becomes larger than the predetermined value or the photographic subject distance becomes closer than the predetermined value, then it may be supposed that the photograph that is being shot is, for example, an animal photograph or an insect photograph, or is a photograph of an expressive child or the like. When photographing a moving photographic subject of this type, it is very often the case that, due to failure of photography or the like, the user is not satisfied with a single photograph, but rather takes more photographs one after the other in succession. Thus, after photography, the compensation lens 4 is centered in the approximately central portion of its control range, and preparations are made for the next photograph, so that it is ensured that the advantageous effects of image vibration compensation can be stabilized more quickly. In this case, since the compensation lens 4 is centered after photography, and the image vibration compensation is resumed from this position that has been centered, accordingly it is possible to utilize the entire control range of the compensation lens 4 in an effective manner, from its upper limit to its lower limit. As a result, the advantageous effects of image vibration compensation are more quickly manifested upon the monitor image that is being monitored with the external liquid crystal monitor 19.

Conversely, if the photographic magnification becomes smaller than the predetermined value or the photographic subject distance becomes more remote than the predetermined value, then it may be supposed that a photograph is being taken of scenery or the like. Thus centering of the compensation lens 4 after photography is not performed, in order not to impart any sense of discomfort to the user by deviation between the angle of field of the result of photography, and the angle of field of the monitor image upon the external liquid crystal monitor 19 that is resumed after photography.

The Compensation Lens Shift Amount Image Capture Surface Magnification

If the compensation lens shift amount image capture surface magnification is greater than or equal to a predetermined value, then the shift amount of the image upon the image capture surface is large with respect to the shift amount of the compensation lens 4, and the change between the composition before photography and the composition that is the result of photography is large. Due to this, centering of the compensation lens 4 directly before photography is not performed. Conversely, when the compensation lens shift amount image capture surface magnification is less than or equal to the predetermined value, then the change between the composition before photography and the composition that is the result of photography is comparatively small, and accordingly priority is given to the optical performance. Thus, centering of the compensation lens 4 directly before photography is performed. If the compensation lens shift amount image capture surface magnification is greater than or equal to the predetermined value, then a small shift amount of the compensation lens 4 is sufficient for compensating for image vibration of a predetermined magnitude. Due to this, the control range of the compensation lens 4 is not enlarged before photography, so that priority is accorded to the optical performance.

Conversely, if the compensation lens shift amount image capture surface magnification is less than or equal to the predetermined value, then the control range of the compensation lens 4 is enlarged during photography, so as to cope with a sufficiently large camera vibration. In this case, as previously described, a larger shift amount for the compensation lens is required in order to compensate for image vibration of the same size. Due to this, it is often the case that, at the time point that photography has ended, the compensation lens 4 is shifted as far as the edge of its control range. Thus centering of the compensation lens 4 after photography is performed, so as to utilize the control range of the compensation lens 4 in an effective manner, from the upper limit of its control range to its lower limit. As a result, after photography, even if large camera vibration occurs, it becomes possible to manifest the advantageous effects of image vibration compensation more quickly upon the monitor image that is being monitored with the external liquid crystal monitor 19.

And, if the compensation lens shift amount image capture surface magnification is greater than or equal to the predetermined value, then centering of the compensation lens 4 after photography is not performed, since the possibility is large that the shift amount of the compensation lens 4 is small and that the compensation lens 4 will be positioned in the vicinity of the central portion of its control range after photography. As a result, there is almost no deviation between the angle of field of the result of photography, and the angle of field of the monitor image upon the external liquid crystal monitor 19 that is resumed after photography, and it is possible to avoid any sense of discomfort being imparted to the user.

The Photographic Exposure

If the photographic exposure is shorter than a predetermined value, then, since photography is performed instantaneously, the shift amount of the compensation lens 4 as photography is performed is small. Accordingly, in this case, centering of the compensation lens 4 immediately before photography is not performed, resulting in no change between the composition of the image before and after photography and shortening the release time lag. Moreover, unnecessary optical deterioration due to not performing enlargement of the control range of the compensation lens 4 during photography is prevented. Conversely, if the photographic exposure is longer than the predetermined value, then the compensation lens 4 shifts over a long time period while photography is being performed, and the shift amount by which the compensation lens 4 shifts while photography is being performed becomes large. Due to this, by performing centering of the compensation lens 4 directly before photography, and by enlarging the control range of the compensation lens 4 during photography, it becomes easy to obtain the advantageous effects of image vibration compensation up to a larger level of image vibration.

Furthermore, if the photographic exposure is longer than the predetermined value, then it is often the case that the compensation lens 4 shifts a large amount during this long photographic exposure, and that, at the time point that photography has ended, the compensation lens 4 has shifted as far as the edge of its control range. Thus, centering of the compensation lens 4 is performed after photography, so that it is possible to utilize the entire control range of the compensation lens 4, from its upper limit to its lower limit. By doing this, it is arranged to manifest the advantageous effects of image vibration compensation more quickly after photography upon the monitor image that is monitored with the external liquid crystal monitor 19, even if a large amount of camera vibration occurs.

Conversely, if the photographic exposure is shorter than the predetermined value, then, since photography is performed instantaneously, accordingly the possibility is high that the shift amount of the compensation lens is small, and that the compensation lens 4 is in the vicinity of the central portion of its control range. Due to this, centering of the compensation lens 4 after photography is not performed. As a result, there is almost no deviation between the angle of field of the result of photography, and the angle of field of the monitor image upon the external liquid crystal monitor 19 that is resumed after photography, and it is possible to avoid any sense of discomfort being imparted to the user.

The Focusing Mode

Macro AF is a mode that is often used when the photographic subject is extremely close to the camera 1, and, as previously described, it is known that, if the photographic subject distance is close, the advantageous effects of image vibration compensation are lost. On the other hand, it is often the case that photography is being performed of a moving photographic subject, such as a living creature like an insect or the like. Due to this fact, along with according priority to shortening of the release time lag, when considering the case of performing magnified photography and close up photography of a photographic subject that is close, it is arranged to suppress, as much as possible, change between the angle of field before photography and the angle of field of the photographic image. For this, it is arranged not to perform centering of the compensation lens 4 directly before photography.

Conversely, during the 'normal' mode, the 'long distance AF' mode, and the 'infinity' mode, the photographic subject is far away, and moreover there may be many components whose spatial frequency is high; in concrete terms, many detailed photographic subjects may be included. For performing photography of this type of photographic subject at good resolution, the controllability of the compensation lens 4 should be high. Accordingly, in this case, priority is accorded to the optical performance, and it is arranged to perform centering of the compensation lens 4 directly before photography.

Moreover, during 'macro AF' that is often used when the photographic subject is extremely close to the camera 1, it is considered often to be the case that photography is being performed of a photographic subject that is moving quickly, such as an insect or the like. In this case, it is often the case that a large camera vibration is generated by moving this camera 1 to match the photographic subject. Due to this fact, it is arranged to enlarge the control range of the compensation lens 4 during photography, so as to make it possible to perform image vibration compensation for even a large image vibration. Conversely, during the 'normal' mode, the 'long distance AF' mode, and the 'infinity' mode, since it is often the case that photography is being performed of a detailed photographic subject such as scenery or the like whose spatial frequency is high, accordingly priority is accorded to the optical characteristics, and the control range of the compensation lens 4 is not enlarged during photography.

Furthermore, during 'macro AF', it is supposed that, for example, photography is being performed of an animal or an insect, or of an expressive child or the like. When photographing a photographic subject that moves in this manner, it is very often the case that, due to failure of photography or the like, the user is not satisfied with merely one single photograph, but further continues to take one photograph after another. Thus, the compensation lens 4 is centered in the approximately central portion of its control range after photography, and is prepared for the next photograph, so as to ensure that the advantageous effects of image vibration compensation will be more quickly stabilized. In this case, since the compensation lens 4 is centered after photography, the image vibration compensation is resumed from this position in which it has been centered, and the entire control range of the compensation lens 4 is utilized, from its upper limit to its lower limit. As a result, the advantageous effects of image vibration compensation are more quickly manifested upon the monitor image that is being monitored with the external liquid crystal monitor 19.

During the 'normal' mode, the 'long distance AF' mode, and the 'infinity' mode, it is considered that scenery or the like is being photographed, and it is ensured that no sense of discomfort is imparted to the used by the deviation between the angle of field of the result of photography and the angle of field of the monitor image upon the external liquid crystal monitor 19, that is resumed after photography. Due to this, centering of the compensation lens 4 after photography is not performed.

The Flash Photography Mode

The 'flash prohibited' mode is often used when performing photography in a location in which flash photography is prohibited, such as an art gallery or the like, and it is often the case that, when the 'flash prohibited' mode has been set, photography is performed at a low speed timing. Moreover, if the 'slow synchro' mode is set as well, then it is often the case that the photographic exposure is a low speed timing, since it may be supposed that photography is being performed of a person or the like with a night scene as background. Accordingly, when the 'flash prohibited' mode has been set, and when the 'slow synchro' mode has been set, the compensation lens 4 is shifted for a long time period while photography is being performed, and the shift amount of the compensation lens 4 while photography is being performed becomes large. Due to this, by performing centering of the compensation lens 4 directly before photography, and by moreover enlarging the control range of the compensation lens 4 during photography, it is ensured that it is made easy to obtain the advantageous effects of image vibration compensation, even for quite a large image vibration.

The 'forced flash' mode is often used for adequately photographing a face by flash photography, when a shadow falls upon the face outdoors during daytime or the like. Thus, it is often the case that the photographic exposure is at a high speed timing, and, since photography is performed instantaneously, the shift amount of the compensation lens 4 while photography is being performed is small. Accordingly, the compensation lens 4 is not centered directly before photography, and priority is given to ensuring that there is no change between the composition before photography and the composition of the result of photography, and to shortening of the release time lag. Moreover, unnecessary optical deterioration is prevented by not performing enlargement of the control range of the compensation lens 4 during photography.

If the 'auto' mode or the 'red-eye reduction' mode is set, then, although the range of the photographic exposure includes from high speed to comparatively low speed, it is supposed that it does not reach as low speed timing as in the case of the 'slow synchro' mode. Due to this, in these modes, an all-round performance is implemented, intermediate between the cases of 'slow synchro' and 'forced flash'. Along with performing centering of the compensation lens 4 directly before photography and thereby being able to cope with a comparatively large level of image vibration, the control range of the compensation lens 4 is not enlarged during photography, so that unnecessary optical deterioration is prevented.

Furthermore, if the 'flash prohibited' mode is set in which it is supposed that the photographic exposure is long, and if the 'slow synchro' mode is set, then it is often the case that, during this long photographic exposure, the compensation lens 4 shifts a great deal, and that, at the time point that photography has ended, the compensation lens 4 will shift to the edge of its control range. Thus, centering of the compensation lens 4 is performed after photography, and it is ensured that the entire control range of the compensation lens 4 is utilized, from its upper limit to its lower limit. Due to this, even if a large level of camera vibration occurs, it is arranged to be possible for the advantageous effects of image vibration compensation upon the monitor image that is being monitored after photography with the external liquid crystal monitor 19 to be manifested more quickly.

Conversely, if the 'auto' mode or the 'red-eye reduction' mode or the 'forced flash' mode is set, then the low speed timings such as when the 'flash prohibited' mode or the 'slow synchro' mode is set are not reached. Since, due to this, the possibility is large that the shift amount of the compensation lens that shifts as photography is performed is small, and that after photography the compensation lens 4 will be in the vicinity of the central portion of its control range, accordingly centering of the compensation lens 4 after photography is not performed. As a result, there is almost no deviation between the angle of field of the result of photography and the angle of field of the monitor image upon the external liquid crystal monitor 19 that is resumed after photography, so that no sense of discomfort is imparted to the user.

The Number of Recorded Picture Elements Mode and the Recorded Image Compression Mode If the number of recorded picture elements mode is smaller than a predetermined value, as with the 'small' or the 'L size/postcard size' modes of Table 8, and if the recording compression ratio is high as with 'normal' of Table 8, then it is arranged to accord priority to the continuous shooting speed, and to reduction of the amount of change between the composition of the image before photography, the composition of the photographic result, and the composition of the image after photography. And, in this type of case, centering of the compensation lens 4 is not performed directly before photography, nor after photography, and enlargement of the control range of the compensation lens 4 is not performed during photography.

If the number of recorded picture elements mode is smaller than the predetermined value, and if the recording compression ratio is high, then, as previously described, it is not necessary to manifest such a high optical performance, since the photographic image is being recorded coarsely, and moreover the detailed information in the image is being lost due to the high compression. Conversely, in any case, the time period for writing the result of photography upon the non-volatile storage medium 31 becomes short, since the size of the data file that is the result of photography becomes small. Due to this, it is generally possible to manage with a short time period from when photography ends until the next photograph is taken for writing of the result of photography upon the non-volatile storage medium 31.

If the number of recorded picture elements mode is smaller than the predetermined value, and if the recording compression ratio is high, then centering of the compensation lens 4 is not performed directly before photography, nor after photography, and enlargement of the control range of the compensation lens 4 is not performed during photography. As a result, it is possible to manage with an even shorter time period until the next photograph is taken, and the continuous shooting speed performance is enhanced. Moreover, there is almost no change between the compositions of the image before photography, of the photographic result, and of the image after photography, and no sense of discomfort is imparted to the user.

Conversely, if the number of recorded picture elements mode is larger than the predetermined value, and if the recording compression ratio is low, then centering of the compensation lens 4 is performed directly before photography and after photography, and enlargement of the control range of the compensation lens 4 is performed during photography, in order to provide a higher optical performance and in order to cope with higher levels of camera vibration. In the example of Table 8, the 'middle' and 'large' modes, or the 'wide' and 'normal' modes, correspond to cases in which the number of recorded picture elements is larger than the predetermined value, and the 'fine' mode and the 'super-fine' mode correspond to cases in which the recording compression ratio is low.

The ISO Sensitivity Mode

With the ISO sensitivity, generally, setting this to higher is suitable for exposure of a dark photographic subject; and on the one hand the photographic exposure becomes high speed, while on the other hand noise becomes present in the picture quality and the grain becomes coarse. Accordingly, if the ISO sensitivity is higher than or equal to a predetermined value (in Table 8, greater than or equal to ISO 800), then noise is present in the photographic image, and the grain is coarse. Due to this, it becomes unnecessary to manifest such high optical performance, the photographic exposure also becomes high speed, and it is possible to manage with a small shift amount for the compensation lens during photography. Thus priority is accorded to the continuous shooting speed and to reduction of the amount of change between the compositions of the image before photography, of the photographic result, and of the image after photography, so that centering of the compensation lens 4 is not performed directly before photography, nor after photography, and enlargement of the control range of the compensation lens 4 is not performed during photography.

Conversely, if the ISO sensitivity is lower than or equal to a predetermined value (in Table 8, lower than or equal to ISO 400), and if it becomes less than or equal to a predetermined value with automatic setting in which the ISO sensitivity is set automatically, then the noise becomes small and a high picture quality is obtained. Moreover, it is often the case that the photographic exposure becomes a lower timing. Thus, in order to provide a higher optical performance and in order to cope with higher levels of camera vibration, centering of the compensation lens 4 is performed directly before photography and after photography, and enlargement of the control range of the compensation lens 4 is performed during photography.

The White Balance

The control unit 10 determines whether or not to perform centering, and whether or not to perform enlargement of the control range during photography, based upon the light source type, or upon the parameters of white balance processing that correspond to the light source type. As previously described, the type of the light source that is set by automatic setting or by manual setting can be 'sunlight', 'cloudy', 'fluorescent lighting', or 'incandescent lighting'; and the supposed brightness of the photographic subjects becomes darker in this sequence. Accordingly, the photographic exposure also has a tendency to become lower speed timing in this sequence. Due to this, if the type of light source that is set by automatic setting or by manual setting is 'sunlight' or 'cloudy', then it is often the case that the photographic exposure is high speed, and, since photography is performed instantaneously, the shift amount of the compensation lens 4 while photography is being performed is small. Accordingly, centering of the compensation lens 4 directly before photography is not performed, and priority is accorded to not having change between the composition before photography and the composition that results from photography, and to shortening the release time lag. Furthermore, the control range of the compensation lens 4 is not enlarged during photography, so that unnecessary optical deterioration is prevented.

Moreover, since it is often the case that photography is performed instantaneously, accordingly the possibility is large that the shift amount of the compensation lens 4 is small, and that, after photography, the compensation lens 4 will be in the vicinity of the central portion of its control range. Due to this, it is arranged not to perform centering of the compensation lens 4 after photography. As a result, there is almost no deviation between the angle of field of the result of photography and the angle of field of the monitor image upon the external liquid crystal monitor 19 that is resumed after photography, and no sense of discomfort is imparted to the user.

Conversely, if the type of the light source that is set by automatic setting or by manual setting is 'fluorescent lighting', or 'incandescent lighting', then it may be supposed that the photographic exposure is long, and that the compensation lens 4 shifts over a long time period during photography, so that the shift amount of the compensation lens while photography is performed becomes large. Due to this, the advantageous effect of image vibration compensation up to a larger level of image vibration is easily obtained by performing centering of the compensation lens 4 directly before photography, and by enlarging the control range of the compensation lens 4 during photography.

Furthermore, it is often the case that, during this long photographic exposure, the compensation lens 4 shifts by a large amount, and that, at the time point that photography ends, the compensation lens 4 is shifted as far as the edge of its control range. Accordingly, centering of the compensation lens 4 is performed after photography. As a result, by utilizing the entire control range of the compensation lens 4 in an effective manner from its upper limit to its lower limit, it becomes possible to manifest more quickly the advantageous effects of image vibration compensation upon the monitor image that is being monitored after photography with the external liquid crystal monitor 19, even if large camera vibration takes place.

Monitoring of the Photographic Image with the External Liquid Crystal Monitor

When photographic image monitoring with the external liquid crystal monitor 19 is set to ON, then it is possible to perform shutter release after having confirmed the advantageous effect of sufficient image vibration compensation by checking the monitor image of the photographic image monitor. In this case, it is easy for the advantageous effects of sufficient image vibration compensation to be obtained in the result of photography. On the other hand, if photographic image monitoring with the external liquid crystal monitor 19 is set to OFF, then the user can check the composition by using the optical viewfinder 7. In this case, it is difficult to know the advantageous effects of the image vibration compensation, and it often happens that photography is performed in a state in which comparatively large camera vibration is being applied to this camera 1, since the user cannot perform photography while suppressing the camera vibration that acts upon this camera 1 to a low level while monitoring the external liquid crystal monitor 19.

Furthermore, directly after the composition has been changed or the like, it is often the case that the compensation lens 4 is in the vicinity of the end of its control range. Accordingly, if the photographic image monitoring with the external liquid crystal monitor 19 is set to OFF, then, by performing centering of the compensation lens 4 directly before photography, and moreover by enlarging the control range of the compensation lens 4 during photography, it is made easy to obtain the advantageous effects of image vibration compensation up to a larger level of image vibration. It should be understood that, even if the user performs centering of the compensation lens 4 directly before photography in order to monitor the composition with the optical viewfinder 7, it is still difficult for him to be aware of the disparity between the composition before photography and the composition of the photographic result.

Furthermore, if photography is performed in the state in which a comparatively large camera vibration has been applied, then it is often the case that the compensation lens 4 shifts a great deal during photography, and that, at the time point that photography has ended, i.e. after photography, the compensation lens 4 is shifted to the edge of its control range. Due to this, by performing centering of the compensation lens 4 after photography, and by making it possible to utilize the entire range of the control range of the compensation lens 4 from its upper limit to its lower limit in an effective manner, it is made possible to cope with a large camera vibration more quickly, even during the next photographic shot.

If photographic image monitoring with the external liquid crystal monitor 19 being set to ON, then it is possible for the user to confirm the advantageous effects of sufficient image vibration compensation with the photographic image monitor, and it is possible to suppress vibration applied to this camera 1 to a comparatively low level. Furthermore if directly after the composition has changed or the like, the compensation lens 4 is in the vicinity of the end of its control range, and it is not possible to obtain the advantageous effects of image vibration compensation to a sufficient extent, then it is possible to wait for a certain time for the compensation lens 4 to return to its approximately central position, and to perform shutter release after the advantageous effects of image vibration compensation are sufficiently obtained. Accordingly, in this case, centering of the compensation lens 4 is not performed directly before photography, and the control range of the compensation lens 4 is not enlarged during photography. Due to this, it is possible to perform photography with almost no disparity between the composition before photography and the compensation of the result of photography, having obtained both sufficient optical performance and also the advantageous effects of image vibration compensation.

Furthermore, as previously described, since it is often the case that photography is performed while suppressing the camera vibration that is applied to this camera 1, the possibility is high that the compensation lens 4 does not greatly shift during photography, and that after photography, at the time point that photography has ended, the compensation lens 4 may be in the vicinity of the central portion of its control range. Due to this, centering of the compensation lens 4 is not performed after photography. Because of this, there is almost no deviation between the angle of field of the result of photography and the angle of field of the monitor image upon the external liquid crystal monitor 19 that is resumed after photography, and no sense of discomfort is imparted to the user.

The Self Timer Mode

If photography is performed using the self timer, then it is often the case that this camera 1 is fixed upon a tripod or the like, so that the camera vibration that is applied to this camera 1 is small. Because of this, the possibility is high that directly before photography the compensation lens 4 will be in the vicinity of the central portion of its control range, and moreover the user is able to anticipate that the composition determined before photography and the composition of the result of photography will be the same, and that photography of high picture quality will be possible. Accordingly, if the self timer mode is ON and self timer photography is performed, in order to accord priority to there being no change between the composition before photography and the composition of the result of photography, and to optical performance, centering of the compensation lens 4 is not performed directly before photography, and moreover the control range of the compensation lens 4 is not enlarged during photography.

Furthermore, in the self timer mode, this camera 1 is fixed upon a tripod, and the camera vibration that is applied to this camera is extremely small. Due to this, the possibility is high that the compensation lens 4 almost does not shift during photography, and that at the time point that photography has ended the compensation lens 4 will be in the vicinity of the central portion of its control range. Accordingly, centering of the compensation lens 4 after photography is not performed. Due to this, there is almost no deviation between the angle of field of the result of photography and the angle of field of the monitor image upon the external liquid crystal monitor 19 that is resumed after photography, and no sense of discomfort is imparted to the user.

On the other hand, if the self timer mode is OFF and normal photography is performed, then, since camera vibration is applied to this camera, accordingly centering of the compensation lens 4 is performed directly before photography, and image vibration compensation is performed during photography after the compensation lens 4 is at the approximately central portion of its control range. Moreover, the control range of the compensation lens 4 is enlarged during photography, and it is thus made possible to cope with a larger level of camera vibration. Even further, centering of the compensation lens 4 is performed after photography, so as to be able to cope with the case in which the compensation lens 4 shifts to a large extent during photography, so that, at the time point that photography has ended, the compensation lens 4 is shifted to the edge of its control range. By doing this, it becomes possible to utilize the entire control range of the compensation lens 4 from its upper limit to its lower limit, so that it becomes possible to cope with large camera vibration more quickly, even when the next photograph is being taken.

The Continuous Shooting Mode

When using the continuous shooting mode, then it is often the case that a comparatively high speed timing is being used, and moreover, at higher frame advance speeds, it is desirable to perform photography with the composition intended by the user. Accordingly, during the continuous shooting mode, along with ensuring the release time lag and that there is no change in the composition, priority is given to the frame advance speed. For this, centering of the compensation lens 4 is not performed directly before photography, nor after photography. Since it is often the case that a comparatively high speed timing is being used, a small shift amount for the compensation lens during photography will suffice. Accordingly, by arranging not to enlarge the control range of the compensation lens 4 during photography, it is possible to prevent deterioration of the optical performance during photography.

On the other hand, in the normal mode, in other words when continuous shooting is not being performed, contrary to the above, it may be supposed that the user is thinking about obtaining a good photograph with one shot. Accordingly priority is given to the image vibration compensation performance, in order to enhance the probability of more successful photography, and thus, in order to be able to cope with image vibration up to a larger level, centering of the compensation lens 4 directly before photography is performed, so that image vibration compensation during photography is performed from the compensation lens 4 being in the approximately central portion of its control range. By doing this, while suppressing deterioration of the optical performance of the photographic optical system, it is also possible to enlarge the control range of the compensation lens 4 during photography, and thus to cope with a larger level of image vibration.

Moreover, centering of the compensation lens 4 after photography is performed, in order to be able to cope with a case in which, during photography, the compensation lens 4 shifts to a great extent, so that, at the time point that photography has ended, the compensation lens 4 is shifted as far as the edge of its control range. By doing this, it is arranged for it to be possible to utilize the entire control range of the compensation lens 4 in an effective manner, from the upper limit of its control range to the lower limit thereof, and it becomes possible to cope with even a large level of camera vibration during the next photographic episode as well.

The Camera Vibration Compensation Mode

If a mode has been set in which image vibration compensation is not performed while preparations are being made for photography, and image vibration compensation is only performed during photography, then, since image vibration compensation is not performed while preparations are being made for photography, accordingly the compensation lens 4 is in the approximately central portion of its control range directly before photography. Thus, centering of the compensation lens 4 is not performed. Due to this, while suppressing deterioration of the optical performance of the photographic optical system, it is also possible to cope with image vibration up to a high level, and moreover it is possible to shorten the release time lag.

On the other hand, since it is not possible to confirm the advantageous effects with regard to image vibration compensation upon the external liquid crystal monitor 19 while preparations are being made for photography, as previously described, the camera vibration that is applied to this camera 1 is comparatively large. Accordingly, the control range of the compensation lens 4 is enlarged during photography, so as to make it possible to cope with a larger level of image vibration. Moreover, the compensation lens 4 is centered after photography. Due to this, although it may not be possible in this case to confirm the advantageous effects with regard to image vibration compensation upon the external liquid crystal monitor 19 while preparations are being made for photography, by ensuring that it is possible to utilize the entire control range of the compensation lens 4 from its upper limit to its lower limit in an effective manner, it is made possible to cope more quickly with a large level of camera vibration, even during the next photographic shot.

Moreover, in the mode in which image vibration compensation is always performed, including when preparations are being made for photography, in order to be able to cope with image vibration up to a comparatively large level, centering of the compensation lens 4 is performed directly before photography, so that the image vibration compensation during photography is performed from the compensation lens 4 being positioned in the approximate center of its control range. Due to this, while suppressing deterioration of the optical performance of the photographic optical system, it is also possible to cope with image vibration up to a comparatively large level. Moreover, by not changing the control range of the compensation lens 4 during photography, unnecessary deterioration of the optical characteristics is prevented. Even further, centering of the compensation lens 4 is performed after photography, in order to be able to cope with the case in which, during photography, the compensation lens 4 shifts to a large extent, so that at the time point at which photography has ended the compensation lens 4 is shifted to the edge of its control range. By doing this, it becomes possible to utilize the entire control range of the compensation lens 4 from its upper limit to its lower limit in an effective manner, so that it is made possible to cope more quickly with a large level of camera vibration, even during the next photograph.

Furthermore since, during the 'panning' mode, image vibration compensation is not performed in the panning direction directly before photography, accordingly the compensation lens is in the approximately central position of its control range directly before photography. Thus centering of the compensation lens 4 is not performed, and moreover the control range of the compensation lens 4 is not enlarged during photography, so that the optical performance of the photographic optical system is ensured. During photography, the compensation lens 4 is in the approximately central position within its control range, and, after photography as well, centering of the compensation lens 4 is not performed, so that it is possible to cope with the next photographic shot.

On the other hand the consideration arises that, during the 'panning' mode, in the non-panning direction, the camera vibration may become extremely great during panning. And thus priority is accorded to the image vibration compensation performance, in order to enhance the probability of a more successful photography, so that, in order to be able to cope with a higher level of image vibration, centering of the compensation lens 4 is performed directly before photography, so that image vibration compensation is performed during photography from the compensation lens 4 being in the approximately central position within its control range. Due to this it is possible, while suppressing deterioration of the optical performance of the photographic optical system, also to cope with image vibration up to a high level. Moreover, it is made possible to cope with a higher level of image vibration, by enlarging the control range in the non-panning direction of the compensation lens 4 during photography.

It should be understood that the enlargement width of the control range of the compensation lens 4 during this panning is set to a value that is larger than the enlargement width during normal still image photography.

According to this type of structure if, as during panning, a large level of camera vibration is generated, then photography is performed while according very serious emphasis to the image vibration compensation performance.

Now, if the position of the compensation lens 4 deviates from its center, the more that it deviates, the more does the optical performance undesirably deteriorate. Since it is considered that, during normal still image photography, not such large camera vibration is generated as during panning, accordingly, with this camera 1, serious emphasis is accorded to the optical performance over the performance for image vibration compensation, and it is arranged to make the enlargement width of the control range of the compensation lens 4 a smaller value than during panning.

Furthermore, centering of the compensation lens 4 is performed after photography, in order to be able to cope with the case in which, during photography, the compensation lens 4 shifts to a large extent, so that, at the time point that photography has ended, the compensation lens is shifted to the edge of its control range. By doing this, it becomes possible to utilize the entire control range of the compensation lens 4 from its upper limit to its lower limit, so that it becomes possible to cope with a large level of camera vibration, even during the next photographic shot.

On the other hand, if the camera vibration compensation mode is OFF, then it is supposed that the camera is being used in photographic conditions in which the amount of camera vibration becomes extremely small. For example, it may be supposed that photographic is being performed in the condition in which the camera is fixed upon a tripod, or the like. In this type of case, priority is given to suppressing change between the composition before photography, the composition of the result of photography, and the composition after photography as much as possible, and moreover to shortening of the time lag and to the photographic optical performance. Since the camera vibration compensation mode is OFF, directly before photography the compensation lens 4 is positioned at the approximately central portion of its control range. Due to this, centering of the compensation lens 4 directly before photography is not performed, and moreover enlargement of the control range of the compensation lens 4 during photography is not performed. During photography, the compensation lens 4 is at the approximately central portion of its control range, and also centering of the compensation lens 4 after photography is not performed, so that the system is ready for the next photographic shot.

The Moving Image Photography/Still Image Photography Setting

This camera 1 can be set so that the photography that is performed upon full press of the release button 20 is either photography of a still image or photography of a moving image. During moving image photography, centering of the compensation lens directly before photography is not performed, so that there is no change between the composition of the moving image photography that is started when the release button 20 is full pressed, and the previous composition of the monitor image upon the external liquid crystal monitor 19 while preparations for photography were being made. Furthermore, the control range of the compensation lens 4 is also not enlarged during photography, and moreover, after photography, centering of the compensation lens 4 is not performed. As a result, when the moving image photography is started, a smooth transition is made to moving image photography, and the photographic image has the same feeling before shutter release during the moving image photography and after the moving image photography, so that no sense of discomfort is imparted to the user. It should be understood that it would also be acceptable, during moving image photography, to arrange to enlarge the control range in order to be able cope with a large level of image vibration, and to perform centering after photography, so as to be able to cope with a high level of camera vibration during the next episode of shooting a still image or a moving image.

On the other hand, in the opposite manner, during still image photography, priority is accorded to the image vibration compensation performance. In order to enhance the probability of a more successful photograph. Furthermore, centering of the compensation lens 4 is performed directly before photography in order to be able to cope with a larger level of image vibration, and in order, by performing image vibration compensation during photography from the situation in which the compensation lens 4 is at the approximately central portion of its control range, to be able to cope with a larger level of image vibration while suppressing deterioration of the optical performance of the photographic optical system. Moreover, it is arranged to enlarge the control range of the compensation lens 4 during photography, so as to be able to cope with a larger amount of image vibration. Even further, centering of the compensation lens 4 after photography is performed in order to be able to cope with the case in which, during photography, the compensation lens 4 shifts a great deal, so that, at the time point at which photography has ended, the compensation lens 4 is shifted to the edge of its control range. By doing this, it becomes possible to use the entire control range of the compensation lens 4 in an effective manner from its upper limit to its lower limit, and it becomes possible more quickly to deal with a large amount of camera vibration, even when the next photograph is being taken.

The Composition Priority Mode

This camera 1 is provided with a composition priority mode for cases such as performing photography of a scenery photograph with the camera 1 fixed upon a tripod, or photographing a painting or the like, for which photography is permitted, while determining the composition in a very accurate manner, or the like. When this composition priority mode is set, centering of the compensation lens 4 directly before photography is not performed, enlargement of the control range of the compensation lens 4 during photography is not performed, and moreover centering of the compensation lens 4 is not performed after photography either. As a result, it is possible to suppress, as much as possible, change of the angle of field between the monitor image upon the external liquid crystal monitor 19 before shutter release, the result of photography, and the monitor image upon the external liquid crystal monitor 19 after photography.

On the other hand, in the non composition priority mode, conversely, priority is accorded to the image vibration compensation performance, in order to enhance the probability of a more successful photograph. Furthermore, in order to be able to cope with high levels of image vibration, centering of the compensation lens 4 directly before photography is performed, so that image vibration compensation during photography is performed from the state in which the compensation lens 4 is at the approximately central portion of its control range. As a result, it becomes possible to cope with large levels of image vibration, while suppressing deterioration of the optical performance of the photographic optical system. Moreover, the control range of the compensation lens 4 is enlarged during photography, so that it is made possible to cope with a larger level of image vibration. Even further, centering of the compensation lens 4 after photography is performed in order to be able to cope with the case in which, during photography, the compensation lens 4 shifts a great deal, so that, at the time point at which photography has ended, the compensation lens 4 is shifted to the edge of its control range. By doing this, it becomes possible to use the entire control range of the compensation lens 4 in an effective manner from its upper limit to its lower limit, and it becomes possible more quickly to deal with a large amount of camera vibration, even when the next photograph is being taken.

Although, in the above explanation, very detailed descriptions related to centering before and after image capture, and to the control range during image capture, have been provided for various photographic conditions and various types of mode setting, cases also exist in which it is not possible to combine the photographic conditions and the various types of mode setting and so on shown in Tables 8 and 9 simultaneously. For example, according to Table 8, if the photographic focal point distance is 150 mm or more, then centering of the compensation lens 4 is performed before photography, but on the other hand, if the photographic magnification is 1/1 or greater, then centering of the compensation lens 4 is not performed before photography. And, in the case that the photographic focal point distance is 150 mm or more, and moreover the photographic magnification is ¹⁄₁ or greater, then it is supposed that whether or not to perform centering of the compensation lens 4 before photography is determined on a case by case basis, according to the nature of this camera 1 as a manufactured product.

6-2-2. A Concrete Example During Photography

A concrete example of the operation of this camera 1 when the user full presses the release button 20 and the full press switch 120b is turned ON will now be explained with reference to FIG. 18. It should be understood that it is supposed that, at the time point that the release button 20 is full pressed, the steps up to and past the timing t17 in FIG. 16 are performed. In concrete terms, it is supposed that the compensation lens 4 has been positioned to the target position Lc(x), Lc(Y) by software control or hardware control according to the changeover signals a and b that are set, so that the system is in its state in which image vibration upon the image sensor 9 can be compensated. The target position Lc(X), Lc(Y) has been set in correspondence to the camera vibration detected by the vibration gyro processing units 201a and 201b.

When, at a timing t30, the main control unit 10a recognizes that the full press switch 120b has been turned ON, then at a timing t31 the monitor image display by the image sensor upon the external liquid crystal monitor 19 is stopped, and at a timing t32 the operation of the image sensor 9 is temporarily stopped. It should be understood that, in FIG. 18, the target position Lc(Y) is shown by dotted lines, and the position of the compensation lens Lr(Y) is shown by solid lines.

The timing t33 that follows the timing t32 shows the start timing of centering, if centering of the compensation lens 4 is to be performed directly before image capture. Whether or not to perform centering of the compensation lens 4 directly before image capture is determined based upon the various types of mode and operation during photography explained in the previous section 6-2-1. If centering of the compensation lens 4 is to be performed directly before image capture, then, at a timing t33, taking the current position of the compensation lens 4 as an initial value, the vibration control unit 10b changes the target position Lc(X), Lc(Y) of the compensation lens 4 towards the center of its control range at a predetermined slope Vc0. It should be understood that the portion of the curve shown by the symbol (a) in FIG. 18 shows the target position Lc(Y) and the compensation lens position Lr(Y) when centering of the compensation lens 4 is performed directly before image capture. As a result, the compensation lens 4 is gradually centered towards the center of its control range, by software control if at the present time the compensation lens 4 is being controlled by software control, and by hardware control if the compensation lens 4 is being controlled by hardware control.

Conversely, if centering of the compensation lens 4 directly before image capture is not performed, then, as shown at (b) in FIG. 18, the vibration control unit 10b does not perform centering of the compensation lens 4, but performs the operation at the timing t34 that will be described hereinafter. It should be understood that, in FIG. 18, since both centering and not centering are described in the same figure, although the period between the timing t33 and the timing t34 is shown as simply being waiting, this is not necessarily the case; centering may not be performed from the timing t33, but the operation from the timing t34 may be performed directly.

Next, when the compensation lens 4 is centered in the center of its control range, at the timing t34, during the image capture operation that is performed from here onward, the vibration control unit 10b changes over whether to perform the control of the compensation lens 4 by hardware control or by software control. In concrete terms, the vibration control unit 10b actuates the changeover signals a and b according to the setting state of the camera and the photographic conditions as explained with regard to the photographic scene and the compensation lens control method of the camera in section 5-2 above, and changes over whether to perform the control of the compensation lens 4 by hardware control or by software control.

Due to this, the changeover units 205a and 205b of FIG. 8 operate, and one or the other of the drive amounts Ds(X), Ds(Y) by software control and the drive amounts Dh(X), Dh(Y) by hardware control is selected. And, based upon the drive amounts that are selected, the coils 40a and 40b are driven by the PWM conversion units 204a and 204b and the drive units 203a and 203b. As a result, control of the compensation lens 4 is performed by the one of software control and hardware control that has been set.

Next, at a timing t35, the vibration control unit 10b determines whether or not to enlarge the control range of the compensation lens 4, based upon the setting state of the camera and the photographic conditions, as explained with reference to the various types of mode and the operation during photography in 6-2-1 above. And, if enlargement has been decided upon, the control range of the compensation lens 4 is enlarged. In FIG. 18, an example of a case in which the control range of the compensation lens 4 is enlarged is shown by doubled lines, while a case in which the control range is not changed and its state before the release button 20 is full pressed is maintained is shown by doubled dotted lines.

Next, from a timing t36, the vibration control unit 10b sets the target position Lc(X), Lc(Y) of the compensation lens 4, and starts control of the compensation lens 4 so as to compensate the image vibration caused by the vibration that the camera 1 is experiencing. In concrete terms, the vibration control unit 10b sets the target position Lc(X), Lc(Y) of the compensation lens 4, according to the camera vibration that has been detected by the vibration gyro processing units 201 and 201b. And the vibration control unit 10b controls the compensation lens 4 to this target position Lc(X), Lc(Y), and thus compensates the vibration of the image upon the image capture surface. At this time, the vibration control unit 10b controls the compensation lens 4 by software control, or by hardware control, according to the setting of the changeover signals a and b that were set at the timing t35.

At a timing t37, the main control unit 10a starts the image capture operation by the image sensor 9. Thereafter, when the required photographic exposure ends, at a timing t38, closing of the shutter 8 is started, and then at a timing t40 the shutter 8 closes perfectly and the image capture operation terminates. Until this shutter 8 closes, between the timing t38 and a timing t39, if the flash unit 6 is to be operated and flash photography is to be performed, the main control unit 10a operates the flash circuit unit 11 at the required timing (in the example of FIG. 18, at the timing t39), and thereby the flash unit 6 is caused to emit light.

Next, when at the timing t40 the closing of the shutter 8 is completed and the image capture operation is ended, at a timing t41 the main control unit 10a ends the image capture operation by the image sensor 9, and starts to read out the image captured by the image sensor 9 at a timing t42. On the other hand, at least at a timing t43 after the shutter 8 has perfectly closed and the image capture by the main control unit 10a has ended, the vibration control unit 10b terminates the image vibration compensation operation that was being performed up until this point. In concrete terms, it preserves the value of the target position Lc(X), Lc(Y) for the compensation lens 4 at this time point, and controls the compensation lens 4 to this position.

When the reading out of the image captured by the image sensor 9, that started at the timing t42, ends at a timing t44, then the main control unit 10a displays the result of this image capture upon the external liquid crystal monitor 19 from a timing t45. In the following, this display will be termed the "photographic image display". Moreover, from a timing t46, the main control unit 10a starts to open the shutter 8 that is currently closed, and commences returning to the initial state.

The "photographic image display" that started from the timing t45 ends at a timing t52, and returns to "monitor image display" at a timing t53. Before returning to this "monitor image display", the vibration control unit 10*b* changes over the control of the compensation lens 4 to hardware control, or to software control, at a timing t47. In other words, the vibration control unit 10*b* changes over the control of the compensation lens 4 to its state before the release button 20 was full pressed (before the timing t30 in FIG. 18). In concrete terms, the vibration control unit 10*b* actuates the changeover signals a and b, and changes over the control of the compensation lens 4 either to software control or to hardware control.

Due to this, the changeover units 205*a* and 205*b* in FIG. 8 operate, and either the drive amounts Ds(X), Ds(Y) for software control or the drive amounts Dh(X), Dh(Y) for hardware control are selected. And, according to the drive amounts that have thus been selected, the coils 40*a* and 40*b* are driven via the PWM conversion units 204*a* and 204*b* and the drive units 203*a* and 203*b*, and control of the compensation lens 4 is performed by which one of software control, and hardware control, that has been selected.

Next, if centering of the compensation lens 4 directly after image capture is to be performed based upon the setting states of the camera and the photographic conditions explained in the previous section 6-2-1 relating to the various types of mode and the operation during photography, at a timing t48, the vibration control unit 10*b* changes the target position Lc(X), Lc(Y) for the compensation lens 4 towards the center of its control range at the predetermined slope Vc0, taking the present position of the compensation lens 4 as an initial value. This operation corresponds to the portion shown in FIG. 18 at (g). By doing this, the compensation lens 4 is gradually centered at the center of its control range, by software control if currently the compensation lens 4 is being controlled by software control, and by hardware control if currently the compensation lens 4 is being controlled by hardware control.

Conversely, if centering of the compensation lens 4 directly after image capture is not to be performed, then the vibration control unit 10*b* does not perform centering of the compensation lens 4, but performs the operation at the timing t49 that will be described hereinafter. This operation corresponds to the portion shown in FIG. 18 at (f). It should be understood that since, in FIG. 18, both the case of performing centering and the case of not performing centering are described in the same figure, although between the timing t48 and the timing t49 is shown simply as being waiting, this is not necessarily the case; it would also be acceptable not to perform centering from the timing t48, but to perform the operations from the timing t49 directly.

Figure 18:
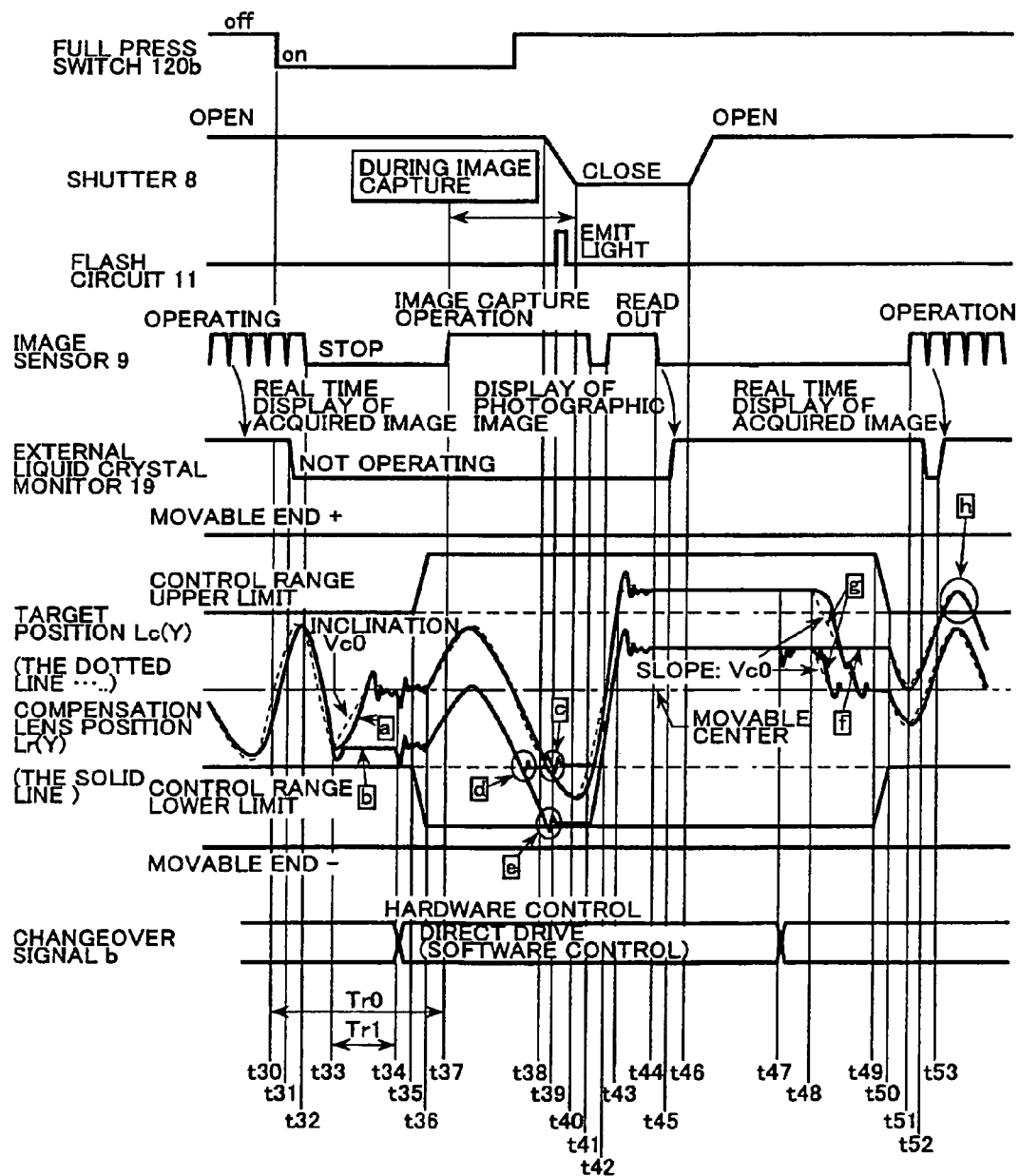
FIG. 18 is a timing chart showing one example of a sequence during photography.

If as shown at (g) in FIG. 18 centering of the compensation lens 4 is to be performed, then, at the timing t49 at which, at least, centering of the lens to the central portion of its control range has been completed, the vibration control unit 10*b* returns the control range of the compensation lens 4, that had been enlarged, to its state before the release button 20 was full pressed (before the timing t30 in FIG. 18). In a similar manner to what happens at the timing t49 if centering of the compensation lens 4 to the central portion of its control range is not to be performed as shown at (f) in FIG. 18, the vibration control unit 10*b* returns the control range of the compensation lens 4 to its state before the release button 20 was full pressed (before the timing t30 in FIG. 18).

Next, at a timing t50, the vibration control unit 10*b* sets the target position Lc(X), Lc(Y) for the compensation lens 4, and starts control of the compensation lens 4 so as to compensate for image vibration that this camera 1 is experiencing. In concrete terms, it sets the target position Lc(X), Lc(Y) for the compensation lens 4 according to the camera vibration that is detected by the vibration gyro processing units 201 and 201*b*. And, according to the setting of the changeover signals a and b that was set at the timing t47, the vibration control unit 10*b* controls the compensation lens 4 to this target position Lc(X), Lc(Y) by software controlling or by hardware controlling in order to compensates vibration of the image upon the image capture surface.

When the image vibration compensation is resumed at the timing t50, the main control unit 10*a* resumes the operation of the image sensor 9 from a timing t51, and ends the "photographic image display" upon the external liquid crystal monitor. And the main control unit 10*a* resumes the "monitor image display" of the image captured by the image sensor 9 from a timing t53.

As explained above, in this embodiment, it is made possible to perform: changeover of whether or not, when full press of the release button 20 is performed, the compensation lens is centered before photography; changeover of whether or not the compensation lens is centered after photography; changeover of the compensation lens control when photography is being performed between software control and hardware control; and changeover of the compensation lens control range while photography is being performed.

First, the advantageous operational effects of changing over whether or not centering of the compensation lens is performed before photography will be explained. If centering of the compensation lens 4 to the central portion of its control range is performed, then, when image vibration compensation during image capture is started at the timing t36, this image vibration compensation is always started from the state in which the compensation lens 4 is at the central portion of its control range. Due to this, while maintaining as high as possible the optical performance, which deteriorates the more the greater is the shift amount of the compensation lens 4, it also becomes possible to perform image vibration compensation for a high level of image vibration.

In the example of FIG. 18, if centering of the compensation lens 4 is not performed before image capture, as shown at (b), then the shift range of the compensation lens 4 during image capture is biased downwards from the central portion of its control range, so that the optical performance is deteriorated. Moreover, if centering of the compensation lens 4 before image capture has not been performed, then as shown at (d) (if the control range of the compensation lens is not changed during image capture) or at (e), it becomes impossible to perform further image vibration compensation, and this is undesirable. However, if the compensation lens 4 is centered before image capture (that corresponds to (a)), then it becomes possible to perform image vibration compensation up to (c) (if the control range of the compensation lens is not changed during image capture) or, in the example shown in FIG. 18, during all of the image capture period.

Conversely, if centering of the compensation lens is not performed before photography (that corresponds to (b) in FIG. 18), then the time period for centering the compensation lens 4 in the central portion of its control range (in FIG. 18, the time period Tr1 from the timing t33 to the timing t34) is no longer required. As a result, the time period from when the release button 20 is full pressed to when the image is actually captured (in FIG. 18, the time period Tr0 from the timing t30 to the timing t37), in other words the release time lag, is greatly curtailed, so that it becomes harder to miss a shutter chance.

Next, the advantageous operational effects of changing over whether or not centering of the compensation lens is performed after photography will be explained. If centering of the compensation lens is performed after photography (that corresponds to (g) in FIG. 18), since thereafter the image vibration compensation that is resumed (from the timing t50 in FIG. 18), is resumed from the state in which the compensation lens 4 is positioned at the central portion of its control range, accordingly the appearance of the "monitor image display" that is resumed from the timing t53 is good. In the example of FIG. 18, if centering of the compensation lens 4 after image capture is not performed (that corresponds to (f) in FIG. 18), then the position of the compensation lens 4 is biased upwards, and, at (h), it exceeds the upper limit of its control range, so that image vibration compensation becomes impossible from this point onwards. On the other hand, if centering of the compensation lens is not performed after photography (that corresponds to (f) in FIG. 18), then in FIG. 18 it becomes unnecessary to perform centering of the compensation lens 4 to the central portion of its control range (from the timing t48 to the timing t49), and this also has the advantageous effect that, during continuous shooting in which photography is continually repeated, the speed of this continuous shooting (the number of photographic frames shot per unit time) is enhanced.

Now, the advantageous operational effects will be explained of changing over the control of the compensation lens, while photography is being performed, between hardware control and software control. If this control of the compensation lens 4 while photography is being performed is performed by software control, then it is possible to make the control noise of the compensation lens 4 low. Conversely, if it is performed by hardware control, then the controllability of the compensation lens 4 is enhanced, so that the image vibration compensation performance is enhanced. Furthermore, by changing over the compensation lens control while photography is being performed between software control and hardware control according to the photographic scene of the camera and the compensation lens control method as previously described in section 5-2, it becomes possible to cope with a larger variety of photographic scenes and photographic states.

Now, the advantageous operational effects of changing over the control range of the compensation lens while photography is being performed will be explained. Based upon the various types of mode and the operation during photography of the previous section 6-2-1, priority is given to image vibration compensation performance during image capture, and the control range of the compensation lens 4 is enlarged. In this case it is possible to perform image vibration compensation normally, so that it becomes possible to cope with a higher level of image vibration, if the control range is not enlarged and it is not possible to perform image vibration compensation thereafter (the case (c) shown in FIG. 18).

Conversely, with a photographic scene in which, during image capture, it is desired to give priority to optical performance over image vibration compensation performance, it is arranged not to enlarge the control range of the compensation lens 4, so as to maintain the optical performance during photography. In this case, when performing centering of the compensation lens 4 to the center of its control range after photography, it is possible to economize upon the time period required for centering. Moreover, during continuous shooting in which photography is continually repeated, since it is possible to manage with a smaller amount of centering of the compensation lens before photography for the next continuous shot (this corresponds to the timing t33 in FIG. 18), accordingly there is also the advantageous effect of enhancing the continuous shooting speed (the number of photographic shots taken per unit time). Since in this manner, with this camera 1, it is possible to perform these changeovers in the optimum manner in the various conditions, accordingly it becomes possible to cope with many varieties of photographic conditions, so that the possibilities for a photographic scene are greatly enlarged.

The present invention can be applied in various different ways other than the above. Although, in the first embodiment described above, for image vibration compensation, the direction of the photographic optical axis 2 was changed with the compensation lens 4 of the photographic optical system, it would also be acceptable, for example, to arrange to change the direction of the photographic optical axis 2 by using a variable apical angle prism or the like. Moreover, although the external liquid crystal monitor 19 was used as the means for displaying the result of image capture at the exterior of this camera 1, it is not necessary for a liquid crystal monitor to be specified. For example, it would be possible to use an electrochromism display element, a plasma display element, some other type of flat display, or the like. Moreover, instead of the optical viewfinder 7, it would also be possible to use a viewfinder that incorporates a liquid crystal monitor, or the like.

Moreover, although the angular velocity set up in this camera 1 due to camera vibration was detected with the vibration gyros 200a and 200b, this is not to be considered as being limitative. A structure could also be employed in which, instead of using vibration gyros, the accelerations that the camera 1 experiences are detected using acceleration sensors, and the positional dimension vibrations being experienced by this camera 1 are detected by integrating these accelerations twice. Or, a known technique has been proposed in which the vibrations that are generated upon the image capture surface are detected directly from the results of image capture that are obtained by the image sensor 9, and it would also be acceptable, by using this technique, to drive the compensation lens 4 so as to eliminate this amount of vibration of the image capture surface that has thus been acquired.

The Second Embodiment

Figure 19:
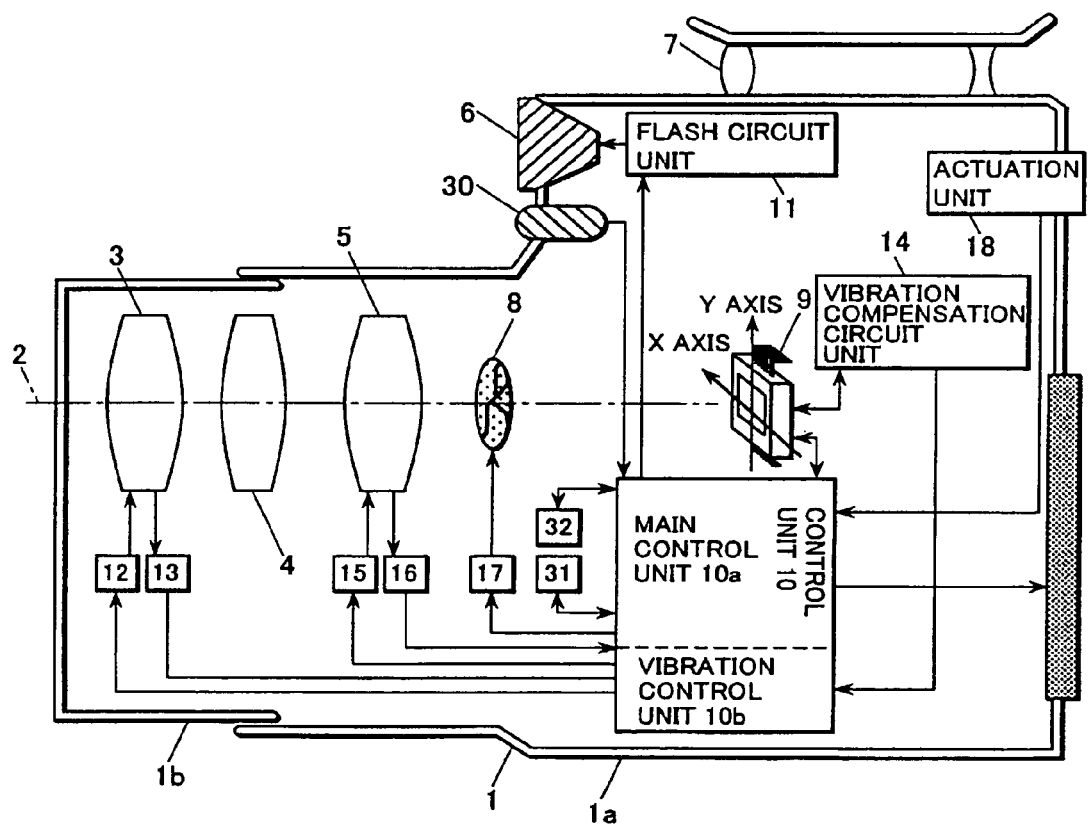
FIG. 19 is a figure showing a second embodiment.

In the first embodiment described above, it was arranged to cancel out vibration acting upon the image sensor 9 by driving the compensation lens 4, that constitutes one portion of the photographic optical system, to shift in some direction in a plane orthogonal to the photographic optical axis 2, according to the camera vibration as obtained by the vibration gyros 200a and 200b; but, with regard to the method for image vibration compensation, the system is not to be considered as being limited to this type of structure. FIG. 19 is a block diagram showing a second embodiment of a camera according to the present invention. With the camera shown in FIG. 19, for an image vibration amount that is generated by the photographic optical axis 2 changing due to camera vibration, it is arranged to perform image vibration compensation by shifting the image sensor 9 itself. It should be understood that, in FIG. 9, the same numbers are appended to portions of the structure that are the same as ones of the structure of the camera 1 shown in FIG. 1. Moreover, in the following, the explanation will concentrate upon the portions that are different from those in the camera 1 of the above described first embodiment.

With the camera 1 shown in FIG. 1, the structure was such that the compensation lens 4, that is a portion of the photographic lens, is driven using the vibration compensation circuit unit 14 so as to be shifted in two axial directions that are orthogonal to the photographic optical axis 2. On the other hand, with the camera 1 shown in FIG. 19, the lens 4 is fixed, and instead it is arranged to drive the image sensor 9 by the vibration compensation circuit unit 14 so that it is shifted in two axial directions that are orthogonal to the photographic optical axis 2 (in FIG. 19, these directions are termed the X axis and the Y axis). With regard to the mechanism that shifts the image sensor 9 in these two approximately mutually orthogonal directions within a plane that is orthogonal to the photographic optical axis 2, the mechanism shown in FIG. 2 and FIG. 4 may be applied.

In concrete terms, instead of the compensation lens 4, the image sensor 9 is arranged as in FIGS. 2 and 4. By the slide balls 22 rotating or sliding upon the surfaces of the fixed element 20 and the fixed element 21, it is possible to shift the image sensor 9 smoothly within a predetermined range of movement within a plane that is approximately orthogonal to the photographic optical axis 2. Moreover, by passing an electrical current through the coil 40, an electromagnetic force is generated upon the movable element 21, and it becomes possible to drive the image sensor 9 in two axial directions orthogonal to the photographic optical axis 2. A signal is obtained from the Hall element 44 corresponding to the change of position of the image sensor 9, and, by processing this, it is possible to detect the position of the image sensor 9.

With regard to the vibration compensation circuit unit 14, the circuit shown in FIG. 8 may be used just as it is. In this case, signals that correspond to the position of the image sensor 9 are obtained from the Hall elements 44a and 44b, and the output that is obtained from the Hall element processing circuit units 202a and 202b indicates the position of the image sensor 9. If subsequently, the position Lr of the compensation lens in the description explained above and in FIGS. 2 through 18 is read as being the image sensor position, then it will be easily understood that the explanation can also be applied to this vibration compensation camera in which it is the image sensor 9 that is driven in correspondence to the detected camera vibration, so that it becomes possible to implement the operation of the camera according to the present invention shown in this embodiment.

The Third Embodiment

Figure 20:
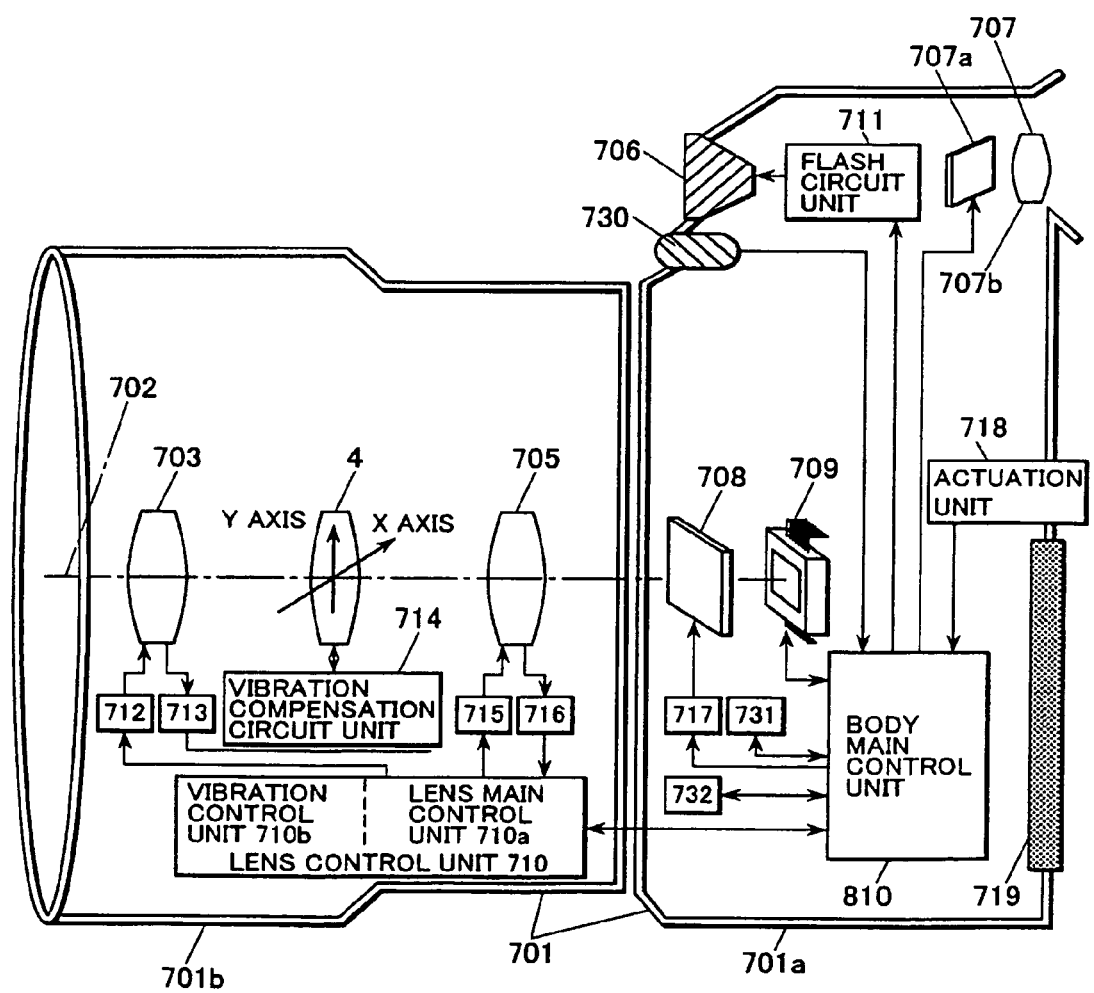
FIG. 20 is a figure showing a third embodiment.

Furthermore, the camera according to the present invention is not limited to being a digital still camera as described above, in particular to being a compact digital still camera; the present invention could also be applied to a silver halide film camera, or to a single lens reflex camera. FIG. 20 is a figure showing an example in which the present invention has been applied to a digital single lens reflex camera system. The camera 701 shown in FIG. 20 includes a body portion 701a and a lens portion 701b that is made so as to be removable therefrom.

The relationship between the digital single lens reflex camera system shown in FIG. 20 and the previously described compact digital still camera shown in FIG. 1 (the camera 1) is as follows. That is, elements of the camera 701 shown in FIG. 20 correspond to elements of the camera 1 shown in FIG. 1 in the following manner: a body portion 701a to the body 1a; a lens portion 701b to the lens-barrel 1b; a photographic optical axis 702 to the photographic optical axis 2; a zoom lens 703 to the zoom lens 3; a compensation lens 704 to the compensation lens 4; a focusing lens 705 to the focusing lens 5; a flash unit 706 to the flash unit 6; a viewfinder 707 to the optical viewfinder 7; a shutter 708 to the shutter 8; an image sensor 709 to the image sensor 9; a lens control unit 710 and a body main control unit 810 to the control unit 10; a lens main control unit 710a and a body main control unit 810b to the main control unit 10a; a vibration control unit 710b to the vibration control unit 10b; a flash circuit unit 711 to the flash circuit unit 11; a zoom lens drive unit 712 to the zoom lens drive unit 12; a zoom lens position detection unit 713 to the zoom lens position detection unit 13; a vibration compensation circuit unit 714 to the vibration compensation circuit unit 14; a focusing lens drive unit 715 to the focusing lens drive unit 15; a focusing lens position detection unit 716 to the focusing lens position detection unit 16; a shutter drive unit 717 to the shutter drive unit 17; an actuation unit 718 to the actuation unit 18; an external liquid crystal monitor 719 to the external liquid crystal monitor 19; the sound gathering unit 730 to the sound gathering unit 30; a non-volatile storage medium 731 to the non-volatile storage medium 31; and an actuation sound generation unit 732 to the actuation sound generation unit 32.

It should be understood that the control unit 10 in the camera 1 of FIG. 1 is divided, in the camera 701 of FIG. 20, into the lens control unit 710 that controls the functions within the lens portion 701b, and the body main control unit 810 that controls the functions within the body portion 701a. The lens control unit 710 and the body main control unit 810 may be constituted as one chip microcomputers or the like. And the lens control unit 710 and the body main control unit 810 mutually exchange data and the like by a known technique, for example by serial communication or the like, and implement similar functions to those of the control unit 10 in FIG. 1. Moreover, with this camera 701 of FIG. 20, a viewfinder 707 includes a viewfinder liquid crystal monitor 707a that is driven by the body main control unit 810, and that displays a captured image that has been obtained from the image sensor 709 or the like. The user can observe a captured image or the like that is being displayed upon the viewfinder liquid crystal monitor 707a via a viewfinder optical system 707b.

Moreover, with the camera 701 of FIG. 20, the shift mechanism for the compensation lens 4 shown in FIG. 2 is used, and the drive mechanism and position detection mechanisms for the compensation lens 4 shown in FIG. 4 are used. In the same manner, subsequently, the figures from FIG. 2 through FIG. 18, and the operations that have been explained in relation thereto, may be applied to the camera 701 without modification. Furthermore, it would also be acceptable to apply a structure that performs image vibration compensation by shifting the image sensor 9 according to the camera vibration that is detected, as shown in the second embodiment, to the single lens reflex camera of FIG. 20. Moreover, provided that the distinguishing features of the present invention are not lost, the present invention is not to be considered as being limited in any way by the embodiments described above.

As has been explained above, according to the present invention, the following beneficial operational effects are reaped. Since it is arranged, when driving the compensation lens 4 or the image sensor 9 in order to perform image vibration compensation, to use software control and hardware control by changing over between them according to the photographic conditions and the camera setting state, accordingly it is possible, while enhancing the image vibration compensation performance, also to perform the optimum image vibration compensation control corresponding to the photographic conditions and to the camera setting state.

It should be understood that, while a micro processor that performs calculation of the drive amounts by software is employed in the software control, it would also be acceptable to arrange for logic hardware or analog hardware to be employed in the hardware control system.

Moreover, instead of using software control and hardware control and changing over between them, it would also be acceptable to provide two micro processors that perform calculation of the drive amount by software, to make the speed of calculation processing by one of those micro processors higher than the speed of calculation processing by the other micro processor, and to employ them by changing over between them.

Furthermore, instead of changing over between software control and hardware control, it would also be acceptable to arrange to provide two sets of logic hardware or analog hardware that perform calculation of the drive amount, to make one of these operate at higher speed than the other, and to employ them by changing over between them.

The above described embodiments are examples, and various modifications can be made without departing from the scope of the invention.

What is claimed is:

1. A vibration compensation device, comprising:
a vibration compensation unit that comprises at least one of a vibration compensation optical system that makes an optical axis variable, and an image capturing unit that can be shifted, and that compensates image vibration upon an image surface occurring due to vibration of a camera;
a drive unit that drives the vibration compensation unit;
a detection unit that detects vibration of the camera;
a position detection unit that detects the position of the vibration compensation unit;
a range setting unit that sets within a first range that is a range of movement in which the vibration compensation unit can be mechanically positioned, a second range of movement;
a target position determination unit that determines a target position for the vibration compensation unit within the second range according to vibration of the camera detected by the detection unit; and
a control unit that controls the drive unit based upon the target position determined by the target position determination unit, thus compensating the image vibration, wherein
the range setting unit changes a size of the second range based upon either or both of photographic states and photographic conditions.

2. A vibration compensation device according to claim 1, further comprising:
a centering unit that controls the drive unit after photography based upon issue of a photographic command by an operator has ended so that the vibration compensation unit is centered in the approximate center of the second range.

3. A vibration compensation device according to claim 2, further comprising:
a changeover unit that changes over between a first mode in which centering is performed by the centering unit before photography is started based upon issue of a photographic command by the operator, and a second mode in which centering is not performed by the centering unit before photography is started based upon issue of a photographic command by the operator.

4. A vibration compensation device according to claim 2, wherein
before photography based upon issue of a photographic command by the operator is started, the range setting unit enlarges the second range.

5. A vibration compensation device according to claim 2, further comprising:
a determination unit that, based upon either or both of photographic states and photographic conditions, determines whether or not centering by the centering unit after photography based upon the photographic command issued by the operator has ended is required.

6. A vibration compensation device according to claim 2, further comprising:
an image-capturing unit that captures an image of the photographic subject; and
a display device that sequentially displays an image as a display image, the image being corresponding to an image data created based upon the image sequentially captured by the image-capturing unit;
and wherein
after photography based upon the photographic command issued by the operator has ended, the centering unit completes the centering before the sequential display of the display image is started.

7. A vibration compensation device according to claim 1, further comprising:
a centering unit that controls the drive unit before the start of photography based upon issue of a photographic command by an operator so that the vibration compensation unit is centered in the approximate center of the second range; and
a determination unit that determines whether or not centering by the centering unit is required based upon either or both of the photographic states and the photographic conditions.

8. A vibration compensation device according to claim 7, wherein
the either or both of photographic states and photographic conditions includes any one of: (a) a setting state as to whether or not centering by the centering unit before the start of photography based upon issue of the photographic command by the operator is required; (b) a parameter setting state for white balance processing; (c) the ON/OFF state of a self timer mode in which self timer photography is performed; and (d) the ON/OFF state of vibration compensation.

9. A vibration compensation device according to claim 7, wherein
the either or both of photographic states and photographic conditions includes all of: (a) a setting state as to whether or not centering by the centering unit before the start of photography based upon issue of the photographic command by the operator is required; (b) a parameter setting state for white balance processing; (c) the ON/OFF state of a self timer mode in which self timer photography is performed; and (d) the ON/OFF state of vibration compensation.

10. A vibration compensation device according to claim 1, wherein
the range setting unit determines whether or not change of the second range is required based upon either or both of the photographic states and the photographic conditions.

11. A vibration compensation device according to claim 10, wherein
the range setting unit changes the second range based upon issue of a photographic command by the operator.

12. A vibration compensation device according to claim 10, further comprising:
a centering unit that controls the drive unit before the start of photography based upon issue of the photographic command by the operator so that the vibration compensation unit is centered in the approximate center of the second range; and a mode setting unit that sets either a first mode in which centering is performed by the centering unit, or a second mode in which centering is not performed by the centering unit; and wherein the control unit makes a decision in which change of the second range by the range setting unit and centering by the centering unit are performed if the first mode is set and makes a decision in which change of the second range by the range setting unit is performed and centering by the centering unit is not performed if the second mode is set.

13. A vibration compensation device according to claim 10, wherein the either or both of photographic states and photographic conditions includes any one of: (a) a setting state as to whether or not centering by a centering unit before the start of photography based upon issue of the photographic command by the operator is required, the centering unit controlling the drive unit so that the vibration compensation unit is centered in the approximate center of the second range; (b) a magnification factor corresponding to a relationship between the shift amount of the vibration compensation unit and the image shift amount upon a surface of the image capturing unit; (c) a photographic exposure time corresponding to a time period that the surface of the image capturing unit is exposed to light from the photographic subject; (d) a type of focusing mode that is set; (e) a type of a flash photography mode that is set; (f) the ON/OFF state of a self timer mode in which self timer photography is performed; (g) the ON/OFF state of a sequential shooting photography mode in which photography is performed a plurality of times in succession; and (h) the ON/OFF state of the vibration compensation.

14. A vibration compensation device according to claim 1, wherein the range setting unit sets the second range to a first magnitude if a photographic state is "panning" mode, and sets the second range to a second magnitude if the photographic state is not "panning" mode.

15. A vibration compensation device according to claim 14, wherein the range setting unit sets the first magnitude to be larger than the second magnitude.

16. A vibration compensation device according to claim 1, further comprising:

a determination unit that determines whether a still image is being captured or a moving image is being captured, wherein the control unit controls the drive unit after photography based upon issue of a photographic command by an operator has ended so that the vibration compensation unit is centered in the approximate center of the second range if the determination unit determines the still image is being captured; and the control unit does not control the drive unit after photography based upon issue of a photographic command by an operator has ended so that the vibration compensation unit is centered in the approximate center of the second range if the determination unit determines the moving image is being captured.

17. A vibration compensation device according to claim 1, further comprising:

a determination unit that determine whether or not images are being captured sequentially, wherein the control unit enlarges the second range after issue of a photographic command by an operator and before the start of photography, if the determination unit determines the images are not being captured sequentially; and the control unit does not enlarge the second range after issue of a photographic command by an operator and before the start of photography, if the determination unit determines the images are being captured sequentially.

18. A camera body, comprising:

a vibration compensation unit that comprises an image-capturing unit that can be shifted, and that compensates image vibration upon an image surface occurring due to vibration of a camera;

a drive unit that drives the vibration compensation unit;

a detection unit that detects vibration of the camera;

a position detection unit that detects the position of the vibration compensation unit;

a target position determination unit that determines a target position for the vibration compensation unit according to vibration of the camera detected by the detection unit;

a calculation unit that calculates a drive amount for the drive unit based upon the target position and the position detected by the position detection unit;

a range of movement limitation unit that mechanically limits the position of the vibration compensation unit within a first range of movement;

a range setting unit that sets a second range of movement within the first range; and a centering unit that controls the drive unit after photography based upon issue of a photographic command by an operator has ended so that the vibration compensation unit is centered in the approximate center of the second range.

19. A camera body according to claim 18, further comprising:

a changeover unit that changes over between a first mode in which centering is performed by the centering unit before photography is started based upon issue of a photographic command by the operator, and a second mode in which centering is not performed by the centering unit before photography is started based upon issue of a photographic command by the operator.

20. A camera body according to claim 18, wherein before photography is started based upon issue of a photographic command by the operator, the range setting unit enlarges the second range.

21. A camera body according to claim 18, further comprising:

a determination unit that, based upon either or both of photographic states and photographic conditions, determines whether or not centering by the centering unit after photography based upon the photographic command issued by the operator has ended is required.

22. A camera body according to claim 18, further comprising:

an image-capturing unit that captures an image of the photographic subject; and a display device that sequentially displays an image as a display image, the image corresponding to an image data created based upon the image sequentially captured by the image-capturing unit;

and wherein, after photography based upon the photographic command issued by the operator has ended, the centering unit completes the centering before the sequential display of the display image is started.

23. A camera body, comprising:
a vibration compensation unit that comprises an image-capturing unit that can be shifted, and that compensates image vibration upon an image surface occurring due to vibration of a camera;
a drive unit that drives the vibration compensation unit;
a detection unit that detects vibration of the camera;
a position detection unit that detects the position of the vibration compensation unit;
a target position determination unit that determines a target position for the vibration compensation unit according to vibration of the camera detected by the detection unit;
a calculation unit that calculates a drive amount for the drive unit based upon the target position and the position detected by the position detection unit;
a range of movement limitation unit that mechanically limits the position of the vibration compensation unit within a first range of movement;
a range setting unit that sets a second range of movement within the first range;
a centering unit that controls the drive unit before the start of photography based upon issue of a photographic command by an operator so that the vibration compensation unit is centered in the approximate center of the second range; and
a determination unit that determines whether or not centering by the centering unit is required based upon either or both of the setting state of the camera system and photographic conditions.

24. A camera body according to claim 23, wherein
the either or both of photographic states and photographic conditions includes any one of: (a) a setting state as to whether or not centering by the centering unit before the start of photography based upon issue of the photographic command by the operator is required; (b) a parameter setting state for white balance processing; (c) the ON/OFF state of a self timer mode in which self timer photography is performed; and (d) the ON/OFF state of vibration compensation.

25. A camera body according to claim 23, wherein
the either or both of photographic states and photographic conditions includes all of: (a) a setting state as to whether or not centering by the centering unit before the start of photography based upon issue of the photographic command by the operator is required; (b) a parameter setting state for white balance processing; (c) the ON/OFF state of a self timer mode in which self timer photography is performed; and (d) the ON/OFF state of vibration compensation.

26. A camera body, comprising:
a vibration compensation unit that comprises an image-capturing unit that can be shifted, and that compensates image vibration upon an image surface occurring due to vibration of an camera;
a drive unit that drives the vibration compensation unit;
a detection unit that detects vibration of the camera;
a position detection unit that detects the position of the vibration compensation unit;
a target position determination unit that determines a target position for the vibration compensation unit according to vibration of the camera detected by the detection unit;
a calculation unit that calculates a drive amount for the drive unit based upon the target position and the position detected by the position detection unit;
a range of movement limitation unit that mechanically limits the position of the vibration compensation unit to within a first range of movement;
a range setting unit that sets a second range of movement within the first range;
a change unit that changes the second range after issue of a photographic command by an operator and before photographic processing; and
a control unit that determines whether or not change of the second range by the change unit is required based upon either or both of photographic states and photographic conditions.

27. A camera body according to claim 26, wherein
the change unit changes the second range based upon issue of a photographic command by the operator.

28. A camera body according to claim 26, further comprising:
a centering unit that controls the drive unit before the start of photography based upon issue of the photographic command by the operator so that the vibration compensation unit is centered in the approximate center of the second range; and
a mode setting unit that sets either a first mode in which centering is performed by the centering unit, or a second mode in which centering is not performed by the centering unit;
and wherein
the control unit makes a decision in which change of the second range by the change unit and centering by the centering unit are performed if the first mode is set and makes a decision in which change of the second range by the change unit and centering by the centering unit is not performed if the second mode is set.

29. A camera body, comprising:
a vibration compensation unit that comprises an image-capturing unit that can be shifted, and that compensates image vibration upon an image surface occurring due to vibration of a camera;
a drive unit that drives the vibration compensation unit;
a detection unit that detects vibration of the camera;
a position detection unit that detects the position of the vibration compensation unit;
a target position determination unit that determines a target position for the vibration compensation unit according to vibration of the camera detected by the detection unit;
a calculation unit that calculates a drive amount for the drive unit based upon the target position and the position detected by the position detection unit;
a range of movement limitation unit that mechanically limits the position of the vibration compensation unit within a first range of movement;
a range setting unit that sets a second range of movement within the first range;
a change unit that changes the second range after issue of a photographic command by an operator and before photographic processing; and
a change amount control unit that, based upon either or both of photographic states and photographic conditions, determines a change amount by which the second range is to be changed by the change unit.

30. A camera body according to claim 29, wherein
the change amount control unit sets the second range to a first magnitude if a photographic state is "panning" mode, and sets the second range to a second magnitude if the setting state of the camera system is not "panning" mode.

31. A camera body according to claim 30, wherein
the change amount control unit sets the first magnitude to be larger than the second magnitude.

32. A vibration compensation device, comprising:
a vibration compensation unit that comprises at least one of a vibration compensation optical system that makes an optical axis variable, and an image-capturing unit that can be shifted, and that compensates image vibration upon an image surface occurring due to vibration of an optical instrument;
a drive unit that drives the vibration compensation unit;
a position detection unit that detects a position of the vibration compensation unit;
a target position determination unit that determines a target position for the vibration compensation unit according to the vibration of the optical instrument;
a calculation unit that calculates a drive amount for the drive unit based upon the target position and the position detected by the position detection unit;
a range of movement limitation unit that mechanically limits the position of the vibration compensation unit within a first range of movement;
a range setting unit that sets a second range of movement within the first range; and
a centering unit that controls the drive unit after photography based upon issue of a photographic command by an operator has ended so that the vibration compensation unit is centered in an approximate center of the second range.

33. A vibration compensation device, comprising:
a vibration compensation unit that comprises at least one of a vibration compensation optical system that makes an optical axis variable, and an image-capturing unit that can be shifted, and that compensates image vibration upon an image surface occurring due to vibration of an optical instrument;
a drive unit that drives the vibration compensation unit;
a position detection unit that detects a position of the vibration compensation unit;
a target position determination unit that determines a target position for the vibration compensation unit according to the vibration of the optical instrument;
a calculation unit that calculates a drive amount for the drive unit based upon the target position and the position detected by the position detection unit;
a range of movement limitation unit that mechanically limits the position of the vibration compensation unit within a first range of movement;
a range setting unit that sets a second range of movement within the first range;
a centering unit that controls the drive unit before a start of photography based upon issue of a photographic command by an operator so that the vibration compensation unit is centered in an approximate center of the second range; and
a determination unit that determines whether or not centering by the centering unit is required based upon either or both of photographic states and photographic conditions.

34. A vibration compensation device, comprising:
a vibration compensation unit that comprises at least one of a vibration compensation optical system that makes an optical axis variable, and an image-capturing unit that can be shifted, and that compensates image vibration upon an image surface occurring due to vibration of an optical instrument;
a drive unit that drives the vibration compensation unit;
a position detection unit that detects a position of the vibration compensation unit;
a target position determination unit that determines a target position for the vibration compensation unit according to the vibration of the optical instrument;
a calculation unit that calculates a drive amount for the drive unit based upon the target position and the position detected by the position detection unit;
a range of movement limitation unit that mechanically limits the position of the vibration compensation unit within a first range of movement;
a range setting unit that sets a second range of movement within the first range;
a change unit that changes the second range after issue of a photographic command by an operator and before photographic processing; and
a control unit that determines whether or not change of the second range by the change unit is required based upon either or both of photographic states and photographic conditions.

35. A vibration compensation device, comprising:
a vibration compensation unit that comprises at least one of a vibration compensation optical system that makes an optical axis variable, and an image-capturing unit that can be shifted, and that compensates image vibration upon an image surface occurring due to vibration of an optical instrument;
a drive unit that drives the vibration compensation unit;
a position detection unit that detects a position of the vibration compensation unit;
a target position determination unit that determines a target position for the vibration compensation unit according to the vibration of the optical instrument;
a calculation unit that calculates a drive amount for the drive unit based upon the target position and the position detected by the position detection unit;
a range of movement limitation unit that mechanically limits the position of the vibration compensation unit within a first range of movement;
a range setting unit that sets a second range of movement within the first range;
a change unit that changes the second range after issue of a photographic command by an operator and before photographic processing; and
a change amount control unit that, based upon either or both of photographic states and photographic conditions, determines a change amount by which the second range is to be changed by the change unit.

36. A vibration compensation device, comprising:
a vibration compensation unit that comprises an image-capturing unit that can be shifted, and that compensates image vibration upon an image surface occurring due to vibration of an optical instrument;
a drive unit that drives the vibration compensation unit;
a position detection unit that detects a position of the vibration compensation unit;
a target position determination unit that determines a target position for the vibration compensation unit according to the vibration of the optical instrument;
a calculation unit that calculates a drive amount for the drive unit based upon the target position and the position detected by the position detection unit;
a range of movement limitation unit that mechanically limits the position of the vibration compensation unit within a first range of movement;
a range setting unit that sets a second range of movement within the first range; and
a centering unit that controls the drive unit after photography based upon issue of a photographic command by an operator has ended so that the vibration compensation unit is centered in an approximate center of the second range.

37. A vibration compensation device, comprising:
a vibration compensation unit that comprises an image-capturing unit that can be shifted, and that compensates image vibration upon an image surface occurring due to vibration of an optical instrument;
a drive unit that drives the vibration compensation unit;
a position detection unit that detects a position of the vibration compensation unit;
a target position determination unit that determines a target position for the vibration compensation unit according to the vibration of the optical instrument;
a calculation unit that calculates a drive amount for the drive unit based upon the target position and the position detected by the position detection unit;
a range of movement limitation unit that mechanically limits the position of the vibration compensation unit within a first range of movement;
a range setting unit that sets a second range of movement within the first range;
a centering unit that controls the drive unit before a start of photography based upon issue of a photographic command by an operator so that the vibration compensation unit is centered in an approximate center of the second range; and
a determination unit that determines whether or not centering by the centering unit is required based upon either or both of photographic states and photographic conditions.

38. A vibration compensation device, comprising:
a vibration compensation unit that comprises an image-capturing unit that can be shifted, and that compensates image vibration upon an image surface occurring due to vibration of an optical instrument;
a drive unit that drives the vibration compensation unit;
a position detection unit that detects a position of the vibration compensation unit;
a target position determination unit that determines a target position for the vibration compensation unit according to the vibration of the optical instrument;
a calculation unit that calculates a drive amount for the drive unit based upon the target position and the position detected by the position detection unit;
a range of movement limitation unit that mechanically limits the position of the vibration compensation unit to within a first range of movement;
a range setting unit that sets a second range of movement within the first range;
a change unit that changes the second range after issue of a photographic command by an operator and before photographic processing; and
a control unit that determines whether or not change of the second range by the change unit is required based upon either or both of photographic states and photographic conditions.

39. A vibration compensation device, comprising:
a vibration compensation unit that comprises an image-capturing unit that can be shifted, and that compensates image vibration upon an image surface occurring due to vibration of an optical instrument;
a drive unit that drives the vibration compensation unit;
a position detection unit that detects a position of the vibration compensation unit;
a target position determination unit that determines a target position for the vibration compensation unit according to the vibration of the optical instrument;
a calculation unit that calculates a drive amount for the drive unit based upon the target position and the position detected by the position detection unit;
a range of movement limitation unit that mechanically limits the position of the vibration compensation unit within a first range of movement;
a range setting unit that sets a second range of movement within the first range;
a change unit that changes the second range after issue of a photographic command by an operator and before photographic processing; and
a change amount control unit that, based upon either or both of photographic states and photographic conditions, determines a change amount by which the second range is to be changed by the change unit.

40. A lens barrel, comprising:
a vibration compensation unit that comprises at least one of a vibration compensation optical system that makes an optical axis variable, and an image-capturing unit that can be shifted, and that compensates image vibration upon an image surface occurring due to vibration of an optical instrument;
a drive unit that drives the vibration compensation unit;
a position detection unit that detects a position of the vibration compensation unit;
a target position determination unit that determines a target position for the vibration compensation unit according to the vibration of the optical instrument;
a calculation unit that calculates a drive amount for the drive unit based upon the target position and the position detected by the position detection unit;
a range of movement limitation unit that limits the position of the vibration compensation unit within a certain range of movement;
a range setting unit that sets a movement permitted range that is a range within the range of movement in which the vibration compensation unit can be positioned by being driven by the drive unit during vibration compensation; and
a centering unit that controls the drive unit after photography based upon issue of a photographic command by an operator has ended so that the vibration compensation unit is centered in an approximate center of the movement permitted range.

41. A lens barrel, comprising:
a vibration compensation unit that comprises at least one of a vibration compensation optical system that makes an optical axis variable, and an image-capturing unit that can be shifted, and that compensates image vibration upon an image surface occurring due to vibration of an optical instrument;
a drive unit that drives the vibration compensation unit;
a position detection unit that detects a position of the vibration compensation unit;
a target position determination unit that determines a target position for the vibration compensation unit according to the vibration of the optical instrument;
a calculation unit that calculates a drive amount for the drive unit based upon the target position and the position detected by the position detection unit;
a range of movement limitation unit that limits the position of the vibration compensation unit within a certain range of movement;

a range setting unit that sets a movement permitted range that is a range within the range of movement in which the vibration compensation unit can be positioned by being driven by the drive unit during vibration compensation;

a centering unit that controls the drive unit before a start of photography based upon issue of a photographic command by an operator so that the vibration compensation unit is centered in an approximate center of the movement permitted range; and a determination unit that determines whether or not centering by the centering unit is required based upon either or both of a setting state of the optical instrument and photographic conditions.

42. A lens barrel, comprising:

a vibration compensation unit that comprises at least one of a vibration compensation optical system that makes an optical axis variable, and an image-capturing unit that can be shifted, and that compensates image vibration upon an image surface occurring due to vibration of an optical instrument;

a drive unit that drives the vibration compensation unit;

a position detection unit that detects a position of the vibration compensation unit;

a target position determination unit that determines a target position for the vibration compensation unit according to the vibration of the optical instrument;

a calculation unit that calculates a drive amount for the drive unit based upon the target position and the position detected by the position detection unit;

a range of movement limitation unit that limits the position of the vibration compensation unit within a certain range of movement;

a range setting unit that sets a movement permitted range that is a range within the range of movement in which the vibration compensation unit can be positioned by being driven by the drive unit during vibration compensation;

a change unit that changes the movement permitted range after issue of a photographic command by an operator and before photographic processing; and a control unit that determines whether or not change of the movement permitted range by the change unit is required based upon either or both of a setting state of the optical instrument and photographic conditions.

43. A lens barrel, comprising:

a vibration compensation unit that comprises at least one of a vibration compensation optical system that makes an optical axis variable, and an image-capturing unit that can be shifted, and that compensates image vibration upon an image surface occurring due to vibration of an optical instrument;

a drive unit that drives the vibration compensation unit;

a position detection unit that detects a position of the vibration compensation unit;

a target position determination unit that determines a target position for the vibration compensation unit according to the vibration of the optical instrument;

a calculation unit that calculates a drive amount for the drive unit based upon the target position and the position detected by the position detection unit;

a range of movement limitation unit that limits the position of the vibration compensation unit within a certain range of movement;

a range setting unit that sets a movement permitted range that is a range within the range of movement in which the vibration compensation unit can be positioned by being driven by the drive unit during vibration compensation;

a change unit that changes the movement permitted range after issue of a photographic command by an operator and before photographic processing; and a change amount control unit that, based upon either or both of a setting state of the optical instrument and photographic conditions, determines a change amount by which the movement permitted range is to be changed by the change unit.

* * * * *